US012527270B2

(12) United States Patent
Kong et al.

(10) Patent No.: US 12,527,270 B2
(45) Date of Patent: *Jan. 20, 2026

(54) PROMOTING REGENERATION AND TRANSFORMATION IN PLANTS

(71) Applicants: KWS SAAT SE & CO. KGAA, Einbeck (DE); STICHTING WAGENINGEN RESEARCH, Wageningen (NL)

(72) Inventors: Jixiang Kong, Ghent (BE); Susana Martin-Ortigosa, Einbeck (DE); David Pacheco Villalobos, Einbeck (DE); Christine Kastner, Einbeck (DE); Frank Ludewig, Einbeck (DE); Anneke Horstman, Lent (NL); Kimberly Anne Boutilier, De Meern (NL)

(73) Assignees: KWS SAAT SE & Co. KGaA, Einbeck (DE); STICHTING WAGENINGEN RESEARCH, Wageningen (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/268,856

(22) PCT Filed: Dec. 22, 2021

(86) PCT No.: PCT/EP2021/087315
§ 371 (c)(1),
(2) Date: Jun. 21, 2023

(87) PCT Pub. No.: WO2022/136557
PCT Pub. Date: Jun. 30, 2022

(65) Prior Publication Data
US 2024/0389530 A1 Nov. 28, 2024

(30) Foreign Application Priority Data

Dec. 22, 2020 (EP) ................................. 20216530

(51) Int. Cl.
A01H 4/00 (2006.01)
C12N 15/82 (2006.01)

(52) U.S. Cl.
CPC .......... A01H 4/008 (2013.01); C12N 15/8205 (2013.01)

(58) Field of Classification Search
None
See application file for complete search history.

(56) References Cited

U.S. PATENT DOCUMENTS

| 6,825,397 | B1 | 11/2004 | Lowe et al. | |
| 7,151,170 | B1* | 12/2006 | Boutilier | C12N 15/8261 |
| | | | | 536/23.6 |
| 7,388,126 | B2 | 6/2008 | Duncan et al. | |
| 7,855,325 | B2 | 12/2010 | Duncan et al. | |
| 7,960,612 | B2 | 6/2011 | Zhang et al. | |
| 8,704,041 | B2* | 4/2014 | Gordon-Kamm | C12N 15/8213 |
| | | | | 536/23.6 |
| 9,212,369 | B2* | 12/2015 | Heidmann | C12N 15/8202 |
| 10,519,454 | B2 | 12/2019 | Kim et al. | |
| 11,319,547 | B1* | 5/2022 | Nuccio | C12N 15/8216 |
| 2002/0046419 | A1 | 4/2002 | Choo et al. | |
| 2005/0155115 | A1* | 7/2005 | Duncan | C12N 5/0025 |
| | | | | 800/294 |
| 2017/0175140 | A1 | 6/2017 | Hummel et al. | |
| 2022/0154203 | A1* | 5/2022 | Gordon-Kamm | A01H 4/005 |
| 2023/0348920 | A1 | 11/2023 | Mei | |

FOREIGN PATENT DOCUMENTS

| EP | 1 452 596 | A1 | 9/2004 |
| EP | 3009511 | A2 | 4/2016 |
| EP | 3757219 | A1 | 12/2020 |
| WO | 94/18313 | A1 | 8/1994 |
| WO | 95/09233 | A1 | 4/1995 |
| WO | 00/75330 | A1 | 12/2000 |
| WO | 02/16655 | A2 | 2/2002 |
| WO | 03/004659 | A2 | 1/2003 |
| WO | 03/080809 | A2 | 10/2003 |
| WO | 2010/079430 | A1 | 7/2010 |
| WO | 2011/003471 | A1 | 1/2011 |
| WO | 2011/003850 | A1 | 1/2011 |
| WO | 2011/072246 | A2 | 6/2011 |
| WO | 2011/082310 | A2 | 7/2011 |
| WO | 2011/146121 | A1 | 11/2011 |
| WO | 2011/154393 | A1 | 12/2011 |

(Continued)

OTHER PUBLICATIONS

Boutilier et al., Ectopic expression of Baby Boom triggers a conversion from vegetative to embryonic growth, 2002, Plant Cell 14 (8):1737-1749 (Year: 2002).*
Gürel et al., Utilization of sucrose during cocultivation positively affects Agrobacterium-mediated transformation efficiency in sugar beet (*Beta vulgaris* L.), 2019, Turk J Agric For., 43(6):509-517 (Year: 2019).*
Lutz et al., Steroid-inducible Baby Boom system for development of fertile *Arabidopsis thaliana* plants after prolonged tissue culture. 2015, Plant Cell Rep., 34:1849-1856 (Year: 2015).*
Kalra et al., Nitric oxide promotes in vitro organogenesis in Linum usitatissimum L., 2010, Plant Cell Tiss. Organ Cult., 103:353-359 (Year: 2010).*

(Continued)

Primary Examiner — Bratislav Stankovic
Assistant Examiner — Jay Chatterjee
(74) Attorney, Agent, or Firm — Troutman Pepper Locke LLP

(57) ABSTRACT

The present invention relates to the field of plant breeding and in particular to the regeneration of plants from cells and other tissues. More particularly, the invention provides methods and means for improving callus and shoot formation and regeneration of plants using sodium nitroprusside (SNP) in combination with *Brassica napus* BABYBOOM (BnBBM).

14 Claims, 41 Drawing Sheets

Specification includes a Sequence Listing.

(56) References Cited

FOREIGN PATENT DOCUMENTS

| WO | 2012/001527 A2 | 1/2012 |
|---|---|---|
| WO | 2012/093833 A2 | 7/2012 |
| WO | 2012/104729 A1 | 8/2012 |
| WO | 2012/138927 A2 | 10/2012 |
| WO | 2012/138939 A1 | 10/2012 |
| WO | 2014/093712 A1 | 6/2014 |
| WO | 2016/021973 A1 | 2/2016 |
| WO | 2016/146552 A1 | 9/2016 |
| WO | 2018/162702 A1 | 9/2018 |
| WO | 2018/236548 A1 | 12/2018 |
| WO | 2019/122394 A2 | 6/2019 |
| WO | 2019/144124 A1 | 7/2019 |
| WO | 2019/177978 A1 | 9/2019 |
| WO | 2019/238908 A1 | 12/2019 |
| WO | 2019/238909 A1 | 12/2019 |
| WO | 2019/238911 A1 | 12/2019 |
| WO | 2020/185751 A1 | 9/2020 |

OTHER PUBLICATIONS

Hesami et al., Development of support vector machine-based model and comparative analysis with artificial neural network for modeling the plant tissue culture procedures: effect of plant growth regulators on somatic embryogenesis of chrysanthemum, as a case study, 2020, Plant Methods, 16:112 (Year: 2020).*

Ivic-Haymes et al., Biolistic transformation of highly regenerative sugar beet (*Beta vulgaris* L.) leaves, Plant Cell Rep, 2005, vol. 23, pp. 699-704.

Doley et al., "Hormone-free medium will support callus production and subsequent shoot regeneration from whole plant leaf explants in some sugarbeet (*Beta vulgaris* L.) populations", Plant Cell Reports, 1989, vol. 8, pp. 222-225.

International Search Report and Written Opinion Issued in International Application No. PCT/EP2021/067930 dated Oct. 18, 2021 (12 pages).

Puchta, H., "The repair of double-strand breaks in plants: mechanisms and consequences for genome evolution", Journal of Experimental Botany, Jan. 2005, vol. 56, No. 409, pp. 1-14. doi: 10.10.1093/jxb/eri025.

Charpentier, M. et al., "CtIP fusion to Cas9 enhances transgene integration by homology-dependent repair", Nature Communications, 2018, vol. 9(1):1133, pp. 1-11. doi: 10.1038/s41467-018-03475-7.

Richardson, C.D. et al., "CRISPR-Cas9 genome editing in human cells occurs via the Fanconi anemia pathway", Nat Genet, 2018, vol. 50, pp. 1132-1139. https://doi.org/10.1038/s41588-018-0174-0.

Wang, Y. et al., "ZmCom1 is Required for Both Mitotic and Meiotic Recombination in Maize", Front. Plant Sci., Jul. 16, 2018, vol. 9, Article 1005, pp. 1-14. doi: 10.3389/fpls.2018.01005.

Shaked, H. et al., "High-frequency gene targeting in *Arabidopsis* plants expressing the yeast RAD54 gene", Proc. Natl. Acad. Sci., Aug. 23, 2005; vol. 102, No. 34: pp. 12265-12269. www.pnas.org/cgi/doi/10.1073/pnas.0502601102.

Seeliger, K. et al., "BRCA2 is a mediator of RAD51- and DMC1-facilitated homologous recombination in *Arabidopsis thaliana*", New Phytologist, 2012, vol. 193(2): pp. 364-375.

Zhang, B. et al., "XRCC3 is essential for proper double-strand break repair and homologous recombination in rice meiosis", Journal of Experimental Botany, vol. 66, No. 19: pp. 5713-5725, Jun. 1, 2015. doi:10.1093/jxb/erv253.

Komor, A.C. et al., "Programmable editing of a target base in genomic DNA without double-stranded DNA cleavage", Nature, May 19, 2016, vol. 533, pp. 420-424. doi:10.1038/nature17946.

Gaudelli, N.M. et al., "Programmable base editing of A•T to G•C in genomic DNA without DNA cleavage" Nature, Nov. 23, 2017, vol. 551, pp. 464-471. doi:10.1038/nature24644.

Zong,Y. et al., "Precise base editing in rice, wheat and maize with a Cas9-cytidine deaminase fusion", Nature Biotechnology, vol. 25, No. 5, Feb. 27, 2017, pp. 438-440. Doi:10.1038/nbt.3811.

Yan, F. et al., "Highly Efficient A•T to G•C Base Editing by Cas9n-Guided (RNA Adenosine Deaminase in Rice", Molecular Plant, Apr. 2018, vol. 11, pp. 631-634.

Hua, K. et al. "Precise A•T to G•C Base Editing in the Rice Genome", Molecular Plant, Apr. 2018, vol. 11, pp. 627-630.

Analzone, A.V. et al., "Search-and-replace genome editing without double-strand breaks or donor DNA", Nature, Dec. 5, 2019, vol. 576, pp. 149-157.

Smith, T.F. & Waterman, M.S., "Identification of common molecular subsequences", Journal of Molecular Biology, 1981, vol. 147(1): pp. 195-197.

Rozov, S.M. et. al., "The Problem of the Low Rates of CRISPR/Cas9-Mediated Knock-ins in Plants: Approaches and Solutions", Intl. Journal of Molecular Sciences, 2019, vol. 20(13), pp. 1-12. doi:10.3390/ijms20133371.

Marino, N.D. et al., "Anti-CRISPR protein applications: natural brakes for CRISPR-Cas technologies", Nature Methods, May 2020, vol. 17, No. 5, pp. 471-479.

Mayer, K.F.X. et al., "Role of WUSCHEL in Regulating Stem Cell Fate in the *Arabidopsis* Shoot Meristem", Cell, Dec. 11, 1998, vol. 95, pp. 805-815.

Yadav, R. K. et al., "WUSCHEL protein movement mediates stem cell homeostasis in the *Arabidopsis* shoot apex", Genes & Development, 2011, vol. 25, pp. 2025-2030.

Laux, T. et al., "The WUSCHEL gene is required for shoot and floral meristem integrity in *Arabidopsis*", Development, 1996, vol. 122, pp. 87-96.

Leibfried, A. et al., "WUSCHEL controls meristem function by direct regulation of cytokinin-inducible response regulators", Nature, Dec. 22, 2005, vol. 438(7071), pp. 1172-1175. doi: 10.1038/nature04270.

Hofmann, N.R., "A Breakthrough in Monocot Transformation Methods", The Plant Cell, Sep. 2016, vol. 28: 1989.

Nic-Can et al., "New Insights into Somatic Embryogenesis: Leafy Cotyledon1, Baby Boom1 and WUCHSEL-Related Homeobox4 Are Epigenetically Regulated in *Coffea canephora*", PLoS One, Aug. 2013, vol. 8(8), 14 pages, e72160. PMID: 23977240.

Min, L. et al., "Leafy Cotyledon1-Casein Kinase I-TCP15-Phytochrome Interacting Factor4 Network Regulates Somatic Embryogenesis by Regulating Auxin Homeostasis", Plant Physiology, Dec. 2015, vol. 169, pp. 2805-2821.

A. Cagliari et al., "New insights on the evolution of Leafy cotyledon1 (LEC1) type genes in vascular plants", Genomics, 2014, vol. 103, pp. 380-387.

Kim et al., "The AtGRF family of putative transcription factors is involved in leaf and cotyledon growth in *Arabidopsis*", The Plant Journal, 2003, vol. 36, pp. 94-104. doi: 10.1046/j.1365-313X.2003.01862.x.

Choi et al., "Whole Genome Analysis of the OsGRF Gene Family Encoding Plant Specific Putative Transcription Activators in Rice (*Oryza sativa* L.)", Plant Cell Physiol, 2004, vol. 45(7): pp. 897-904.

Ellerström et al., "Ectopic Expression of Effector of Transcription perturbs gibberellin-mediated plant developmental processes", Plant Molecular Biology, 2005, vol. 59: pp. 663-681.

Aida, M., et al., "The PLETHORA genes mediate patterning of the *Arabidopsis* root stem cell niche", Cell, 2004, vol. 119: pp. 109-120.

Mähönen, A.P., et al., "PLETHORA gradient formation mechanism separates auxin responses", Nature, 2014, vol. 515: pp. 125-129.

Santuari et al., "The PLETHORA Gene Regulatory Network Guides Growth and Cell Differentiation in *Arabidopsis* Roots", The Plant Cell, Dec. 2016, vol. 28: pp. 2937-2951 DOI: https://doi.org/10.1105/tpc.16.00656.

El Ouakfaoui, S. et al., "Control of somatic embryogenesis and embryo development by AP2 transcription factors", Plant Molecular Biology, 2010, vol. 74(4-5): pp. 313-326.

Vilella et al., "EnsemblCompara GeneTrees: complete, duplication-aware phylogenetic trees in vertebrates", Genome Research, 2009, vol. 19: pp. 327-335.

Svitashev et al., "Targeted Mutagenesis, Precise Gene Editing, and Site-Specific Gene Insertion in Maize Using Cas9 and Guide RNA", Plant Physiology, vol. 169(2), pp. 931-945, Oct. 2015. https://doi.org/10.1104/pp.15.00793.

(56) References Cited

OTHER PUBLICATIONS

Edgar, "MUSCLE: multiple sequence alignment with high accuracy and high throughput", Nucleic Acids Research, 2004, vol. 32, No. 5, pp. 1792-1797.
Yang, "PAML 4: Phylogenetic Analysis by Maximum Likelihood", Mol. Biol. Evol., 2007, vol. 24, No. 8, pp. 1586-1591.
Li et al., "RecQ helicase enhances homologous recombination in plants", FEBS Letters, 2004, vol. 574, No. 1-3, pp. 151-155.
Altpeter et al., "Advancing Crop Transformation in the Era of Genome Editing", The Plant Cell, 2016, vol. 28, pp. 1510-1520.
Zhang et al., "The emerging and uncultivated potential of CRISPR technology in plant science", Nature Plants, 2019, vol. 5, No. 8, pp. 778-794.
International Search Report and Written Opinion issued from the International Searching Authority in International Application No. PCT/EP2021/087267 dated Apr. 25, 2022.
International Search Report and Written Opinion issued in International Application No. PCT/EP2021/087315 filed on Dec. 22, 2021.
Boch et al., "Breaking the Code of DNA Binding Specificity of TAL-type III effectors". Science (Dec. 11, 2009), vol. 326(5959), pp. 1509-1512.
Boutilier, K et al., "Extopic expression of Baby Boom triggers a conversion from vegetative to embryonic growth", The Plant Cell (Aug. 1, 2002), American Society of Plant Biologists, vol. 14, No. 8, pp. 1737-1749, XP002348814, ISSN: 1040-4651, DOI: 10.1105/TPC.001941.
Burstein et al., "New CRISPR-Cas systems from uncultivated microbes", Nature (Feb. 9, 2017), vol. 542, pp. 237-241. Doi:10.1038/nature21059.
Cheng et al., "Multiplexed activation of endogenous genes by CRISPR•on, an RNA-guided transcriptional activator system". Cell research (2013), vol. 23(10), pp. 1163-1171. Doi:10.1038/cr.2013.122; published online Aug. 27, 2013.
Dejonghe & Russinova, "Plant Chemical Genetics: From Phenotype-Based Screens to Synthetic Biology". Plant Physiology (May 2017), vol. 174, pp. 5-20, www.plantphysiol.org.
Kong, Jixiang et al., "Overexpression of the Transcription Factor Growth-Regulating Factor5 Improves Transformation of *Dicot* and *Monocot* Species", Frontiers in Plant Science (Oct. 12, 2020), vol. 11, pp. 1-15. XP055804752, DOI: 10.3389/fpls.2020.572319.
Florez, Sergio L. et al., "Enhanced somatic embryogenesis in Theobroma cacao using the homologous Baby Boom transcription factor". BMC Plant Biology (2015), vol. 15(121), pp. 1-13. Doi:10.1186/s12870-015-0479-4.
Gatz & Lenk, "Promoters that respond to chemical inducers". Trends in Plant Science (1998), vol. 3(9), pp. 352-358.
Han et al., "Sodium nitroprusside promotes multiplication and regeneration of Malus hupehensis in vitro plantlets". Plant Cell, Tissue and Organ Culture (2009), vol. 96, pp. 29-34. Doi:10.1007/s11240-008-9456-z.
Heidmann, Iris et al., "Efficient sweet pepper transformation mediated by the Baby Boom transcription factor", Plant Cell Reports (Feb. 9, 2011), vol. 30, No. 6, pp. 1107-1115, XP019901417, ISSN: 1432-203x, doi: 10.1007/S00299-011-1018-x.
Hilton et al., "Epigenome editing by a CRISPR-Cas9-based acetyltransferase activates genes from promoters and enhancers". Nature biotechnology (2015), vol. 33(5), pp. 510-517.
Isalan et al., "A rapid, generally applicable method to engineer zinc fingers illustrated by targeting the HIV-1 promoter". Nature Biotechnology (Jul. 2001), vol. 19(7), pp. 656-660. Doi:10.1038/90264.
Ishida et al., "Agrobacterium-mediated transformation of maize". Nature protocols (published online Jun. 21, 2007), vol. 2(7), pp. 1614-1621. Doi:10.1038/nprot.2007.241.
Jinek et al., "A programmable Dual-RNA-Guided DNA Endonuclease in Adaptive Bacterial Immunity", Science (2012), vol. 337, pp. 816-821.
Kalra, Charu and Babbar, Shashi B., "Nitric oxide promotes in vitro organogenesis in Linum usitatissimum L.", Plant Cell, Tissue and Organ Culture (PCTOC) (2010), vol. 103, pp. 353-359. DOI:10.1007/s11240-010-9788-3.
Kawasumi, M., & Nghiem, P., "Chemical Genetics: Elucidating Biological Systems with Small-Molecule Compounds". Journal of Investigative Dermatology (2007), vol. 127(7), pp. 1577-1584. Doi:10.1038/sj.jid.5700853.
Kishchenko et al., "Production of transgenetic sugarbeet (*Beta vulgaris* L.) plants resistant to phosphinothricin", Cell Biology International (2005) [first published Jan. 2, 2013], vol. 29, pp. 15-19. https://doi.org/10.1016/j.cellbi.2004.11.003.
Lindsey & Gallois, "Transformation of Sugarbeet (*Beta vulgaris*) by Agrobacterium tumefaciens". Journal of Experimental Botany (May 1990), vol. 41, No. 226, pp. 529-536.
Liu et al., "Design of polydactyl zinc-finger proteins for unique addressing within complex genomes". Proceedings of the National Academy of Sciences (May 1997), vol. 94(11), pp. 5525-5530.
Lowder et al., "Multiplexed Transcriptional Activation or Repression in Plants Using CRISP••dCas9-Based Systems". Plant Gene Regulatory Networks: Methods and Protocols, Methods in Molecular Biology, vol. 1629, pp. 167-184. Doi:10.1007/978-1-4939-7125-1_12.
Makarova et al., "An updated evolutionary classification of CRISPR-Cas systems", Nature Rev. Microbiol. (Nov. 2015), vol. 13(11): pp. 722-736. Doi:10.1038/nrmicro3569.
Moore et al., "Transcription Activator-like Effectors: A Toolkit for Synthetic Biology". ACS Synthetic Biology (2014), vol. 3(10), pp. 708-716. dx.doi.org/10.1021/sb400137b.
Moscou & Bogdanove, "A Simple Cipher Governs DNA Recognition by TAL Effectors". Science (Dec. 11, 2009), vol. 326(5959), p. 1501.
Samalova et al., "pOp6/LhGR: a stringently regulated and highly responsive dexamethasone-inducible gene expression system for tobacco". The Plant Journal (2005), vol. 41(6), pp. 919-935. Doi:10.1111/j.1365-313X.2005.02341.x.
Sarropoulou, Virginia et al., "In vitro plant regeneration from leaf explants of the cherry rootstocks CAB-6P, Gisela 6, and MxM 14 using sodium nitroprusside". In Vitro Cellular & Developmental Biology—Plant (Mar./Apr. 2014), vol. 50 (2), pp. 226-234. Doi:10.1007/s11627-013-9565-1.
Srinivasan, Chinnathambi et al., "Heterologous expression of the Baby Boom AP2/ERF transcription factor enhances the regeneration capacity of tobacco (*Nocotiana tabacum* L.)", Planta (2007), vol. 225(2), pp. 341-351. Doi:10.1007/s00425-006-0358-1.
Tan, Boon Chin et al., "Effects of Sodium nitroprusside on shoot multiplication and regeneration of Vanilla planifolia Andrews", In Vitro Cellular & Developmental Biology—Plant (2013), vol. 49(5), pp. 626-630. ISSN 1054-5476. DOI: 10.1007/s11627-013-9526-8.
Xu et al., "Effects of sodium nitroprusside on callus induction and shoot regeneration in micropropagated Dioscorea opposita", Plant Growth Regulation (2009), vol. 59, pp. 279-285. Doi:10.1007/s10725-009-9410-z.
Zetsche et al., "Cpf1 Is a Single RNA-Guided Endonuclease of a Class 2 CRISPR•Cas System", Cell (Oct. 22, 2015), vol. 163, pp. 759-771. http://dx.doi.org/10.1016/j.cell.2015.09.038.
Kwon et al., "Overexpression of OsRecQl4 and/or OsExo1 Enhances DSB-Induced Homologous Recombination in Rice", Plant & Cell Physiology, 2012, vol. 53, No. 12, pp. 2142-2152.

\* cited by examiner

Influence of SNP on seed production of genotype 9BS0448

A
Standard: donor plants

Influence of SNP on seed production of genotype 9BS0448

Influence of SNP on seed production of genotype 1RV6921
Standard: from callus induction

A

Influence of SNP on seed production of genotype 1RV6921
Standard: from callus induction

A

B

Photosynthesis a b a

Wildtype seed derived plants

Transgenic 35s-BnBBM-GR from one seedling protocol b sucrose content

Wildtype seed derived plants

Transgenic 35s-BnBBM-GR from one seedling protocol

A

B

PROMOTING REGENERATION AND TRANSFORMATION IN PLANTS

CROSS-REFERENCE TO RELATED APPLICATIONS

This application is a U.S. National Phase of International Patent Application No. PCT/EP2021/087315, filed on Dec. 22, 2021, which claims priority to European Application No. 20216530.4 filed Dec. 22, 2020. The entire contents of these applications are incorporated herein by reference in their entirety.

SEQUENCE LISTING

The instant application contains a Sequence Listing which has been submitted electronically in ASCII format and is hereby incorporated by reference in its entirety. Said ASCII copy, created on Nov. 21, 2023, is named 245761_000212_SL.txt and is 96,217 bytes in size.

TECHNICAL FIELD

The present invention relates to the technical field of plant regeneration and induction of somatic embryogenesis, preferably in sugar beet and corn. More particularly, the invention provides methods and means for improving callus and shoot formation and regeneration of plants using sodium nitroprusside (SNP).

TECHNICAL BACKGROUND

The ability to regenerate whole plants via tissue culture is a well-described and much applied phenomenon. The most commonly used methods for plant regeneration from somatic cells involve culturing explants on medium containing growth regulators to induce callus formation, followed by organogenesis or embryogenesis from the dedifferentiated callus. Dissecting the phenomenon of in vitro regeneration at the molecular-genetic level has been difficult due to the length of the regeneration process and the many developmental events that take place as explants dedifferentiate and then redifferentiate new tissues and organs. Mutant screens and functional studies have been particularly helpful in identifying proteins that control developmental pathways.

Among the proteins controlling regeneration are those that induce somatic embryogenesis from competent somatic cells. The BABY BOOM (BBM) AP2/ERF domain protein is a seed and root-meristem expressed transcription factor that was identified as marker for embryo development in *Brassica napus* microspore-derived embryo cultures (Boutilier, Kim, et al. ("Ectopic expression of BABY BOOM triggers a conversion from vegetative to embryonic growth." *The Plant Cell* 14.8 (2002): 1737-1749.) The authors describe that BABY BOOM (BBM) showing similarity to the AP2/ERF family of transcription factors and expressed preferentially in developing embryos and seeds is involved in in vitro induction of embryo development from immature pollen grains of *Brassica napus* (microspore embryogenesis). Ectopic expression of BBM in *Arabidopsis* and *Brassica* led to the spontaneous formation of somatic embryos and cotyledon-like structures on transgenic seedlings. Ectopic BBM expression induced additional pleiotropic phenotypes, including neoplastic growth and alterations in leaf and flower morphology.

Florez, Sergio L., et al. ("Enhanced somatic embryogenesis in *Theobroma cacao* using the homologous BABY BOOM transcription factor." *BMC Plant Biology* 15.1 (2015): 121.) describe the use of the transcription factor Baby Boom (BBM) derived from *Theobroma cacao* to promote the transition of somatic cacao cells from the vegetative to embryonic state. While transient ectopic expression of TcBBM provided only moderate enhancements in embryogenic potential, constitutive overexpression dramatically increased somatic embryogenesis proliferation but also appeared to inhibit subsequent development.

Srinivasan, Chinnathambi, et al. ("Heterologous expression of the BABY BOOM AP2/ERF transcription factor enhances the regeneration capacity of tobacco (*Nicotiana tabacum* L.)." *Planta* 225.2 (2007): 341.) examined the effect of ectopic BBM expression on the development and regenerative capacity of tobacco (*Nicotiana tabacum* L.) through heterologous expression of *Arabidopsis* and *B. napus* BBM genes. 35S::BBM tobacco lines exhibited a number of phenotypes including callus formation, leaf rumpling, and sterility, but they did not undergo spontaneous somatic embryogenesis. 35S::BBM plants with severe ectopic expression phenotypes could not be assessed for enhanced regeneration at the seedling stage due to complete male and female sterility of the primary transformants. Therefore fertile BBM ectopic expression lines with strong misexpression phenotypes were generated by expressing a steroid-inducible, post-translationally controlled BBM fusion protein (BBM: GR) under the control of a 35S promoter. These lines exhibited spontaneous shoot and root formation upon the application of DEX, while somatic embryogenesis could be induced from in vitro germinated seedling hypocotyls cultured on media supplemented with cytokinin.

WO2011/003850A1 describes a general method for providing fertile plants via induction of BBM during transformation. Recovery of fertile plants however requires phytohormones like auxins or cytokinins.

Sodium nitroprusside (SNP) is a well-known medication used for example to lower blood pressure. However, in plant biotechnology SNP was also described for plant regeneration. Xu et al. (Effects of sodium nitroprusside on callus induction and shoot regeneration in micropropagated *Dioscorea opposite*; Plant Growth Regulation volume 59, Article number: 279 (2009)) described the effects of sodium nitroprusside on *Dioscorea* opposite callus induction and shoot regeneration. Chin Tan et al. (Effects of sodium nitroprusside on shoot multiplication and regeneration of *Vanilla planifolia* Andrews. In Vitro Cellular & Developmental Biology—Plant volume 49, pages 626-630 (2013)) described effects of a NO donor like sodium nitroprusside (SNP), on shoot multiplication and regeneration of *Vanilla planifolia*. Charu Kalra and Shashi B. Babbar (Nitric oxide promotes in vitro organogenesis in *Linum usitatissimum* L. Plant Cell, Tissue and Organ Culture (PCTOC) volume 103, pages 353-359 (2010)) described the effects of nitric oxide (NO) donors like SNP on caulogenesis, shoot organogenesis and rhizogenesis from hypocotyl explants of *Linum usitatissimum*. Han et al., (Sodium nitroprusside promotes multiplication and regeneration of *Malus hupehensis* in vitro plantlets. Plant Cell, Tissue and Organ Culture volume 96, pages 29-34 (2009)) described the effects of sodium nitroprusside (SNP) on the multiplication, regeneration and rooting of *Malus hupehensis* in tissue culture. Sarropoulou et al., (In vitro plant regeneration from leaf explants of the cherry rootstocks CAB-6P, Gisela 6, and MxM 14 using sodium nitroprusside. In Vitro Cellular & Developmental Biology—

Plant volume 50, pages 226-234 (2014)) described multiplication of *Prunus cerasus* L. rootstocks using tissue culture approaches including SNP which lead to promoted callus induction, in vitro shoot proliferation, and rooting from leaf explants. U.S. Pat. Nos. 7,855,325 & 7,388,126 describe SNP as media component in *agrobacterium*-based corn transformation experiments to increase transformation efficiency.

However, the use of SNP in callus regeneration in sugar beet as well as the use of SNP in combination with BBM-mediated shoot induction has never been described. So far, induction of somatic embryogenesis through BBM transformation has only been described for *Capsicum annuum, Nicotiana tabacum, Arabidopsis thaliana, Brassica napus, Theobroma cacao, Populus tomentosa*, but never for *Beta vulgaris* which belongs to one of the economically most relevant crops. Somatic embryogenesis based transformation was not possible before in *Beta vulgaris* and has a positive impact on the overall timeline for biotech processes in sugar beet.

SUMMARY OF THE INVENTION

In the present invention it was found, that by applying the chemical SNP to plant cells the induction of callus even from recalcitrant genotypes was significantly promoted. SNP was found to have a beneficial effect on the complex mechanism of callus induction, especially for recalcitrant genotypes of sugar beet, corn and spinach. The resulting callus could be regenerated into normal shoots and the produced plants show a normal phenotype. Best results for shoot induction of recalcitrant genotypes were obtained when the effects of SNP and *Brassica napus* BBM (BnBBM) were consecutively combined. BnBBM is capable to promote somatic embryogenesis of *Beta vulgaris, Zea mays* (corn) and *Spinacia oleracea* (spinach). Somatic embryogenesis is achieved in a hormone independent way resulting in fertile plants.

The invention describes nucleotides and methods for the induction of somatic embryogenesis and plant regeneration in e.g. *Beta vulgaris, Zea mays* and *Spinacia oleracea*. The present invention leads to fertile plants without pleiotropic phenotypes, enabling transformation of recalcitrant genotypes, reduction of somaclonal variation and a high frequency of co-transformation. In general, the time needed for plant regeneration is significantly shortened with this method and the quality of the obtained plants is also clearly improved in comparison to other regeneration methods. The high quality of the obtained plants can be of specific value for root features e.g. weight, sucrose content as well as for leaf parameters like photosynthesis.

In particular, the invention is about a genotype independent callus-based regeneration method by using inducible or constitutive expression of BBM in combination with SNP resulting in fertile plants. The transformation rate is dramatically increased. The regeneration of plants is hormone-independent, supporting somatic embryogenesis and avoiding organogenesis (e.g. shoot formation without roots). The time needed for transformation is significantly shortened with this invention.

Thus, according to a first aspect, the invention provides a method of promoting somatic embryogenesis or organogenesis comprising the following steps:
(a) inducing callus formation from at least one plant cell comprising incubating the at least one plant cell in the presence of sodium nitroprusside (SNP), in particular in a medium comprising SNP, and
(b) introducing into the at least one plant cell to be used in step (a) or into the at least one cell of the callus obtained in step (a) an expression cassette comprising a coding nucleotide sequence selected from
 (i) a nucleotide sequence of SEQ ID NO: 1, or a sequence which is at least 80% identical to the sequence of SEQ ID NO: 1; and
 (ii) a nucleotide sequence encoding a polypeptide having the amino acid sequence of SEQ ID NO: 2, or a sequence which is at least 80% identical to the sequence of SEQ ID NO: 2,
wherein the nucleotide sequence is operably linked to a heterologous constitutive regulatory element or a heterologous inducible regulatory element; and
(c) cultivating the callus obtained in step (b) under conditions promoting growth of embryos and/or shoots out of the callus, wherein in the callus the polypeptide is expressed from the expression cassette constitutively or upon induction of the heterologous inducible expression system.

Plant cells suitable for inducing callus in step (a) include embryonic plant cells and somatic plant cells. The plural "plant cells" as used herein must not be understood in that a minimum number of plant cells would be required. In principle, only one plant cell may be sufficient. The way in which these plant cells are provided is not important for the method according to the present invention. Plant cells can be used either in isolated form or as part of a plant tissue. For example, embryonic or somatic plant cells can be provided from an explant isolated from a plant. Either the cells are isolated from the explant or the explant is directly used for the induction of callus tissue.

Which part of a plant is eligible for obtaining an explant depends on the particular plant species. Generally, suitable plant cells can be obtained from hypocotyl, shoot, leaves, buds, flowers and roots of a plant. Preferably, an explant or a part thereof isolated from a plant is used in the method of the invention.

In principle, the present invention is applicable to any plant species, whether monocot or dicot, and even to recalcitrant genotypes. For example, plants which may be subject to the methods and uses of the present invention, can be selected from the group consisting of *Hordeum vulgare, Hordeum bulbusom, Sorghum bicolor, Saccharum officinarium, Zea* spp., including *Zea mays, Setaria italica, Oryza minuta, Oryza sativa, Oryza australiensis, Oryza alta, Triticum aestivum, Triticum durum, Secale cereale*, Triticale, *Malus domestica, Brachypodium distachyon, Hordeum marinum, Aegilops tauschii, Daucus glochidiatus, Beta* spp., including *Beta vulgaris, Daucus pusillus, Daucus muricatus, Daucus carota, Eucalyptus grandis, Nicotiana sylvestris, Nicotiana tomentosiformis, Nicotiana tabacum, Nicotiana benthamiana, Solanum lycopersicum, Solanum tuberosum, Coffea canephora, Vitis vinifera, Erythrante guttata, Genlisea aurea, Cucumis sativus, Marus notabilis, Arabidopsis arenosa, Arabidopsis lyrata, Arabidopsis thaliana, Crucihimalaya himalaica, Crucihimalaya wallichii, Cardamine nexuosa, Lepidium virginicum, Capsella* bursa pastoris, *Olmarabidopsis pumila, Arabis hirsute, Brassica napus, Brassica oleracea, Brassica rapa, Raphanus sativus, Brassica juncacea, Brassica nigra, Eruca vesicaria* subsp. *sativa, Citrus sinensis, Jatropha curcas, Populus trichocarpa, Medicago truncatula, Cicer yamashitae, Cicer bijugum, Cicer arietinum, Cicer reticulatum, Cicer judaicum, Cajanus cajanifolius, Cajanus scarabaeoides, Phaseolus vulgaris, Glycine max, Gossypium* sp., *Astragalus sinicus, Lotus japonicas, Torenia fournieri, Allium cepa, Allium*

*fistulosum, Allium sativum, Helianthus annuus, Helianthus tuberosus* and/or *Allium tuberosum*. Particularly preferred are *Beta vulgaris, Zea mays*, and *Spinacia oleracea*.

For inducing callus formation, the plant cells are incubated in the presence of SNP. In particular, they are cultivated in a medium containing SNP. With SNP as a media component, callus induction is possible even for recalcitrant genotypes. The concentration of SNP in the medium can range from about 10 µM up to about 1 mM. In order to achieve the desired boost of callus formation, the concentration of SNP in the medium is preferably in a range of 10 µM to 100 µM, for example 25 µM to 75 µM. In addition, further additives for the induction of callus tissue can be added which are well known in the art. In principle, any culture medium known in the art can be supplemented with SNP, in particular a medium commonly used for inducing callus formation. Depending on the plant in question, the composition of the medium may vary. In principle, several types of basal salt mixtures can be added to the medium, but preferably, the medium comprises modified Murashige and Skoog (MS) medium, White's medium, or woody plant medium, most preferably MS medium. Previous studies indicate that callus induction is facilitated in the presence of appropriate amounts and concentrations of auxins and cytokinins alone or in combination with each other in MS medium. According to the invention, these components can also be added preferentially to the culture medium. Exemplary auxins include naphthalene acetic acid (NAA), indole-3-acetic acid (IAA) and indole-3-butyric acid (IBA). Exemplary cytokinins include 6-Benzylaminopurine (BAP) and 6-furfurylamino-purine (kinetin).

Incubation in the medium containing SNP is preferably carried out for about 5-10 weeks, more preferably about 6-8 weeks. Short incubation terms in the range of e.g. 5 weeks are found to lead to an increase in the regenerative capacities and longer terms of e.g. 10 weeks do not lead to a reduction in the regenerative capacities either. However, best results are achieved with incubation for about 6-8 weeks.

In a particularly preferred embodiment of the invention, SNP is present in the incubation medium in step (a) but not in the cultivation medium in step (c). This further enhances the regeneration-promoting effect of the invention compared to use of SNP in both incubation step (a) and cultivation step (c). Most preferably, SNP is present only in the incubation medium in step (a) but absent during all other steps.

In step (b) of the method of the present invention, plant cells are modified so that they are able to express a polypeptide derived from *Brassica napus* BBM comprising the amino acid sequence of SEQ ID NO:2 or an amino acid sequence at least 80% identical thereto. A sequence with at least 80% homology may also be a truncated sequence, with truncation preferably occurring at the N-terminus. It was found that truncation at the N-terminus somewhat reduces but does not completely prevent the functionality of BBM for the purposes of the invention and at the same time it brings advantages due to the shorter sequence. The shortening at the N-terminus can, for example, be 1-161 amino acids compared to SEQ ID NO: 2. For example, the N-terminal amino acids 1-161, 1-160, 1-155, or any shorter sub-sections can be deleted.

For modification with BBM, an expression cassette containing a respective coding nucleic acid sequence is inserted directly into the cells to be used in step (a) or into the at least one cell of the callus obtained in step (a). Particularly good results are achieved if first callus tissue is induced in step (a) with SNP as a media component and subsequently in step (b) the obtained callus is transformed with BnBBM. With this two step process, it is possible to obtain shoots even from recalcitrant plant genotypes, for example from *Beta vulgaris, Zea mays* or *Spinacia oleracea*.

The coding nucleotide sequence to be used in step (b) comprises
(i) a nucleotide sequence of SEQ ID NO: 1, or a sequence which is at least 80%, preferably at least 85%, at least 90%, more preferably at least 95%, at least 98% or at least 99% identical to the sequence of SEQ ID NO: 1; or
(ii) a nucleotide sequence encoding a polypeptide having the amino acid sequence of SEQ ID NO: 2, or an amino acid sequence which is at least 80%, preferably at least 85%, at least 90%, more preferably at least 95%, at least 98% or at least 99% identical to the sequence of SEQ ID NO: 2.

The above polynucleotides and polypeptides are referred to as "BnBBM-derived nucleic acids" or "BnBBM-derived polypeptides" for simplicity. However, this does not mean that the compounds are obtained from BnBBM, but only that their sequences are derived from the sequence of BnBBM. The way in which the polynucleotides and polypeptides are obtained is basically not restricted.

An aspect of the invention relates to a method of promoting somatic embryogenesis or organogenesis of a plant, comprising the following steps:
(a) inducing callus formation from at least one plant cell,
(b) introducing into the at least one plant cell to be used in step (a) or into the at least one cell of the callus obtained in step (a) an expression cassette comprising a coding nucleotide sequence selected from
(i) a nucleotide sequence which is compared to SEQ ID NO: 1 truncated at the 5'- and/or 3'-end and is at least 80% identical to the sequence of SEQ ID NO: 1, and
(ii) a nucleotide sequence encoding a polypeptide having an amino acid sequence which is truncated compared to SEQ ID NO: 2, preferably N-terminally truncated, and is at least 80% identical to the sequence of SEQ ID NO: 2,
wherein the nucleotide sequence is operably linked to a heterologous constitutive regulatory element or a heterologous inducible regulatory element; and
(c) cultivating the callus obtained in step (a) under conditions promoting growth of embryos and/or shoots out of the callus, wherein in the callus the polypeptide is expressed from the expression cassette constitutively or upon induction of the heterologous inducible expression system. According to a preferred embodiment step (a) comprises incubating the at least one plant cell in the presence of sodium nitroprusside (SNP), in particular in a medium comprising SNP. Of course, this aspect of the invention may be further characterized by all features disclosed herein with regard to other aspects of the invention.

For the purpose of this invention, the "sequence identity" of two related nucleotide or amino acid sequences, expressed as a percentage, refers to the number of positions in the two optimally aligned sequences, which have identical residues (×100) divided by the number of positions compared. A gap, i.e. a position in an alignment where a residue is present in one sequence but not in the other, is regarded as a position with non-identical residues. The alignment of the two sequences is performed by the Needleman and Wunsch algorithm (Needleman and Wunsch 1970). The computer-assisted sequence alignment above, can be conveniently performed using standard software program such as program NEEDLE as implemented in The European Molecular Biology Open Software Suite (EMBOSS), e.g. version 6.3.1.2 (*Trends in Genetics* 16 (6), 276 (2000)), with its default parameter, e.g. for proteins matrix=EBLOSUM62, gapopen=10.0 and gapextend=0.5.

The coding nucleotide sequence is operably linked to a heterologous constitutive regulatory element or a heterologous inducible regulatory element. The expression "operably linked" means that said elements of the chimeric gene are linked to one another in such a way that their function is coordinated and allows expression of the coding sequence, i.e. they are functionally linked. By way of example, a promoter is functionally linked to another nucleotide sequence when it is capable of ensuring transcription and ultimately expression of said other nucleotide sequence. Two proteins encoding nucleotide sequences are functionally or operably linked to each other if they are connected in such a way that a fusion protein of first and second protein or polypeptide can be formed.

The heterologous constitutive regulatory element is preferably a constitutive promoter. The heterologous inducible regulatory element can be an inducible promoter or an inducible expression system.

The term "inducible promoter" refers to promoters that selectively express a coding sequence or functional RNA in response to the presence of an endogenous or exogenous stimulus, for example by chemical compounds (chemical inducers) or in response to environmental, hormonal, chemical, and/or developmental signals. Inducible promoters include, for example, promoters induced by light, heat, stress, salt stress, osmotic stress, phytohormones, or chemicals such as ethanol, abscisic acid (ABA), jasmonate, salicylic acid, or safeners.

Promoters useful for targeted expression in trangenesis are reviewed in Potenza at al., 2004. Some abiotic stress promoters are the *Arabidospsis thaliana* or *Oryza sativa* DREB genes promoters (Dubouzet et al., 2003; Lee et al., 2004; Pellegrineschi at al., 2004); the *Oryza sativa* SISAP1, CDPK7 or WSI gene promoters (Mukhopadhyay et al., 2004; Saijo et al., 2000; Takahashi at al., 1994) the *A. thaliana* rd29 gene promoters (Yamaguchi-Shinozaki and Shinozaki 1993). Some plant heat inducible promoters may also be used hsp18.2 or hsp101 from *A. thaliana* (Yoshida at al., 1995; Young at al., 2005), hsp17.6 or hsp17.3 from *Glycine max* (Severin and Schoffl, 1990; Saidi at al., 2005). DNA microarrays have been used to identify stress regulated sequences (Rabbani at al., 2003; EP 1 452 596; WO 02/16655) The signalisation pathway of the response to stress includes abscisic acid signalisation so ABA-inducible promoters may also be powerful stress-inducible promoters, such as the *Horgum vulgare* A22 and hva1 promoters (Shen at al., 1993; Straub et al., 1994), *Zea maize* rab 17, DBF1 and DBF2 (Villardel et al., 1990; Kizis and Pages, 2002), *Arabidopsis thaliana* ABF3 (Genbank accession AK175851), and *Oryza sativa* rab21 (Mundy and Chua, 1988).

Some examples of couples of chemically inducible expression systems and chemical inducer used in plants are, the alcA promoter from *A. nidulans*, inducible by the Ethanol (Roslan at al., 2001) or the ecdysone receptor from *C. fumiferana*, inducible by an ecdysone agonist (Koo at al., 2004).

In another embodiment, expression of the polypeptide from the coding nucleotide sequence is indirectly induced by a chemical. As an illustration, one can use the GVG gene, which codes for a modified rat glucocorticoid responsive transcription factor that remains in the plant cytosol as a complex. On dexamethasone application, this complex dissociates such that the GVG protein enters the nucleus and binds to the target DNA sequences (UAS). Transcription from the UAS promoter allows the production of the polypeptide. This is considered as a dexamethasone inducible (although indirectly) promoter used to control the polypeptide expression (Aoyama and Chua (1997)). In this case, application of dexamethosone will induce both the expression of the polypeptide and its activity. Preferably, the inducible expression system is selected from an ecdysone or a dexamethasone based expression system.

A gene is said to be expressed when it leads to the formation of an expression product. An expression product denotes an intermediate or end product arising from the transcription and optionally translation of the nucleic acid, DNA or RNA, coding for such product, e. g. the second nucleic acid described herein. During the transcription process, a DNA sequence under control of regulatory regions, particularly the promoter, is transcribed into an RNA molecule. An RNA molecule may either itself form an expression product or be an intermediate product when it is capable of being translated into a peptide or protein. A gene is said to encode an RNA molecule as expression product when the RNA as the end product of the expression of the gene is, e.g., capable of interacting with another nucleic acid or protein. Examples of RNA expression products include inhibitory RNA such as e.g. sense RNA (co-suppression), antisense RNA, ribozymes, miRNA or siRNA, mRNA, rRNA and tRNA. A gene is said to encode a protein as expression product when the end product of the expression of the gene is a protein or peptide.

A nucleic acid (molecule) or nucleotide (sequence) or polynucleotide, as used herein, refers to both DNA and RNA. DNA also includes cDNA and genomic DNA. A nucleic acid molecule can be single- or double-stranded, and can be synthesized chemically or produced by biological expression in vitro or even in vivo.

It will be clear that whenever nucleotide sequences of RNA molecules are defined by reference to nucleotide sequence of corresponding DNA molecules, the thymine (T) in the nucleotide sequence should be replaced by uracil (U). Whether reference is made to RNA or DNA molecules will be clear from the context of the application.

As used herein "comprising" or the like is to be interpreted as specifying the presence of the stated features, integers, steps or components as referred to, but does not preclude the presence or addition of one or more features, integers, steps or components, or groups thereof. Thus, e.g., a nucleic acid or protein comprising a sequence of nucleotides or amino acids, may comprise more nucleotides or amino acids than the actually cited ones, i.e., be embedded in a larger nucleic acid or protein. A chimeric gene comprising a DNA region which is functionally or structurally defined may comprise additional DNA regions etc.

In step (b), an expression cassette comprising a coding nucleotide sequence is introduced into the at least one plant cell to be used in step (a) or into the at least one cell of the callus obtained in step (a). Step (b) of introducing into a plant cell the expression cassette comprising a coding nucleotide sequence may result in a stable integration thereof into the genome of the plant cell or a progeny cell thereof. Alternatively, introducing into a plant cell the expression cassette may result in a transient occurrence of the encoded polypeptide in the plant cell or in a progeny cell thereof. In terms of the invention, "transient transformation" means that the inserted sequence is not (stably) integrated into the genome of the plant cell. According to the invention, a stable integration into the genome is preferred.

Introducing the expression cassette can be carried out by any means. A number of methods is available to transfer nucleic acids of interest into plant cells. An exemplary vector mediated method is *Agrobacterium*-mediated transformation, as described, for example, by Lindsay & Gallois, 1990, Journal of Experimental Botany, and Kischenko et al., 2005, Cell Biology International for sugar beet, or by Ishida et al., 2007, ("*Agrobacterium*-mediated transformation of maize." *Nature protocols,* 2 (7), 1614-1621) for corn. Other suitable techniques include particle bombardment and electroporation.

In step (c), cultivation takes place under conditions in which the polypeptide is expressed. Cultivating is preferably carried out in a medium free of plant hormones.

The term "plant hormone" is to be understood herein as a chemical that influences the growth and development of plant cells and tissues. Plant growth hormones comprise chemicals from the following five groups: auxins, cytokinins, gibberellins, abscisic acid (ABA) and ethylene. In addition to the five main groups, two other classes of chemical are often regarded as plant growth regulators: brassinosteroids and polyamines. For the induction of regeneration in plant tissues, a combination of one or more cytokinins and one or more auxins is usually employed. According to the invention, however, plant hormones are preferably not used in the culturing step (c). It was found, that in the absence of plant hormones in the medium, negative side-effects on plant development (e.g. somaclonal variation) are reduced. Hence, the complexity of adjusting medium components to different genotypes is also reduced.

Additionally, it was found that the absence of plant hormones in step (c) promotes the formation of somatic embryos instead of shoots. Thus, in a preferred embodiment, embryos are directly grown from the callus tissue in step (c). Accordingly, a tedious rooting procedure is avoided and hence the time to go to the green house is shortened.

The enhanced somatic embryo formation by using BnBBM in a hormone free transformation-leading to plant development without obvious phenotypes-allows fast validation of trait candidate genes especially for root traits and root tissue specific promoters. It can also be combined with co-delivery of other genetic elements and the application of the genome editing technology. Furthermore, somaclonal variation might be reduced if no hormones like 2,4D are used, especially when the callus tissue is cultured for a longer time period.

A remarkable time saving is the second improvement for plant transformation. In the described approach T0 plants can be directly used for different kind of analyses, whereas normally T1 plants are used in conventional transformation methods for such analyses. This is necessary since the conventional T0 plants produced via organogenesis have an obvious phenotype with not forming proper tap roots, the specific storage organ of sugar beet.

Due to the usage of the T0 plants in the described invention up to 2.5 years can be saved for the above-mentioned analyses processes.

Due to the increased regenerative capacities of plant material with inducible as well as constitutive expression of a BnBBM-derived polypeptide as described above, also the efficiency of co-delivery of other genetic elements (e.g. genetic engineering components) is enhanced. More transgenic or modified plants can be obtained and otherwise non-transformable genotypes can be transformed or edited. Thus, according to another aspect of the invention, the combined beneficial effects of SNP and the BnBBM-derived polypeptide as described above can be exploited in methods of producing transgenic plants as well as in methods for producing genetically modified/edited plants. It was found, that in recalcitrant plant species or plant genotypes, transformation efficiency can be improved by carrying out callus induction in the presence of SNP and introducing a BnBBM-derived polypeptide as described above. The increased regenerative capacities of plant tissue with inducible as well as constitutive expression of the BnBBM-derived polypeptide leads also to a more efficient co-transformation rate which is for example important for the delivery of genome editing components. This has been successfully demonstrated by obtaining SDN 1 events. The regeneration of plants from modified plant cells that have been transformed or gene edited and possibly have a modified genome is significantly improved when a BnBBM-derived polypeptide as defined herein is present in the step of cultivating callus tissue. Further, the approach of the invention enables a remarkable time saving which is particularly pronounced when creating edited *Beta vulgaris* hybrids. Up to 6-7 years may be saved, since the editing event can be produced directly within the two parental lines of the final hybrid, instead of introducing the necessary modification in an amenable genotype for transformation first and afterwards bringing it to the parental lines of a specific hybrid via time consuming crossing and breeding steps.

According to this embodiment, the method further comprises a step of (d1) introducing at least one nucleotide sequence of interest into the at least one plant cell or a predecessor thereof to be used in step (b), or into at least one cell of the callus obtained in step (a) which itself or a progeny thereof is then to be used in step (b) or has been used in step (b), and/or (d2) modifying the genome of the at least one plant cell or a predecessor thereof to be used in step (a), or of the at least one cell of the callus obtained in step (a) which itself or a progeny thereof is then to be used in step (b) or has been used in step (b), by introducing into said cell a single stranded DNA break (SSB) inducing enzyme or a double stranded DNA break (DSB) inducing enzyme which preferably recognizes a predetermined site in the genome of said cell, and optionally a repair nucleic acid molecule, or a single stranded DNA break (SSB) inducing enzyme which preferably recognizes a predetermined site in the genome of said cell and is fused to a base editor enzyme, wherein the modification of said genome is selected from I. a replacement of at least one nucleotide;
II. a deletion of at least one nucleotide;
III. an insertion of at least one nucleotide; or
IV. any combination of I.-III.

Step (d1) of introducing the at least one nucleotide sequence of interest can be performed using any suitable method commonly known in the art. A number of methods is available to transfer nucleic acids of interest into plant cells. An exemplary vector mediated method is *Agrobacterium*-mediated transformation, as described, for example, by Lindsay & Gallois, 1990, Journal of Experimental Botany, and Kischenko et al., 2005, Cell Biology International for sugar beet, or by Ishida et al., 2007, ("*Agrobacterium*-mediated transformation of maize." *Nature protocols,* 2 (7), 1614-1621) for corn. Other suitable techniques include particle bombardment and electroporation.

The nucleotide sequence of interest according to the invention may be a DNA or RNA sequence, e.g. mRNA, siRNA, miRNA etc. More particularly, the nucleotide sequence of interest encodes at least one phenotypic trait. Preferably, the phenotypic trait conferred by the DNA or RNA can be selected from the group consisting of resistance/tolerance to biotic stress, including pathogen resistance/tolerance, wherein the pathogen can be a virus, bacterial, fungal or animal pathogen, resistance/tolerance to abiotic stress including chilling resistance/tolerance, drought stress resistance/tolerance, osmotic resistance/tolerance, heat stress resistance/tolerance, cold or frost stress resistance/tolerance, oxidative stress resistance/tolerance, heavy metal stress resistance/tolerance, salt stress or water logging resistance/tolerance, lodging resistance/tolerance, shattering resistance/tolerance, or resistance/tolerance against one or more herbicides like glyphosate, glufosinate, 2,4-D, Dicamba, ALS inhibitors et cetera. The at least one phenotypic trait of interest can also be selected from the group consisting of the modification of a further agronomic trait of interest including yield increase, flowering time modification, seed color modification, endosperm composition modification, nutritional content modification or metabolic engineering of a pathway of interest.

According to one embodiment of the invention, step (d1) of introducing the at least one nucleotide sequence of interest yields in transient transformation of the plant cell. In another embodiment, a stable transformation is effected, wherein the nucleotide sequence of interest in step (d1) is inserted into the genome of the plant cell.

In step (d2), modifying the genome of the plant cell can be accomplished by means of a single stranded DNA break (SSB) or double stranded DNA break (DSB) inducing enzyme or a base editor enzyme which preferably recognizes a predetermined site in the genome of said cell.

As used herein, a "double-stranded DNA break inducing enzyme" or "DSBI enzyme" is an enzyme capable of inducing a double-stranded DNA break at a particular nucleotide sequence, called the "recognition site". Accordingly, a "single-stranded DNA or RNA break inducing enzyme" or "SSBI enzyme" is an enzyme capable of inducing a single-stranded DNA or RNA break at a particular nucleotide sequence.

In order to enable a break at a predetermined target site, the enzymes preferably include a binding domain and a cleavage domain. Particular enzymes capable of inducing double or single-stranded breaks are nucleases as well as variants thereof, no longer comprising a nuclease function but rather operating as recognition molecules in combination with another enzyme. In recent years, many suitable nucleases, especially tailored endonucleases have been developed comprising meganucleases, zinc finger nucleases, TALE nucleases, Argonaute nucleases, derived, for example, from Natronobacterium gregoryi, and CRISPR nucleases, comprising, for example, Cas, Cpf1, CasX or CasY nucleases as part of the Clustered Regularly Interspaced Short Palindromic Repeats (CRISPR) system. Thus, in a preferred aspect of the invention, the DSB or SSB inducing enzyme is selected from CRISPR systems like CRISPR/Cas9, CRISPR/Cpf1, CRISPR/CasX, CRISPR/CasY, CRISPR/Csm1 or CRISPR/MAD7, preferably a CRISPR/Cas9 endonuclease, a CRISPR/MAD7 endonuclease or a CRISPR/Cpf1 endonuclease, a zinc finger nuclease (ZFN), a homing endonuclease, a meganuclease and a TAL effector nuclease.

Rare-cleaving endonucleases are enzymes that have a recognition site of preferably about 14 to 70 consecutive nucleotides, and therefore have a very low frequency of cleaving, even in larger genomes such as most plant genomes. Homing endonucleases, also called meganucleases, constitute a family of such rare-cleaving endonucleases. They may be encoded by introns, independent genes or intervening sequences, and present striking structural and functional properties that distinguish them from the more classical restriction enzymes, usually from bacterial restriction-modification Type II systems. Their recognition sites have a general asymmetry which contrast to the characteristic dyad symmetry of most restriction enzyme recognition sites. Several homing endonucleases encoded by introns or inteins have been shown to promote the homing of their respective genetic elements into allelic intronless or inteinless sites. By making a site-specific double strand break in the intronless or inteinless alleles, these nucleases create recombinogenic ends, which engage in a gene conversion process that duplicates the coding sequence and leads to the insertion of an intron or an intervening sequence at the DNA level. A list of other rare cleaving meganucleases and their respective recognition sites is provided in Table I of WO 03/004659 (pages 17 to 20) (incorporated herein by reference).

Furthermore, methods are available to design custom-tailored rare-cleaving endonucleases that recognize basically any target nucleotide sequence of choice. Briefly, chimeric restriction enzymes can be prepared using hybrids between a zinc-finger domain designed to recognize a specific nucleotide sequence and the non-specific DNA-cleavage domain from a natural restriction enzyme, such as FokI. Such methods have been described e.g. in WO 03/080809, WO 94/18313 or WO 95/09233 and in Isalan et al. (2001). A rapid, generally applicable method to engineer zinc fingers illustrated by targeting the HIV-1 promoter. *Nature biotechnology*, 19 (7), 656; Liu et al. (1997). Design of polydactyl zinc-finger proteins for unique addressing within complex genomes. *Proceedings of the National Academy of Sciences*, 94 (11), 5525-5530).

Another example of custom-designed endonucleases includes the TALE nucleases (TALENs), which are based on transcription activator-like effectors (TALEs) from the bacterial genus *Xanthomonas* fused to the catalytic domain of a nuclease (e.g. FokI or a variant thereof). The DNA binding specificity of these TALEs is defined by repeat-variable di-residues (RVDs) of tandem-arranged 34/35-amino acid repeat units, such that one RVD specifically recognizes one nucleotide in the target DNA. The repeat units can be assembled to recognize basically any target sequences and fused to a catalytic domain of a nuclease create sequence specific endonucleases (see e.g. Boch et al. (2009). Breaking the code of DNA binding specificity of TAL-type III effectors. *Science*, 326 (5959), 1509-1512; Moscou & Bogdanove (2009). A simple cipher governs DNA recognition by TAL effectors. *Science*, 326 (5959), 1501-1501; and WO 2010/079430, WO 2011/072246, WO 2011/154393, WO 2011/146121, WO 2012/001527, WO 2012/093833, WO 2012/104729, WO 2012/138927, WO 2012/138939). WO 2012/138927 further describes monomeric (compact) TALENs and TALEs with various catalytic domains and combinations thereof.

Recently, a new type of customizable endonuclease system has been described; the so-called CRISPR/Cas system. A CRISPR system in its natural environment describes a molecular complex comprising at least one small and individual non-coding RNA in combination with a Cas nuclease or another CRISPR nuclease like a Cpf1 nuclease (Zetsche et al., "Cpf1 Is a Single RNA-Guides Endonuclease of a Class 2 CRISPR-Cas System", Cell, 163, pp. 1-13, October 2015) which can produce a specific DNA double-stranded break. Presently, CRISPR systems are categorized into 2 classes comprising five types of CRISPR systems, the type II system, for instance, using Cas9 as effector and the type V system using Cpf1 as effector molecule (Makarova et al., Nature Rev. Microbiol., 2015). In artificial CRISPR systems, a synthetic non-coding RNA and a CRISPR nuclease and/or optionally a modified CRISPR nuclease, modified to act as nickase or lacking any nuclease function, can be used in combination with at least one synthetic or artificial guide RNA or gRNA combining the function of a crRNA and/or a tracrRNA (Makarova et al., 2015, supra). The immune response mediated by CRISPR/Cas in natural systems requires CRISPR-RNA (crRNA), wherein the maturation of this guiding RNA, which controls the specific activation of the CRISPR nuclease, varies significantly between the various CRISPR systems, which have been characterized so far. Firstly, the invading DNA, also known as a spacer, is integrated between two adjacent repeat regions at the proximal end of the CRISPR locus. Type II CRISPR systems code for a Cas9 nuclease as key enzyme for the interference step, which system contains both a crRNA, and also a trans-activating RNA (tracrRNA) as the guide motif. These hybridize and form double-stranded (ds) RNA regions, which are recognized by RNAseIII and can be cleaved in order to form mature crRNAs. These then in turn associate with the Cas molecule in order to direct the nuclease specifically to the target nucleic acid region. Recombinant gRNA molecules can comprise both the variable DNA recognition region and also the Cas interaction region and thus can be specifically designed, independently of the specific target nucleic acid and the desired Cas nuclease. As a further safety mechanism, PAMs (protospacer adjacent motifs) must be present in the target nucleic acid region; these are DNA sequences, which follow on directly from the Cas9/RNA complex-recognized DNA. The PAM sequence for the Cas9 from *Streptococcus pyogenes* has been described to be "NGG" or "NAG" (Standard IUPAC nucleotide code) (Jinek et al, "A programmable dual-RNA-guided DNA endonuclease in adaptive bacterial immunity", Science 2012, 337:816-821). The PAM sequence for Cas9 from *Staphylococcus aureus* is "NNGRRT" or "NNGRR (N)". Further variant CRISPR/Cas9 systems are known. Thus, a *Neisseria meningitidis* Cas9 cleaves at the PAM sequence NNNNGATT. A *Streptococcus thermophilus* Cas9 cleaves at the PAM sequence NNAGAAW. Recently, a further PAM motif NNNNRYAC has been described for a CRISPR system of *Campylobacter* (WO 2016/021973 A1). For Cpf1 nucleases it has been described that the Cpf1-crRNA complex, without a tracrRNA, efficiently recognize and cleave target DNA proceeded by a short T-rich PAM in contrast to the commonly G-rich PAMs recognized by Cas9 systems (Zetsche et al., supra). Furthermore, by using modified CRISPR polypeptides, specific single-stranded breaks can be obtained. The combined use of Cas nickases with various recombinant gRNAs can also induce highly specific DNA double-stranded breaks by means of double DNA nicking. By using two gRNAs, moreover, the specificity of the DNA binding and thus the DNA cleavage can be optimized. Further CRISPR effectors like CasX and CasY effectors originally described for bacteria, are meanwhile available and represent further effectors, which can be used for genome engineering purposes (Burstein et al., "New CRISPR-Cas systems from uncultivated microbes", Nature, 2017, 542, 237-241).

The cleavage site of a DSBI/SSBI enzyme relates to the exact location on the DNA or RNA where the double-stranded break is induced. The cleavage site may or may not be comprised in (overlap with) the recognition site of the DSBI/SSBI enzyme and hence it is said that the cleavage site of a DSBI/SSBI enzyme is located at or near its recognition site. The recognition site of a DSBI/SSBI enzyme, also sometimes referred to as binding site, is the nucleotide sequence that is (specifically) recognized by the DSBI/SSBI enzyme and determines its binding specificity. For example, a TALEN or ZNF monomer has a recognition site that is determined by their RVD repeats or ZF repeats respectively, whereas its cleavage site is determined by its nuclease domain (e.g. FokI) and is usually located outside the recognition site. In case of dimeric TALENs or ZFNs, the cleavage site is located between the two recognition/binding sites of the respective monomers, this intervening DNA or RNA region where cleavage occurs being referred to as the spacer region.

A person skilled in the art would be able to either choose a DSBI/SSBI enzyme recognizing a certain recognition site and inducing a DSB or SSB at a cleavage site at or in the vicinity of the preselected/predetermined site or engineer such a DSBI/SSBI enzyme. Alternatively, a DSBI/SSBI enzyme recognition site may be introduced into the target genome using any conventional transformation method or by crossing with an organism having a DSBI/SSBI enzyme recognition site in its genome, and any desired nucleic acid may afterwards be introduced at or in the vicinity of the cleavage site of that DSBI/SSBI enzyme.

A "base editor enzyme" or "base editor" as used herein refers to a protein or a fragment thereof having the same catalytical activity as the protein it is derived from, which protein or fragment thereof, alone or when provided as molecular complex, referred to as base editing complex herein, has the capacity to mediate a targeted base modification, i.e., the conversion of a base of interest resulting in a point mutation of interest which in turn can result in a targeted mutation, if the base conversion does not cause a silent mutation, but rather a conversion of an amino acid encoded by the codon comprising the position to be converted with the base editor. Preferably, the at least one base editor according to the present invention is temporarily or permanently linked to at least one site-specific effector, or optionally to a component of at least one site-specific effector complex. The linkage can be covalent and/or non-covalent.

Any base editor or site-specific effector, or a catalytically active fragment thereof, or any component of a base editor complex or of a site-specific effector complex as disclosed herein can be introduced into a cell as a nucleic acid fragment, the nucleic acid fragment representing or encoding a DNA, RNA or protein effector, or it can be introduced as DNA, RNA and/or protein, or any combination thereof.

There are two major and distinct pathways to repair breaks-homologous recombination and non-homologous end-joining (NHEJ). Homologous recombination requires the presence of a homologous sequence as a template (e.g., "donor") to guide the cellular repair process and the results of the repair are error-free and predictable. In the absence of a template (or "donor") sequence for homologous recombination, the cell typically attempts to repair the break via the process of non-homologous end-joining (NHEJ).

In a particularly preferred aspect of this embodiment, a repair nucleic acid molecule is additionally introduced into the plant cell. As used herein, a "repair nucleic acid molecule" is a single-stranded or double-stranded DNA molecule or RNA molecule that is used as a template for modification of the genomic DNA at the preselected site in the vicinity of or at the cleavage site. As used herein, "use as a template for modification of the genomic DNA", means that the repair nucleic acid molecule is copied or integrated at the preselected site by homologous recombination between the flanking region(s) and the corresponding homology region(s) in the target genome flanking the preselected site, optionally in combination with non-homologous end-joining (NHEJ) at one of the two end of the repair nucleic acid molecule (e.g. in case there is only one flanking region). Integration by homologous recombination will allow precise joining of the repair nucleic acid molecule to the target genome up to the nucleotide level, while NHEJ may result in small insertions/deletions at the junction between the repair nucleic acid molecule and genomic DNA.

As used herein, "a modification of the genome", means that the genome has changed by at least one nucleotide. This can occur by replacement of at least one nucleotide and/or a deletion of at least one nucleotide and/or an insertion of at least one nucleotide, as long as it results in a total change of at least one nucleotide compared to the nucleotide sequence of the preselected genomic target site before modification, thereby allowing the identification of the modification, e.g. by techniques such as sequencing or PCR analysis and the like, of which the skilled person will be well aware.

As used herein "a preselected site", "a predetermined site" or "predefined site" indicates a particular nucleotide sequence in the genome (e.g. the nuclear genome or the chloroplast genome) at which location it is desired to insert, replace and/or delete one or more nucleotides. This can e.g. be an endogenous locus or a particular nucleotide sequence in or linked to a previously introduced foreign DNA or transgene. The preselected site can be a particular nucleotide position at (after) which it is intended to make an insertion of one or more nucleotides. The preselected site can also comprise a sequence of one or more nucleotides, which are to be exchanged (replaced) or deleted.

As used in the context of the present application, the term "about" means +/−10% of the recited value, preferably +/−5% of the recited value. For example, about 100 nucleotides (nt) shall be understood as a value between 90 and 110 nt, preferably between 95 and 105.

As used herein, a "flanking region", is a region of the repair nucleic acid molecule having a nucleotide sequence which is homologous to the nucleotide sequence of the DNA region flanking (i.e. upstream or downstream) of the preselected site. It will be clear that the length and percentage sequence identity of the flanking regions should be chosen such as to enable homologous recombination between said flanking regions and their corresponding DNA region upstream or downstream of the preselected site. The DNA region or regions flanking the preselected site having homology to the flanking DNA region or regions of the repair nucleic acid molecule are also referred to as the homology region or regions in the genomic DNA.

To have sufficient homology for recombination, the flanking DNA regions of the repair nucleic acid molecule may vary in length, and should be at least about 10 nt, about 15 nt, about 20 nt, about 25 nt, about 30 nt, about 40 nt or about 50 nt in length. However, the flanking region may be as long as is practically possible (e.g. up to about 100-150 kb such as complete bacterial artificial chromosomes (BACs). Preferably, the flanking region will be about 50 nt to about 2000 nt, e.g. about 100 nt, 200 nt, 500 nt or 1000 nt. Moreover, the regions flanking the DNA of interest need not be identical to the homology regions (the DNA regions flanking the preselected site) and may have between about 80% to about 100% sequence identity, preferably about 95% to about 100% sequence identity with the DNA regions flanking the preselected site. The longer the flanking region, the less stringent the requirement for homology. Furthermore, to achieve exchange of the target DNA sequence at the preselected site without changing the DNA sequence of the adjacent DNA sequences, the flanking DNA sequences should preferably be identical to the upstream and downstream DNA regions flanking the preselected site.

As used herein, "upstream" indicates a location on a nucleic acid molecule, which is nearer to the 5' end of said nucleic acid molecule. Likewise, the term "downstream" refers to a location on a nucleic acid molecule which is nearer to the 3' end of said nucleic acid molecule. For avoidance of doubt, nucleic acid molecules and their sequences are typically represented in their 5' to 3' direction (left to right).

In order to target sequence modification at the preselected site, the flanking regions must be chosen so that 3' end of the upstream flanking region and/or the 5' end of the downstream flanking region align(s) with the ends of the predefined site. As such, the 3' end of the upstream flanking region determines the 5' end of the predefined site, while the 5' end of the downstream flanking region determines the 3' end of the predefined site.

As used herein, said preselected site being located outside or away from said cleavage (and/or recognition) site, means that the site at which it is intended to make the genomic modification (the preselected site) does not comprise the cleavage site and/or recognition site of the DSBI/SSBI enzyme or the base editor enzyme, i.e. the preselected site does not overlap with the cleavage (and/or recognition) site. Outside/away from in this respect thus means upstream or downstream of the cleavage (and/or recognition) site.

In the present invention it was found that BnBBM enhances somatic embryo formation in plant transformation and leads to plants with high quality, comparable to plants grown from seeds. The high quality of the obtained plants had been verified by the absence of obvious visible phenotypes but also experimentally for root features e.g. weight, sucrose content as well as for leaf parameters like photosynthesis. Such an increased plant quality was observed after *Agrobacterium*-based transformation as well as biolistic transformation methods in combination with BnBBM induced somatic embryogenesis.

The enhanced somatic embryo formation by using BnBBM in a hormone free transformation—leading to plant development without obvious phenotypes—allows fast validation of trait candidate genes especially for root traits and root tissue specific promoters, furthermore it could also be combined with the application of the genome editing technology.

A remarkable time saving is the second improvement for plant transformation. In the described approach T0 plants can be directly used for different kind of analyses, whereas normally T1 plants are used in conventional transformation methods to do such analyses. This is necessary since the conventional T0 plants produced via organogenesis have an obvious phenotype with not forming proper tap roots, the specific storage organ of sugar beet.

Due to the usage of the T0 plants in the described invention up to 2.5 years can be saved for the above-mentioned analyses processes. Moreover, there is also the possibility of transient genome editing in plants when using T0 plants. Accordingly, such a plant analysis at the T0 level represents a preferred embodiment of the present invention.

The time savings for creating genetically engineered *Beta vulgaris* hybrids are even higher. Up to 6-7 years might be saved, since instead of generating edits in many parental lines of monogerm, edits could directly be generated in the parents for producing the hybrids (FIG. 29). Further improvements of this invention are a less somaclonal variation in plants obtained from this method and a significant increase of seed production of transgenic plants. This is often a major problem, in particular for *Beta vulgaris* plants, and leads to strong limitation regarding usability of different lines.

A further aspect of the invention is drawn to a method for the production of a plant. It was found, that using the above described methods of somatic embryogenesis and organogenesis, whole plants can be produced even for recalcitrant plant species or plant genotypes. Further, it was found that with the present invention, the resulting plants show no pleiotropic phenotype.

Accordingly, the invention provides a method for producing a plant comprising somatic embryogenesis or organogenesis as described above with reference to steps (a) and (b), optionally transformation or genomic modification as described above with reference to steps (d1) and (d2), and regenerating a plant from an embryo and/or a shoot resulting from step (c) of the above disclosed method, in particular a transgenic plant resulting from step (d1) and/or a modified plant resulting from step (d2).

Preferably, the conditions of somatic embryogenesis are chosen so that embryos are formed directly. This can be achieved as described above, for example by carrying out the cultivation in a medium free of plant hormones. From the shoots derived from somatic embryogenesis in hormone free medium, seedlings are grown having natural roots instead of the adventitious roots that are artificially induced from in vitro shoots which allows physiological analysis already at the T0 level. Moreover, the quality of obtained plants is clearly better compared to plants generated with published protocols. This is leading to an enormous time and cost saving due to reduced tissue culture work in comparison with the state of the art. Accordingly, such a physiological analysis at the T0 level represents a preferred embodiment of the present invention.

Subject matter of the present invention are also the plants that are obtained or obtainable by the methods described above. Accordingly, one embodiment of the invention is a transgenic plant obtained or obtainable by the above method of transforming a plant cell and producing a plant, as well as progeny plant or parts thereof, wherein the progeny or the part comprises the at least one nucleotide sequence of interest as transgene.

Another embodiment of the invention is a genetically modified plant obtained or obtainable by the above method of modifying the genome of a plant cell and producing a plant (claim 12) as well as progeny plants or parts thereof, wherein the progeny or the part comprises the modification in the genome introduced by the above method of modification.

Further subject matter of the present invention is a plant cell or a seed derived from the above transgenic plant or genetically modified plant. Such a plant cell preferably comprises a polynucleotide encoding a BnBBM-derived polypeptide transiently or stably integrated and a single-stranded DNA break (SSB)- or double-stranded DNA break (DSB)-inducing enzyme or base editor enzyme, which preferably recognizes a predetermined site in the genome of said cell and optionally a repair nucleic acid molecule. The polynucleotide encoding the BnBBM-derived polypeptide is preferably operably linked to a suitable regulatory sequence so that the plant cell is capable of expressing the BnBBM-derived polypeptide. A regulatory sequence means, for example, a "promoter" which refers to a nucleotide sequence, usually upstream (5') to its coding sequence, which controls the expression of the coding sequence by providing the recognition for RNA polymerase and other factors required for proper transcription. "Constitutive promoter" refers to promoters that direct gene expression in nearly all tissues and at all times. Examples of constitutive promoters include CaMV 35S promoter, double CaMV 35S promoter (70S promoter), nopaline synthase (nos) promoter, BdEF1 promoter, or ubiquitin promoters like PcUbi4 or ZmUbi1. "Regulated promoter" refers to promoters that direct gene expression not constitutively but in a temporally and/or spatially regulated manner and include both tissue-specific and inducible promoters. It includes natural and synthetic sequences as well as sequences, which may be a combination of synthetic and natural sequences. Different promoters may direct the expression of a gene in different tissues or cell types, or at different stages of development, or in response to different environmental conditions. New promoters of various types useful in plant cells are constantly being discovered and are well-known to a person skilled in the art. "Tissue-specific promoter" refers to regulated promoters that are not expressed in all plant cells but only in one or more cell types in specific organs (such as leaves or seeds), specific tissues (such as embryo or cotyledon), or specific cell types (such as leaf parenchyma or seed storage cells). These also include promoters that are temporally regulated (such as in early or late embryogenesis), during fruit ripening in developing seeds or fruit, in fully differentiated leaf, or at the onset of senescence. "Inducible promoter" refers to those regulated promoters that can be turned on in one or more cell types by an external stimulus (such as a chemical, light, hormone, stress, or pathogen). Examples for inducible promoter are promoters inducible by ecdysone, dexamethasone, ethanol. Such promoters are well known from the state of the art (e.g., Samalova et al. (2005). pOp6/LhGR: a stringently regulated and highly responsive dexamethasone-inducible gene expression system for tobacco. *The Plant Journal,* 41 (6), 919-935; Gatz & Lenk (1998). Promoters that respond to chemical inducers. *Trends in Plant Science,* 3 (9), 352-358).

Another subject matter of the present invention is a plant cell comprising a polynucleotide encoding a BnBBM-derived polypeptide transiently or stable integrated, and a single-stranded DNA break (SSB) or double stranded DNA break (DSB) inducing enzyme or base editor enzyme which preferably recognize a predetermined site in the genome of said cell, and optionally a repair nucleic acid molecule, wherein preferably the polynucleotide encoding the BnBBM-derived polypeptide being operatively linked to a suitable regulatory sequence, so that the plant cell is capable of expressing the polypeptide. Such plant cell can be obtained when conducting the above described method for modifying the genome of a plant cell.

Another aspect of the invention is the use of SNP in combination with a nucleic acid encoding a BnBBM-derived polypeptide as described above in a method for somatic embryogenesis or organogenesis and/or plant regeneration from callus. In particular, the invention discloses the use of SNP in combination with a nucleic acid comprising a coding nucleotide sequence selected from (i) a nucleotide sequence of SEQ ID NO: 1, or a sequence which is at least 80% identical to the sequence of SEQ ID NO: 1; and (ii) a nucleotide sequence encoding a polypeptide having the amino acid sequence of SEQ ID NO: 2, or an amino acid sequence which is at least 80% identical to the sequence of SEQ ID NO: 2 in a method for somatic embryogenesis or organogenesis and/or plant regeneration of *Beta vulgaris, Zea mays* or *Spinacia oleracea* from callus;

in a method for direct or indirect regeneration of a *Beta vulgaris* plant, *Zea mays* plant or *Spinacia oleracea* plant;

in a method of transformation of a *Beta vulgaris, Zea mays* or *Spinacia oleracea* plant cell; or in a method of modifying the genome of a *Beta vulgaris, Zea mays* or *Spinacia oleracea* plant cell.

According to a further aspect of the invention, the activity of SNP and a BnBBM-derived polypeptide in the above described methods and uses can be combined with a polynucleotide encoding a WUS2 polypeptide, mRNA encoding a WUS2 polypeptide, or WUS2 polypeptide(s). Particularly preferred is *Zea mays* WUS2 (ZmWUS2; cDNA: SEQ ID NO: 12; protein: SEQ ID NO: 13).

Accordingly, in addition to introducing an expression cassette comprising a polynucleotide encoding a BBM-derived polypeptide, the approach of the invention according to this aspect further provides for introducing an expression cassette comprising a polynucleotide encoding a WUS2 polypeptide, mRNA encoding a WUS2 polypeptide, or WUS2 polypeptide(s) into the at least one plant cell concerned. The polynucleotide encoding a WUS2 polypeptide can be integrated into the same expression cassette and operably linked to the same regulatory elements as the BnBBM-derived polynucleotide.

WUS2 can be provided to the at least one plant cell concerned as an expression cassette comprising a second coding nucleotide sequence
  (i) having a nucleotide sequence of SEQ ID NO: 12, or a sequence which is at least 80% identical to the sequence of SEQ ID NO: 12; or
  (ii) encoding a polypeptide having the amino acid sequence of SEQ ID NO: 13, or a sequence which is at least 80% identical to the sequence of SEQ ID NO: 13,
  wherein the second nucleotide sequence is operably linked to a heterologous regulatory element.

Further, WUS2 can be provided to the at least one plant cell as an mRNA encoding a polypeptide having the amino acid sequence of SEQ ID NO: 13, or a sequence, which is at least 80% identical to the sequence of SEQ ID NO: 13.

WUS2 can also be introduced into the at least one plant cell as a polypeptide having the amino acid sequence of SEQ ID NO: 13, or a sequence, which is at least 80% identical to the sequence of SEQ ID NO: 13.

Further, an enhanced expression level of an endogenous gene encoding the polypeptide having the amino acid sequence of SEQ ID NO: 13, or a sequence which is at least 80% identical to the sequence of SEQ ID NO: 13 can be induced in the at least one plant cell. This leads to an enhanced expression level of the endogenous WUS2 gene, i.e. to the presence or occurrence of WUS2 polypeptide in an enhanced amount in the plant cell.

The activation of the expression of the endogenous gene can be achieved by modifying the activity or structure of the promoter of the endogenous gene encoding the WUS2 polypeptide. For instances, enhancer elements can be introduced into the promoter by means of gene editing; or either an enhancer element regulating the promoter can be further strengthen or a silencer element regulating the promoter can be weakened by e.g. targeted mutagenesis/modification; or modifications can be introduced into the epigenome related to enhancers by means of gene editing tools like CRISPR systems (Hilton et al. (2015). Epigenome editing by a CRISPR-Cas9-based acetyltransferase activates genes from promoters and enhancers. *Nature biotechnology*, 33 (5), 510-517); or synthetic transcription factors based on e.g. TALE activators or dCas9 activators can be introduced into the cell where they are able to bind targeted recognition sites on or near by the promoter und activate transcription of the WUS2 gene (Cheng et al. (2013). Multiplexed activation of endogenous genes by CRISPR-on, an RNA-guided transcriptional activator system. *Cell research*, 23 (10), 1163); or the amount of microRNA (miRNA) in the plant cell regulating the expression of the WUS2 gene by post-transcriptional inhibition can be reduced by e.g. knock out (null mutant) or knock down in order to increase the amount of translated WUS2 polypeptide in the plant cell.

Dependent on the plant species as well as on the cell type different levels of gene or expression activation are needed in order to have adequate amount of WUS2 polypeptide present in the plant cell at the time when regeneration takes place. There are various techniques available to a person skilled in the art in order to measure the actual expression level of an endogenous or an introduced gene, e.g., qPCR, RT-PCR, Northern blot, or microarrays. These methods allow those skilled in the art by routine work to adjust the level of expression of the WUS2 gene which effects improved regeneration ability from diverse tissues or somatic and reproductive cells (e.g. microspores). In a preferred embodiment, in the plant cell the expression level of an endogenous gene encoding a WUS2 polypeptide is increased at least by the factor of 2, the factor of 3, or the factor of 5, preferably by the factor of 10, the factor of 25 or factor of 50, more preferred by the factor of 100, the factor of 200, or the factor of 500.

As described further above the induction of an enhanced expression level of an endogenous gene in a plant cell can be carried out by the application of one or more activators or a precursor thereof. These can be applied to the medium in which the plant cells are cultivated and is then actively or passively absorbed by the plant cell. Furthermore, the one or more activator or a precursor thereof can be directly introduced into the plant cell by microinjection, electroporation or biolistic bombardment. Beside the above synthetic transcription activators, a number of further activators are known from the state of the art that can be used for increasing the expression level of an endogenous gene, in particular the expression level of the endogenous WUS2 gene: In the recent years, the technical fields of chemical plant genetics and chemical plant biology emerged where biological systems are treated with small molecules to specifically perturb cellular functions. Small molecules are used commercially as drugs, herbicides, and fungicides in different systems, but in recent years they are increasingly exploited also as tools for genetic regulation. For instance, chemical genetics involves the discovery of small-molecule effectors of various cellular functions through screens of compound libraries (Dejonghe & Russinova (2017). Plant Chemical Genetics: From Phenotype-Based Screens to Synthetic Biology. *Plant Physiology*, pp-01805; Kawasumi, M., & Nghiem, P. (2007). Chemical genetics: elucidating biological systems with small-molecule compounds. *Journal of Investigative Dermatology*, 127 (7), 1577-1584). Such small molecule effectors suitable for the activation of the expression of a target gene like WUS2, can be identified by chemical screens following different strategies (Dejonghe & Russinova, 2017). Comprehensive compound libraries are available which allow the simple screening of countless small molecules and the identification of effectors which can be used for activation of the gene expression of genes like WUS2. As mentioned above another approach to enhance the expression level of an endogenous gene like WUS2 is the application of so-called synthetical transcription activators. They are typically designed by the fusion of a recognition domain and at least one activator domain. The recognition domain can be derived from known systems like Zinc finger, TAL effectors or CRISPR; for activation, fusing for instances the herpes simplex virus derived VP-16 or VP-64 activation domains to a recognition domain can cause an increase in transcription. Weaker activation domains such as the AD of human NF-κB add to the variety of options for gene activation. Furthermore, as shown on endogenous promoters, combinations of activators can be used to introduce synergistic effects (Moore et al. (2014). "Transcription activator-like effectors: a toolkit for synthetic biology." *ACS synthetic biology*, 3 (10), 708-716; US 2002/0046419 A1; Lowder et al. (2017). "Multiplexed transcriptional activation or repression in plants using CRISPR-dCas9-based systems." *Plant Gene Regulatory Networks: Methods and Protocols,* 167-184). The synthetical transcription activator can be delivered to the plant cell or introduced into the plant cell also as precursor, i.e. as DNA or RNA molecule encoding such artificial or synthetical transcription activator or a domain thereof or as inactive form of transcription activator which is activated later in the cell or a in a specific compartment of the cell. Finally, enhancing expression of WUS2 genes can be also achieved by the inactivation of upstream negative regulators or by the creation of a mutant version of the BBM gene that is resistant to such negative regulators.

According to the above described aspects, the invention further provides for the following step (e) to be carried out on at least one plant cell to be used in step (a) or at least one cell of the callus obtained in step (a) of the above described methods:

(e) introducing into the at least one plant cell
  (I) an expression cassette comprising a second nucleotide sequence
    (i) having a polypeptide coding sequence of SEQ ID NO: 12, or a sequence which is at least 80% identical to the sequence of SEQ ID NO: 12, preferably at least 85%, at least 90%, more preferably at least 95%, at least 98% or at least 99% identity to SEQ ID NO: 12; or
    (ii) encoding a polypeptide having the amino acid sequence of SEQ ID NO: 13, or a sequence which is at least 80% identical to the sequence of SEQ ID NO: 13, preferably at least 85%, at least 90%, more preferably at least 95%, at least 98% or at least 99% identity to SEQ ID NO: 13,
  wherein the second nucleotide sequence is operably linked to the first heterologous regulatory element or to a second heterologous regulatory element; or
  (II) an mRNA encoding a polypeptide having the amino acid sequence of SEQ ID NO: 13, or a sequence, which is at least 80% identical to the sequence of SEQ ID NO: 13, preferably at least 85%, at least 90%, more preferably at least 95%, at least 98% or at least 99% identity to SEQ ID NO: 13; or
  (III) a polypeptide having the amino acid sequence of SEQ ID NO: 13, or a sequence, which is at least 80% identical to the sequence of SEQ ID NO: 13, preferably at least 85%, at least 90%, more preferably at least 95%, at least 98% or at least 99% identity to SEQ ID NO: 13; or
  (IV) inducing in said at least one plant cell an enhanced expression level of an endogenous gene encoding the polypeptide having the amino acid sequence of SEQ ID NO: 13, or a sequence which is at least 80% identical to the sequence of SEQ ID NO: 13, preferably at least 85%, at least 90%, more preferably at least 95%, at least 98% or at least 99% identity to SEQ ID NO: 13, and wherein cultivating the callus in step (c) to promote growth of embryos and/or shoots out of the callus is carried out under conditions wherein in the callus the BnBBM-derived polypeptide is expressed as described above, and the WUS2 polypeptide is expressed from the expression cassette, is translated from introduced mRNA, is enhanced expressed from the endogenous gene, or is present.

The first and the second heterologous regulatory elements can be selected from the group consisting of a constitutive promoter, an inducible promoter or an inducible expression system.

Introducing of the expression cassette(s) can result in a stable integration thereof into the genome of the at least one plant cell or in a progeny cell thereof.

Another aspect of the invention is a transgenic plant obtained or obtainable by the above method or a progeny plant thereof. Further, the invention provides a plant cell or a seed of said transgenic plant, wherein the plant cell or the seed comprises the at least one nucleotide of interest as transgene.

A still further aspect of the invention is a modified plant obtained or obtainable by the above method, or a progeny plant thereof. Further, the invention provides a plant cell or a seed of said transgenic plant, wherein the plant cell or the seed comprises the modification in the genome.

Cells, plants, progeny plants and plant parts obtained by purely biological processes are not the subject of the invention.

Unless stated otherwise in the Examples, all recombinant DNA techniques are carried out according to standard protocols as described in Sambrook et al. (1989) Molecular Cloning: A Laboratory Manual, Second Edition, Cold Spring Harbor Laboratory Press, NY and in Volumes 1 and 2 of Ausubel et al. (1994) Current Protocols in Molecular Biology, Current Protocols, USA. Standard materials and methods for plant molecular work are described in Plant Molecular Biology Labfax (1993) by R. D. D. Cray, jointly published by BIOS Scientific Publications Ltd (UK) and Blackwell Scientific Publications, UK. Other references for standard molecular biology techniques include Sambrook and Russell (2001) Molecular Cloning: A Laboratory Manual, Third Edition, Cold Spring Harbor Laboratory Press, NY, Volumes I and II of Brown (1998) Molecular Biology LabFax, Second Edition, Academic Press (UK). Standard materials and methods for polymerase chain reactions can be found in Dieffenbach and Dveksler (1995) PCR Primer: A Laboratory Manual, Cold Spring Harbor Laboratory Press, and in McPherson at al. (2000) PCR-Basics: From Background to Bench, First Edition, Springer Verlag, Germany.

All patents, patent applications, and publications or public disclosures (including publications on internet) referred to or cited herein are incorporated by reference in their entirety.

The invention will be further described with reference to the following Figures and Examples described herein. However, it is to be understood that the invention is not limited to such Examples.

FIGURES

FIG. 1 Shoot formation in sugar beet with and without DEX inducible BBM-GR expression. A: no shoot formation without application of the DEX inducer; B: Many shoots (arrows) are formed upon treatment with the DEX inducer.

FIG. 2 Dex inducible 35s-BnBBM-GR plants look comparable to control plants regenerated from tissue culture without transgene (control).

FIG. 3 BnBBM increases callus-based transformation efficiency in sugar beet (quantification of transformation rate) in amenable and recalcitrant genotypes.
- A: inducible system—comparison of percentage regenerated plants between control, BnBBM-GR without DEX Inducer, and BnBBM-GR with DEX Inducer.
- B: constitutive overexpression—comparison between control and 35S-BnBBM overexpression. Sugar beet plants transformed with Tdt expression construct under a constitutive promoter serves as control in A and B.

FIG. 4 35S-BnBBM (constitutive expression) give rise to embryo (B, arrow shows embryo (e)) and seedlings (C, arrow shows root (r) and seedling(s)) while standard callus based trafo for sugar beet only generates shoots (A; arrow shows shoot derived from organogenesis but no root (s*)). In total may transgenic events can be produced by means of 35S-BnBBM expression (D).

FIG. 5 35S-BnBBM produces mainly embryos on hormone free medium (B) while produces shoots and embryos on normal regeneration medium with hormones (A)

FIG. 6 BnBBM breaks recalcitrance in sugar beet. 35S: BnBBM overexpressing callus of recalcitrant genotype (B) compared with control callus of the same genotype without overexpression of BnBBM (A). Arrows indicate shoots. C: Regenerated transgenic plants of recalcitrant genotype as shown in B.

FIG. 7 Comparison of control construct with vector 70s-tDT versus co-transformation with vector 35S:BnBBM-GR and vector 70s-tDT with inducible BnBBM in two different genotypes (amenable (left) and recalcitrant (right)).

FIG. 8 Constitutive ZmWUS2 overexpression combined with constitutive BnBBM overexpression promotes maize regeneration after biolistic delivery. Arrows indicate fluorescent embryonic structures.

FIG. 9 Vector map of IPR232-pS-01

FIG. 10 Vector map of IPR252-pS-01

FIG. 11 Vector map of IPR 252-pk-02

FIG. 12 In vitro T0 plants regenerated on hormone-free media and with BnBBM show normal root development.

FIG. 13 SNP enhances callus induction in sugar beet amenable genotype 9BS0448.
- Left column: Callus induction of sugar beet amenable genotype 9BS0448 without SNP (A), with 10 µM SNP (C) and with 100 µM SNP (E); arrows indicate callus induction.
- Right column: Close-up view of callus induced without SNP (B), with 10 µM SNP (D) and with 100 µM SNP (F); arrows indicate callus induction.

FIG. 14 SNP enhances callus induction in sugar beet amenable genotype 1RV6183. Callus induction of sugar beet amenable genotype 1RV6183 without SNP (A), with 10 µM SNP (B) and with 100 µM SNP (C); arrows indicate callus induction.

FIG. 15 SNP promotes callus induction in sugar beet recalcitrant genotype 8RV6921. Callus induction of sugar beet recalcitrant genotype 8RV6921 without SNP (A), with 10 µM SNP (B) and with 100 µM SNP (C); arrows indicate callus induction.

FIG. 16 Quantification of callus induction of different genotypes. Callus induction rate [%] of sugar beet genotypes 9BS0448, 1RV6183 and 8RV6921 treated with no SNP (=standard), with 10 mM SNP and with 100 mM SNP.

FIG. 17 Quantification of sugar beet callus shoot induction of different genotypes. Quantification of obtained shoots from callus of sugar beet genotypes 9BS0448 and 1RV6183 treated with no SNP (=standard), with 10 mM SNP and with 100 mM SNP.

FIG. 18 SNP enhances callus induction in sugar beet genotype 8RR3222. Callus induction of sugar beet genotype 8RR3222 without SNP (A) and with 100 µM SNP (B).

FIG. 19 SNP enhances callus induction in sugar beet genotype 6RR1798. Callus induction of sugar beet genotype 6RR1798 without SNP (A) and with 100 µM SNP (B).

FIG. 20 SNP enhances callus induction in sugar beet genotype 7RV5706 (haploid). Callus induction of sugar beet genotype 7RV5706 (haploid) without SNP (A) and with 100 µM SNP (B)

FIG. 21 *Agrobacterium*-mediated sugar beet callus transformation.
- Pictures taken under a UV light microscope of sugar beet callus which has been treated with 10 µM (A and B) or 100 µM (C and D) and subsequently transformed with pZFN-nptII-70s::tDT by an *agrobacterium* mediated approach.

FIG. 22 Biolistic delivery of plasmid into the sugar beet callus.
- Pictures taken under a UV light microscope of sugar beet callus which has been treated with SNP and subsequently transformed with pZFN-nptII-70s::tDT by a biolistic bombardment approach.

FIG. 23 SNP increases embryogenic callus formation in corn genotype 9D1437. Close-up view of induced callus of corn genotype 9D1437 without SNP (A-C), with 10 µM SNP (D-F) and with 100 µM SNP (G-I).

FIG. 25 Callus induced with SNP and transformed with BnBBM.
- A: Callus of recalcitrant genotype 1T4000 (white arrow) was induced with 100 µM SNP and transformed with BnBBM-GR, subsequently shoot development (black arrow) was observed, indicated by arrows.
- B: Quantification of transformation rate [%] of recalcitrant sugar beet genotype 1T4000. Respective callus was induced with or without SNP and subsequently transformed with BnBBM-GR under the control of the 70s promoter. When callus was treated without SNP no transformants were obtained. Whereas when callus was induced with SNP and transformed with BnBBM-GR, shoot development was observed. With this two-step process the obtained transformation rate was 1.67%.

FIG. 26 Influence of SNP on seed production of genotype 9BS0448.
- A: Total number of seeds and number of viable seeds are shown for single plants of the sugar beet genotype 9BS0448. These plants were either regenerated from callus which had been induced with 10 µM or 100 µM or obtained conventionally (donor plants).
- B: The averages for viable seeds per plants including standard deviations are shown for the different SNP treatments as well as for the control using the donor plants.
- Overall the results show a noteworthy reduction of viable seeds in plants obtained from callus which had been induced with a low SNP concentration (10 µM), whereas the callus induction with the higher SNP concentration (100 µM) led to the development of plants producing viable seeds in a quantitative comparable manner to plants which had been obtained conventionally.

FIG. 27 Influence of SNP on seed production of genotype 1RV6921.
A: Total number of seeds and number of viable seeds are shown for single plants of the sugar beet genotype 1RV6921. These plants were either regenerated from callus which had been induced with 10 µM or 100 µM or obtained from callus without SNP treatment.
B: The averages for viable seeds per plants including standard deviations are shown for the different SNP treatments as well as for the control plants were no SNP was used for callus induction.
Overall, the results show a reduction of viable seeds in plants obtained from callus, which had been induced with a low SNP concentration (10 µM) in comparison to plants without SNP treatment.
Plants obtained from callus with a high SNP treatment (100 µM) developed remarkable more viable seeds than control plants. This is supporting the data shown in FIG. 26 and verifying the positive effect of SNP treatment on plant development when applied in a sufficient concentration during callus induction.

FIG. 28 Embryogenesis via BnBBM in hormone free media. A: Media with hormones;
B: Media without hormones. By changing media components, i.e. completely removing GA3 and BAP, somatic embryo formation is significantly increased.

FIG. 29 Comparison of seedlings from hormone free media and shoots from media with hormones. A: Regenerated shoot on media with the plant hormones GA3 and BAP; B: regenerated seedling on hormone free media.

FIG. 30 Seedlings (A and B) grown on media without hormones, developing a normal root system. left: top view; right: bottom view FIG. 31 Transgenic 35S-BnBBM-GR plants obtained by particle bombardment. A: Seedling cultivated in vitro (left: top view; right: bottom view); B: Plantlets after transfer to greenhouse.

FIG. 32 Plant derived from the hormone free protocol develops robust root system.

FIG. 33 Plants derived from the hormone free protocol develops normal upper ground part (one months after transfer to green house)

FIG. 34 Analysis of morphology of tap root (plant 1) after 4 months in the greenhouse FIG. 35 Analysis of morphology of tap root (plant 2) after 4 months in the greenhouse FIG. 36 Analysis of transgenic plants from hormone free transformation protocol.
a: Photosynthesis rate in [µE]
b: Sucrose concentration in tap root [µmol/g]

FIG. 37 35S:BnBBM-GR plants are fertile (one-seedling protocol)
a: Seed production in kg per plant
b: Viable seed produced per plant FIG. 38 Comparison of seed production FIG. 39 Comparison of tap roots after 4 months development in the greenhouse
A: Tap roots from seed derived plants
B: Tap roots from plants obtained by the hormone free transformation FIG. 40 Tap root parameters of WT seed derived plants and transgenic plants obtained from the hormone free transformation protocol
a: Comparison of tap root weight [g] from seed derived WT and transgenic 35S-BnBBM-GR plants obtained by the hormone free transformation protocol
b: Comparison of sucrose content [µmol/g FW] from seed derived WT and transgenic 35S-BnBBM-GR plants obtained by the hormone free transformation protocol FIG. 41 Conceptual time saving for field test of SDN-1 hybrids FIG. 42 Schematic representation of the applied BBM versions and the respective observed regenerative impact.
The C-terminal BBM deletion does not promote spontaneous regeneration anymore, whereas the N-terminal BBM deletion still induces plant regeneration. Compared to the WT the N-terminal BBM reached a level of approx. 40% of regenerated embryogenic T1 seedlings.

FIG. 43 Phenotypes observed in approx. 10 day-old 35S::BnBBM and BnBBMAN *Arabidopsis* seedlings. In both, seedlings can look wild-type (A), show embryogenic tissue at the border of hypocotyl and root (B), develop somatic embryos on cotyledon margins and/or root tip (C), or develop as amorphous clumps of embryogenic tissue (D).
Arrowheads indicate embryogenic tissue.

FIG. 44 Transformation comparison (selection phase: end of C3)
In tissue transformed with an overexpression construct (d35s-BnBBMAN) shoot and embryo formation was observed [C & D]. This was not the case for the control lines-d35s-tDT [A & B]

FIG. 45 BnBBM N-terminal deletion (d35s-BnBBM-Nter) increases transformation efficiency and triggers embryogenesis
Overexpression of N-terminal deletion version (BnBBMAN) triggers embryogenesis (A and B).
The regeneration can be both embryogenesis (A and B) and organogenesis (C) The overexpression of BnBBMAN leads to a clearly increase in transformation efficiency compared to the control line (d35s-tDT) (D)

FIG. 46 Bar diagram illustrating seed production for each individual plant from d35s-BnBBM-Nter
Sugar beet plants transformed with d35s-BnBBMAN are fertile and produce viable seeds.

EXAMPLES

1. Expression of BnBBM
The principle of the inducible expression of BnBBM is based on a fusion of the rat glucocorticoid receptor domain to the transcription factor BnBBM (BnBBM-GR). Upon induction with Dexamethasone, the GR receptor domain will change conformation, so that the BnBBM-GR protein will enter the nucleus and generate the desired response.
The binary plasmids IPR232-pS-01 and IPR252-pS-01 were produced by KWS with standard cloning procedures. The T-DNA also contains the neomycin phosphotransferase II (nptII) gene that confers resistance to a range of aminoglycoside antibiotics such as kanamycin or paromomycin and was used for the selection of transgenic plant cells and tissues. The NOS promoter and the pAG7 terminator flank the nptII gene. The backbone of the binary vector contains the colE1 and the pVS1 origins for plasmid replication in *Escherichia coli* and *Agrobacterium tumefaciens*, respectively; and the aadA gene that confers streptomycin/spectinomycin resistance for bacteria selection.
The binary vector pZFN-nptII-70s::tDT were produced by following standard cloning procedures. Within the T-DNA of this vector, the cDNA of the Tdt sequence was cloned between the double CaMV 35S promoter and the nopaline synthase (NOS). The T-DNA also contains the neomycin phosphotransferase II (nptII) gene that confers resistance to a range of aminoglycoside antibiotics such as kanamycin or paromomycin and was used for the selection of transgenic plant cells and tissues. The NOS promoter and the pAG7 terminator flank the nptII gene. The backbone of the binary vector contains the colE1 and the pVS1 origins for plasmid replication in *Escherichia coli* and *Agrobacterium tumefaciens*, respectively; and the aadA gene that confers streptomycin/spectinomycin resistance for bacteria selection.

The binary plasmid was transformed into AGL-1 *Agrobacterium* strain by a standard procedure.

2. Dex-Induced 35S-BnBBM-GR Enhances Shoot Formation from *Beta Vulgaris* Calli in Hormone-Containing Tissue Culture Media By applying the following method callus for *Beta vulgaris* (sugar beet) has been induced: Micropropagated shoots were used as starting material. Shoots were multiplied in medium containing MS salts, 30 g/l sucrose, 0.25 mg/l benzyladenine (BAP) and 10 g/l agar (pH 6.0). To induce friable callus, leaf explants were incubated for 7-8 weeks in media having MS salts, 15 g/l sucrose, 2 mg/l BAP, and 8 g/l agar (pH 6.0).

For *Agrobacterium*-mediated transformation friable calli were mounted in media containing MS salts, 30 g/l sucrose, 1 mg/l GA3, 1 mg/l TDZ, and 10 g/l agar (pH 6.0) and kept for 1 week in the dark at 24° C. *Agrobacterium* harbouring the vector of IPR232-pS-01 (FIG. 12) was grown in medium containing 5 g/l tryptone, 2.5 g/l yeast extract, 1 g/l NaCl, 5 g/l mannitol, 0.1 g/l $MgSO_4 \times 7H_2O$, 0.25 g/l $KH_2PO_4$, 1 g/l glutamic acid (pH 7.0) supplemented with the appropriate antibiotics, at 28° C., for 24 h.

Calli were inoculated with *Agrobacterium* suspension at an OD600=0.3, the callus tissue and the *Agrobacterium* were incubated on a medium containing 440 mg/l $CaCl_2 \times 2H_2O$, 170 mg/l $KH_2PO_4$, 1.9 g/l $KNO_3$, 180.7 mg/l $MgSO_4$, 1.65 g/l $NH_4NO_3$, 2 mg/l BAP, 40 µg/l acetosyringone, 20 g/l sucrose, 2 g/l glucose, and 10 g/l agar (pH 6.0) at 21° C. for 3 days in the dark.

Calli were subcultured to a medium containing MS salts (Duchefa #0222), 30 g/l sucrose, 1 mg/l GA3, 1 mg/l TDZ, 500 mg/l timentin, and 10 g/l agar (pH 6.0) and incubated in the dark, at 24° C. for 1 week.

To select the transgenic calli, samples were transferred to a medium containing MS salts (Duchefa #0222), 30 g/l sucrose, 1 mg/l GA3, 1 mg/l TDZ, 500 mg/l timentin, 10 g/l agar (pH 6.0), and 100 mg/l paromomycin. The calli were incubated at 24° C. in the light/dark cycle (16 h/8 h) for 3 weeks. Transgenic calli were selected and subcultured for several times in the same medium and conditions until the last selection that was done with and without addition of 1 µM dexamethasone (DEX) into the media for induction of BnBBM-GR protein.

The principle of the inducible expression of BnBBM is based on a fusion of the rat glucocorticoid receptor domain (GR) to the transcription factor BnBBM (BnBBM-GR). Upon induction with dexamethasone (DEX), the GR receptor domain will change conformation, so that the BnBBM-GR protein will enter the nucleus and generate the desired response.

Regenerating shoots were isolated and propagated in medium containing MS salts, 30 g/l sucrose, 0.25 mg/l benzyladenine (BAP), 100 mg/l kanamycin and 10 g/l agar (pH 6.0). Leaf explants were isolated from the green growing shoots for DNA extraction and PCR analysis, in order to confirm the presence of the transgene. Selected shoots were rooted in medium containing MS salts, 30 g/l sucrose, 6.25 mg/l NAA, and 10 g/l agar (pH 6.0) and transferred to the green house for seed production.

FIG. 1 shows that with DEX many shoots were formed from callus (B), while without DEX less or no shoot formation took place (A). Transgenic plants obtained from DEX-induced shoot formation show on soil similar morphology compared to non-transgenic wildtype plants (control) (see FIG. 2).

Thus, shoot formation from sugar beet callus is increased on DEX media in comparison to DEX free media. The transgenic 35s-BnBBM-GR plants without inducer on soil do not show obvious phenotype.

3. BnBBM Dramatically Increases Callus-Based Transformation Efficiency in *Beta vulgaris*

For quantification of transformation rate a) the inducible BnBBM system based on DEX/GR as described above as well as a constitutive overexpression of BnBBM have been tested on an amenable genotype and a recalcitrant genotype. As control served the respective genotype transformed with a vector carrying the fluorescent marker gene tdTomato.

a) The inducible BnBBM system was tested with and without addition of DEX to the media as described above. FIG. 3A shows the quantification of regenerated transgenic plants grown from induced shoots. It is apparent that by DEX-induction the frequency of transgenic plant formation is dramatically increased. In both genotypes a seven to eight fold increase in the transformation efficiency is observed, reaching of around 18% in the recalcitrant genotype and up to around 70% in the amenable genotype.

b) For the constitutive overexpression of BnBBM under the control of the CaMV 35S promoter the transformation efficiency is determined by counting transgenic plants obtained per plate (for detailed transformation protocol see Example 4). Generated transgenic plants are grown from shoots (derived from organogenesis) or embryos produced from callus (derived from embryogenesis) (FIG. 9). FIG. 3B shows a very similar tendency. The transformation efficiency of the constitutive expression BnBBM has been increased at least ten-fold for the amenable as well as for the recalcitrant genotype.

Thus, due to the combination of BnBBM-GR with DEX callus-based transformation efficiency is dramatically increased in amenable as well as recalcitrant genotypes. Similar results of breaking recalcitrance in sugar beet genotypes where also obtained with constitutive expression.

4. Constitutive (Over) Expression Gives Rise to Embryo and Seedlings

The same protocol for transformation as described in Example 2 has been used, except that the vector IPR252-pS-01 instead of the vector of IPR232-pS-01 has been used. As negative control, callus as described in Example 2 has been produced, but no *agrobacterium* infection took place. For shoot induction and propagation, the calli were harvested and transferred to the shoot induction media containing MS salts, 30 g/l sucrose, 1 mg/l GA3, 1 mg/l TDZ and 10 g/l agar (pH 6.0). The calli were incubated at 24° C. in the light/dark cycle (16 h/8 h) for 1-2 weeks. Regenerated shoots were mounted and cultured in media containing MS salts, 30 g/l sucrose, 0.25 mg/l BAP, and 10 g/l agar (pH 6.0) and plants were grown at 24° C. in the light/dark cycle (16 h/8 h).

As for the inducible expression, even constitutive expression of BnBBM gives rise to embryo and seedling development (see FIG. 4B and C) while standard callus-based transformation for sugar beet only generates shoots (see FIG. 4A). This shows that constitutive expression of BnBBM triggers embryogenesis and organogenesis. Many transgenic events could be produced compared to the control (FIG. 4 D).

Thus, constitutive and inducible expression of BnBBM in *Beta vulgaris* develop somatic embryos and shoots while standard callus-based transformation only generates shoots.

5. Constitutive (Over) Expression on Hormone-Free Medium

The same protocol as described in Example 4 has been used, except that the plant hormones TDZ and GA3 were not added to the media.

From callus tissue with a constitutive expression of BnBBM mainly embryos can be obtained on hormone free medium (FIG. 5B). When such tissue is placed on normal regeneration medium with hormones shoots and embryos are produced (FIG. 5A).

6. Co-Transformation with Inducible BnBBM

For co-transformation, agrobacteria harbouring each one of the vectors of interest were mixed 1:1 ratio (the vector 35s::BnBBM-GR and the vector 70s-tDT). Calli were inoculated with the obtained *Agrobacterium* suspension. The callus tissue and the *Agrobacterium* were incubated at 21° C. for 3 days in the dark and subsequently subcultured as described in Example 2. Co-transformation shows significantly increased regenerative capacities of plant tissue leading to a more efficient co-transformation rate in amenable and recalcitrant genotypes (FIG. 7). Further, co-transformants were obtained three weeks earlier if BnBBM has been expressed.

Same result has been obtained for co-transformation with 35s BnBBM and the 70s-tDT vector.

The increased efficiency of co-transformation is of particular importance for the co-delivery of genome editing components for the targeted modification of the plant genome of co-transformed plant cells. By co-delivery of a CRISPR/Cpf1 system, SDN-1 events were successfully obtained after co-transformation with BnBBM and said genome editing components.

7. The Use of BnBBM and the Avoidance of Hormones Positively Affects the Development of the Tap Root (Storage Organ) at T0 Level For *Beta vulgaris* and in particular for sugar beets or red beets, plants regenerated in vitro from callus show always an atypical phenotype particularly with respect to the hypocotyl and the roots. Typically, there is not a normal root body developed, so that the T0 generation of e.g. sugar beets or red beets are not usable for testing root-related traits, e.g. sugar accumulation, nematode resistance, rhizomania resistance, etc or promoter expression analysis. Surprisingly, the inventors found that plant regenerated by means of BnBBM, inducible, but without hormones developed a normal tap root. Thereby, phenotyping of root-related traits and analysis of the storage-root ingredients are possible at T0 level.

FIG. 12 shows T0 plants regenerated with inducible BnBBM and without hormone treatment.

8. Biolistic Delivery Method for Corn

With the microparticle bombardment, one or more booster genes, booster polypeptides, genome engineering components, and/or transgenes are co-delivered into immature embryos of corn via gold particles. Biolistic delivery has been conducted according the protocol as described in WO 2019/238911 A1.

The booster genes, booster polypeptides, genome engineering components, and/or transgenes can be delivered into target cells using for instances a Bio-Rad PDS-1000/He particle gun or handheld Helios gene gun system. More than one construct can be co-delivered with genome engineering components into target cells simultaneously. For biolistic transformation of corn plants, the plasmid IPR252-pk-02 (FIG. 11) was used.

FIG. 8 shows the biolistic co-delivery of ZmWUS2, BnBBM and fluorescent marker Tdt. One month after bombardment three fluorescent embryonic structures form, which indicates that BnBBM combined with ZmWUS2 promotes maize regeneration from immature embryos.

9. SNP in Sugar Beet Medium Leads to Increased Callus Induction

Micropropagated shoots of different genotypes were used as starting material. The shoots were multiplied in medium containing MS salts, 30 g/l sucrose, 0.25 mg/l benzyladenine (BAP) and 10 g/l agar, pH 6.0.

To induce friable callus, leaf explants were incubated in medium containing MS salts, 15 g/l sucrose, 2 mg/l BAP, 8 g/l agar, 30 µM HP or 50 µM HP, pH 6.0 with 10 µM SNP, 100 µM SNP or without SNP, at 28° C. for 7-8 weeks.

For the genotypes 9BS0448 and 1RV6183 only a minor effect of SNP is visible with 10 µM SNP in the medium in comparison to tissue cultivated on media without SNP, however when SNP is increased to 100 µM almost a doubling of the induction rate is obtained. For the recalcitrant genotype 8RV6921 the effect of SNP is even more drastic. Without SNP, no callus induction is observed, whereas with 10 µM SNP the callus induction rate was at a level of 60%, with 100 µM SNP the callus induction level were even at 90%.

10. SNP in Corn Medium Leads to Increased Callus Induction immature embryos were used for the maize callus induction in the genotype 9D1473. Embryos of 0.5-1.4 mm were harvested 9-14 d after pollination.

The immature embryos were placed on the media containing MS salts, 3.3 mg/l Dicamba, 0.7 g/l Proline, 100 mg Casein hydrolysate, 100 mg/l Myo-Inosital, 30 g/l Sucrose, 95 mg/l L-Cysteine, 19.62 mg/l Acetosiringone, 15 mg/L $AgNO_3$, 2.3 g/l Gelrite, 1.25 mg/l $CuSO_4$, PH 5.8 at 25° C. for 7 days dark.

Subsequently the embryos were transferred to media containing MS salts, 3.3 mg/l Dicamba, 0.5 g/l MES, 100 mg/l Myo-Inosital, 30 g/l Sucrose, 0.7 g/l L-Proline, 100 mg/l Casein hydrolysate, 2.3 g/l Gelrite, 250 mg/l carbenicillin, 15 mg/l $AgNO_3$, pH 5.8 and subcultured every 2 weeks on C2 at 25° C. dark with different SNP regimes.

Figure 23:
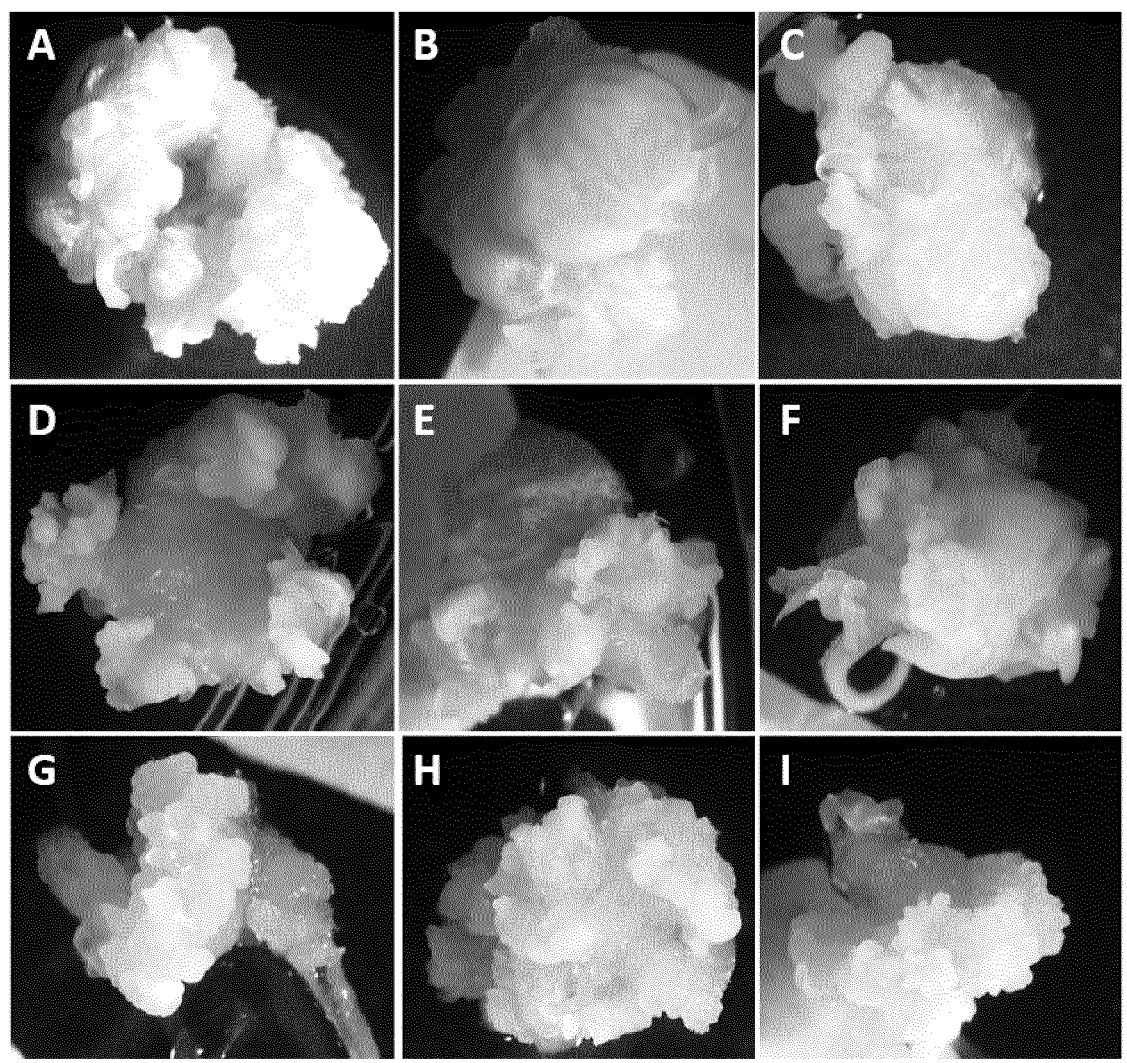
Figure 24:
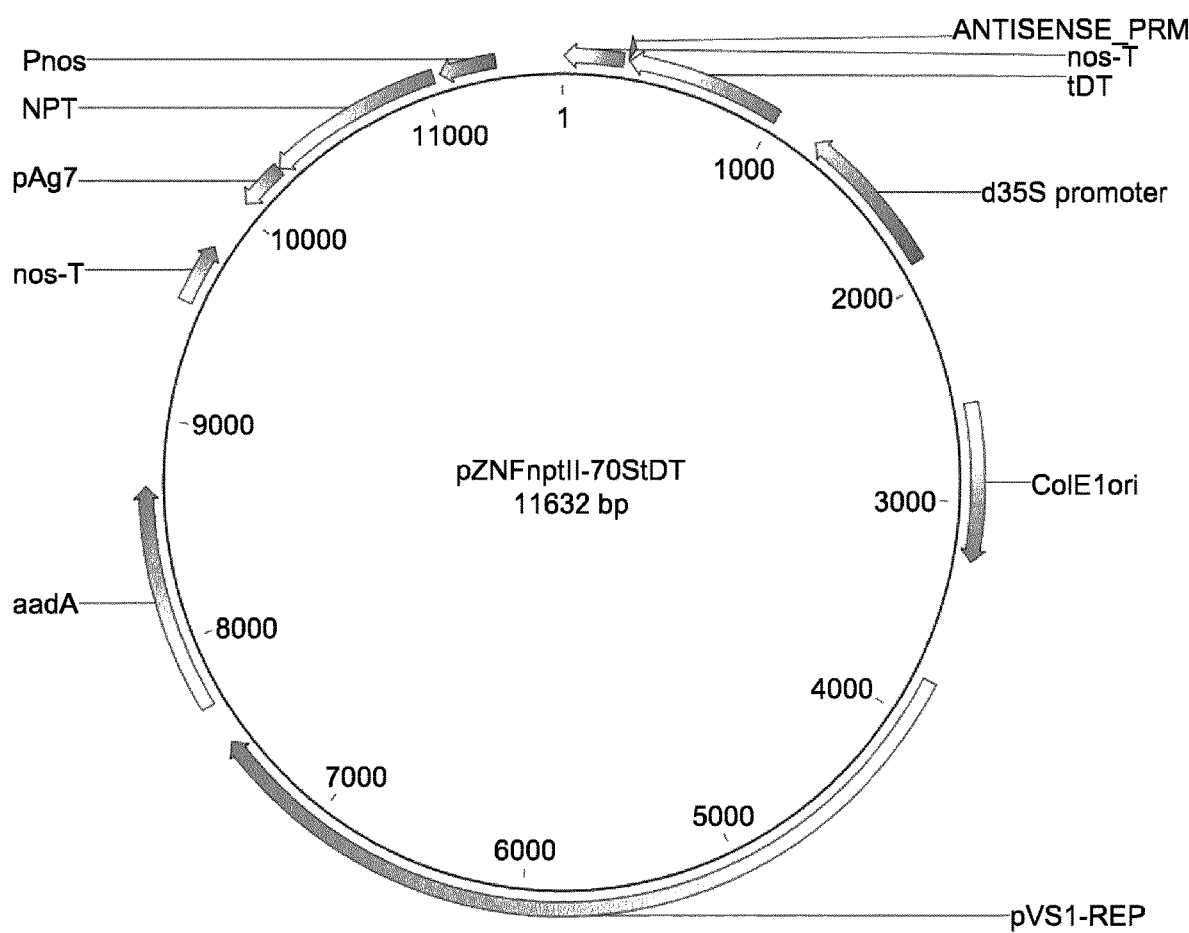

FIG. 23 shows for maize genotype 9D1437 that SNP as media component increased embryonic callus formation in comparison to embryos cultivated on media not containing SNP.

11. Sugar Beet Callus Induced by SNP can be Used for *Agrobacterium* Mediated Transformation Sugar beet calli were induced as described above and friable calli were mounted in medium containing MS salts, 30 g/l sucrose, 1 mg/l GA3, 1 mg/l Thidiazuron (TDZ) and 10 g/l agar, pH 6.0 and kept for 1 week in the dark, 24° C.

*Agrobacterium* AGL-1 harbouring the vector pZFN-np-tII-70s::tDT was grown in medium containing 5 g/l tryptone, 2.5 g/l yeast extract, 1 g/l NaCl, 5 g/l mannitol, 0.1 g/l MgSO$_4$×7H$_2$O, 0.25 g/l KH$_2$PO$_4$, 1 g/l glutamic acid, pH 7.0 supplemented with the appropriate antibiotics, at 28° C., for 24 h.

At an OD600 of 0.8, the callus tissue and the *Agrobacterium* were incubated in medium containing 440 mg/l CaCl$_2$×2H$_2$O, 170 mg/l KH$_2$PO$_4$, 1.9 g/l KNO$_3$, 180.7 mg/l MgSO$_4$, 1.65 g/l NH$_4$NO$_3$, 2 mg/l BAP, 40 µg/l Acetosyringone, 20 g/l sucrose, 2 g/l glucose, 10 g/l agar, pH 6.0, at 21° C. for 3 days in the dark.

Calli were subcultured to medium containing MS salts, 30 g/l sucrose, 1 mg/l GA3, 1 mg/l TDZ, 500 mg/l Timentin, 10 g/l agar, pH 6.0 and incubated in the dark, at 24° C. for 1 week.

To select the transgenic calli, samples were transferred to medium containing MS salts, 30 g/l sucrose, 1 mg/l GA3, 1 mg/l TDZ, 500 mg/l Timentin, 100 mg/l paromomycin, 10 g/l agar, pH 6.0 and incubated at 24° C. in the light/dark cycle (16 h/8 h) for 3 weeks.

Transgenic calli were selected and subcultured for several times in the same medium and conditions.

Figure 21:
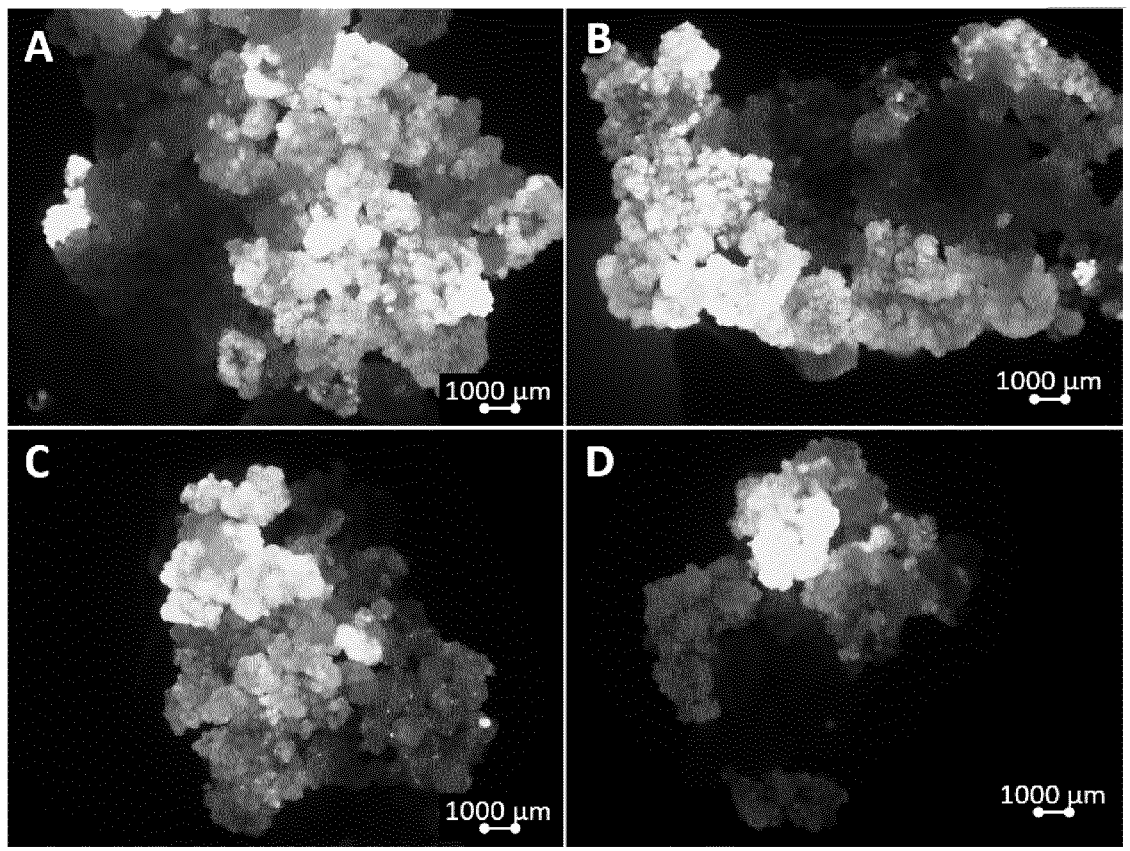

FIG. 21 shows that callus induced by SNP can be used for *agrobacterium* mediated transformation since a strong tdTomato signal was visible after the transformation with pZFN-nptII-70s::tDT. Therefore, callus induced by SNP can be potentially combined for example with genome editing approaches 12. Sugar Beet Callus Induced by SNP can be Used for Biolistic Delivery Friable calli were produced as described above. An osmotic treatment was carried out by incubating the calli in medium containing MS salts, 30 g/l sucrose, 6.25 mg/l NAA, 10 g/l agar, pH 6.0 for 2.5 h at room temperature in the dark.

Preparation and DNA coating of the gold particles was done by standard procedures, as describe in the PDS-1000/He instruction manual. Gold particles were coated with pZFN-nptII-70s::tDT.

Calli were bombarded with a PDS-1000/He unit (Bio-Rad), using 30 ng gold particles coated with 500 ng DNA per shot. The rupture pressure was 450 psi and the target tissue was placed at 9 cm distance from the stopping screen.

Figure 22:
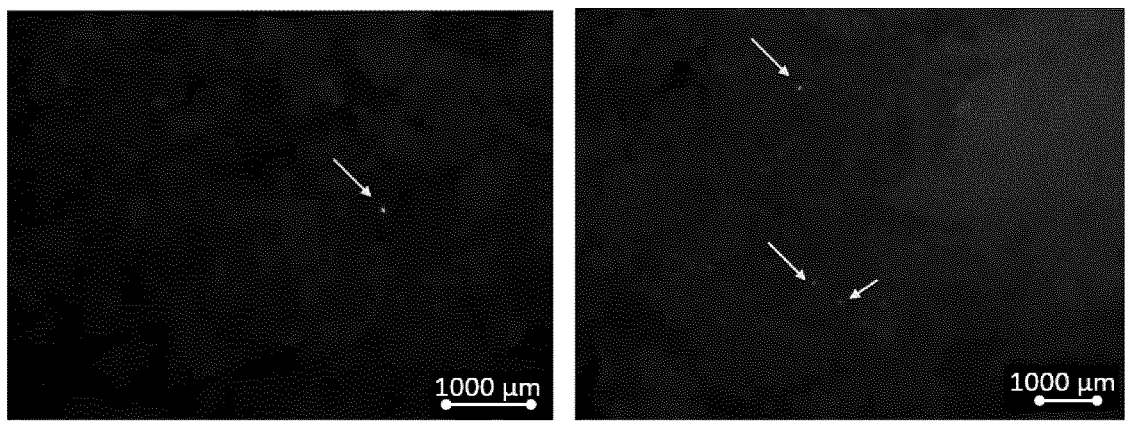

FIG. 22 shows that callus induced by SNP can be used for biolistic transformation since tdTomato signals were visible after the bombardment with pZFN-nptII-70s::tDT. Therefore, callus induced by SNP can be potentially combined for example with genome editing approaches 13. Sugar Beet Shoot Regeneration Friable calli were harvested from the induction and transferred to the shoot induction media containing MS salts, 30 g/l sucrose, 1 mg/l GA3, 1 mg/l Thidiazuron (TDZ), 10 g/l agar, pH 6.0. The calli were incubated at 24° C. in the light/dark cycle (16 h/8 h) for 1-2 weeks. Regenerated shoots were mounted and cultured in media containing MS salts, 30 g/l sucrose, 0.25 mg/l benzyladenine (BAP), 10 g/l agar, pH 6.0 and the plants are grown at 24° C. in the light/dark cycle (16 h/8 h). Shoots of the genotypes 9BS0448 and 1RV6183 regenerated from callus derived from SNP treatment does not show obvious phenotypes.

Figure 1:
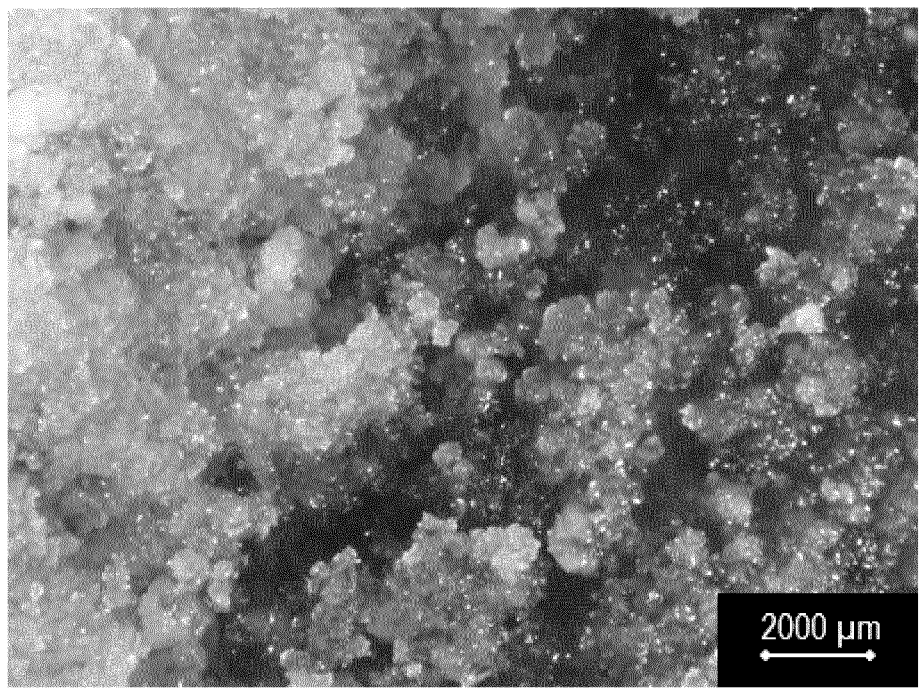
Figure 1:
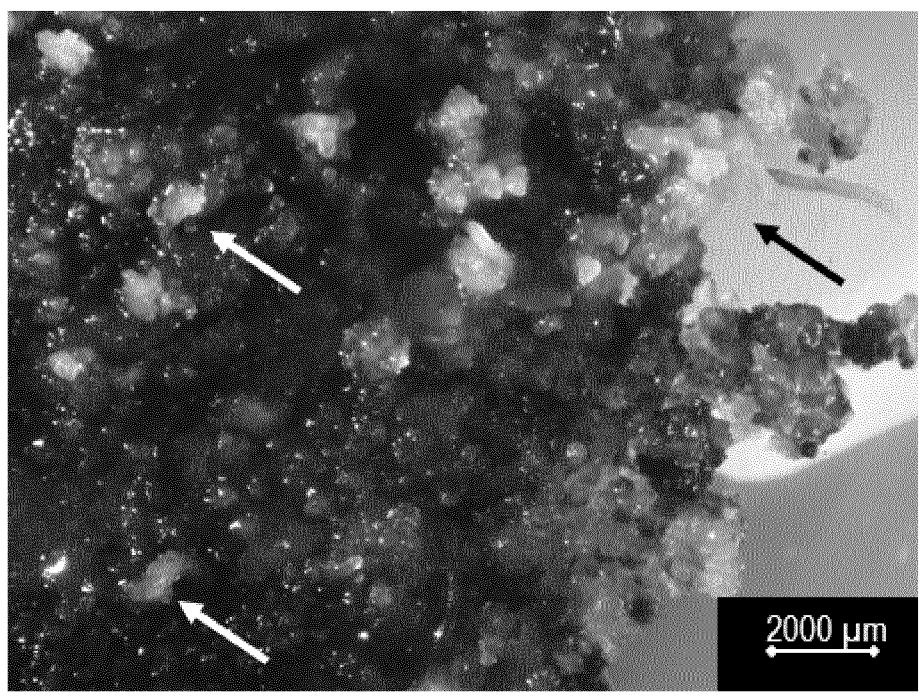
Figure 2:
Figure 3:
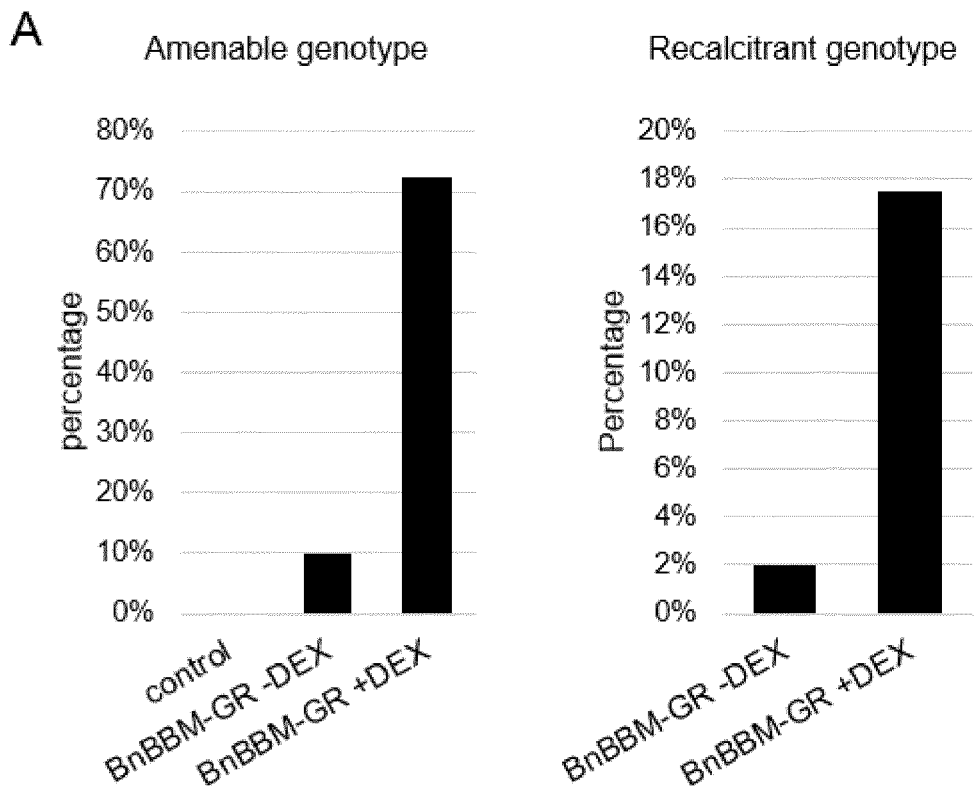
Figure 3:
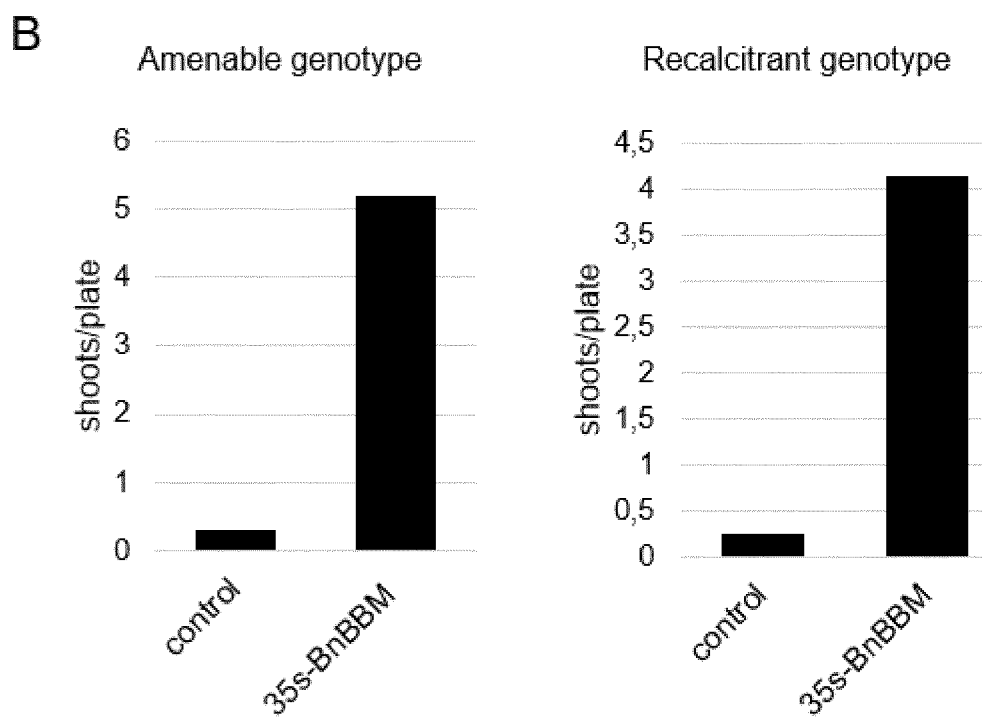
Figure 4:
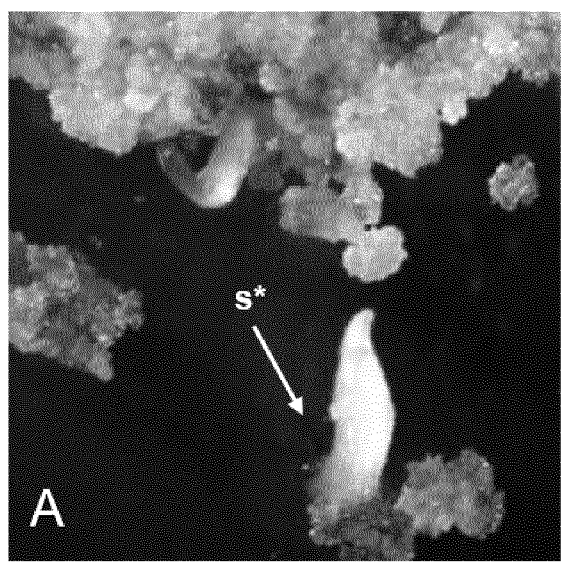
Figure 4:
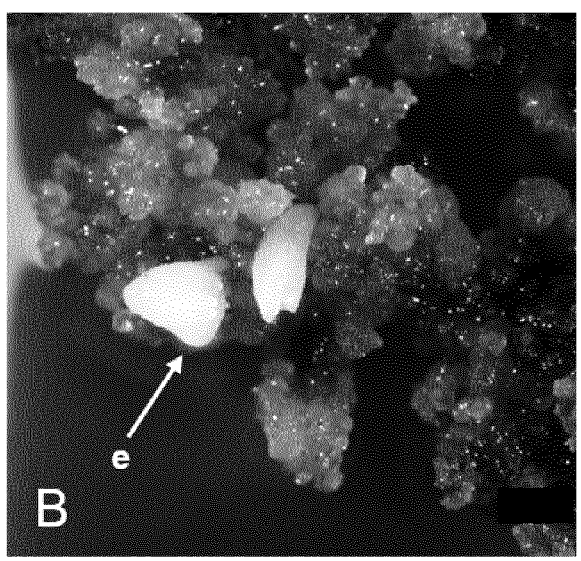
Figure 4:
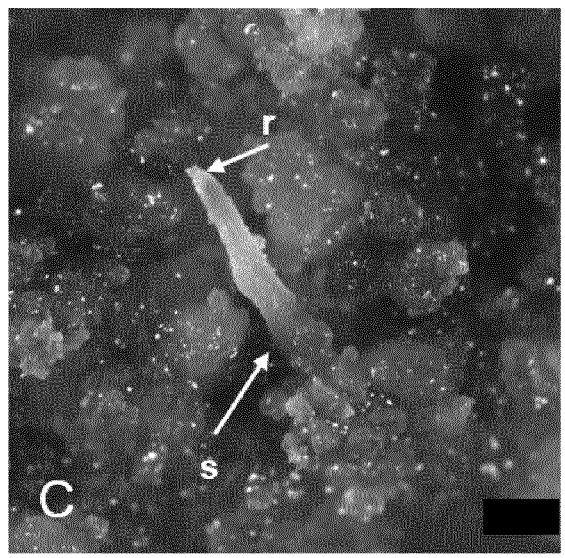
Figure 4:
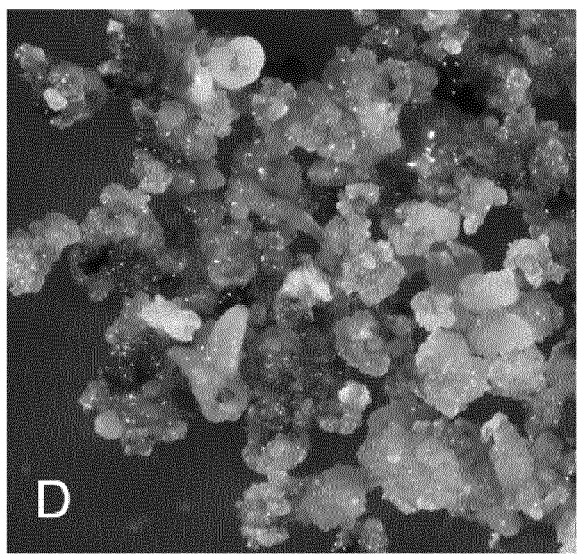
Figure 5:
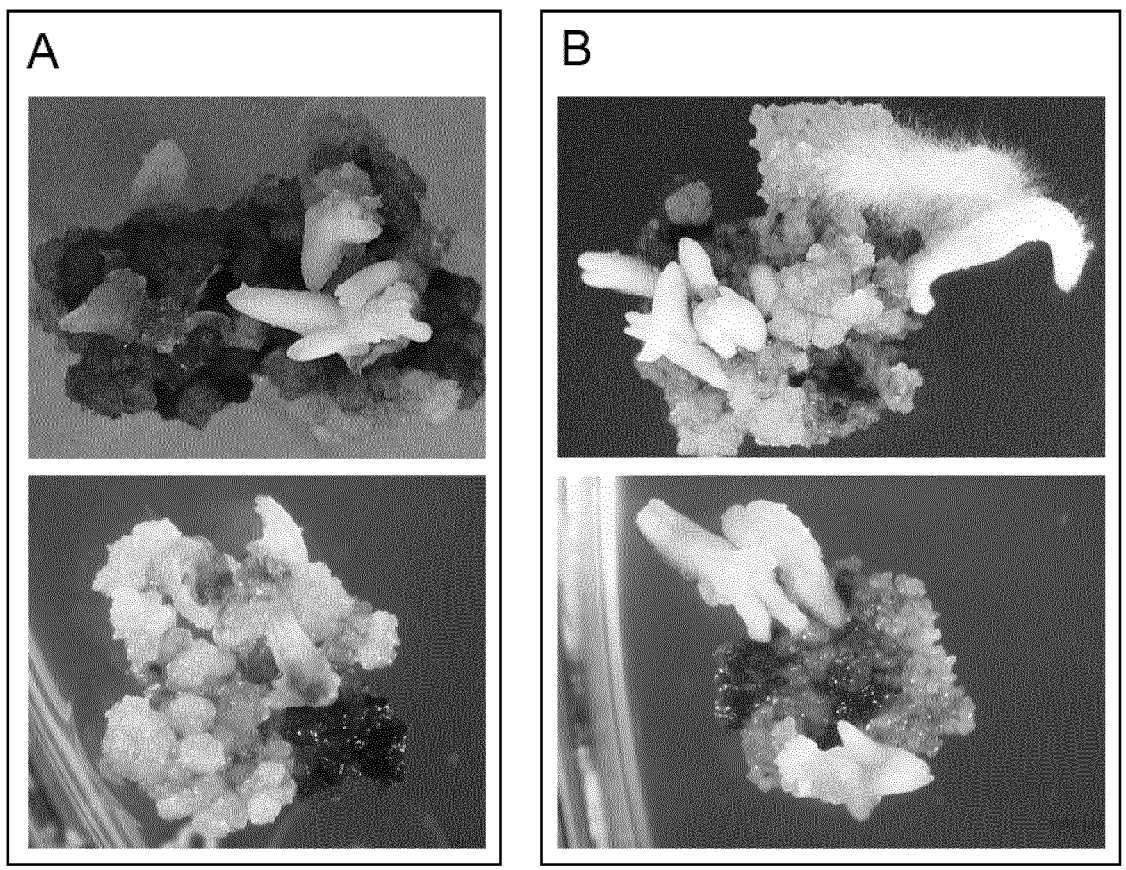
Figure 6:
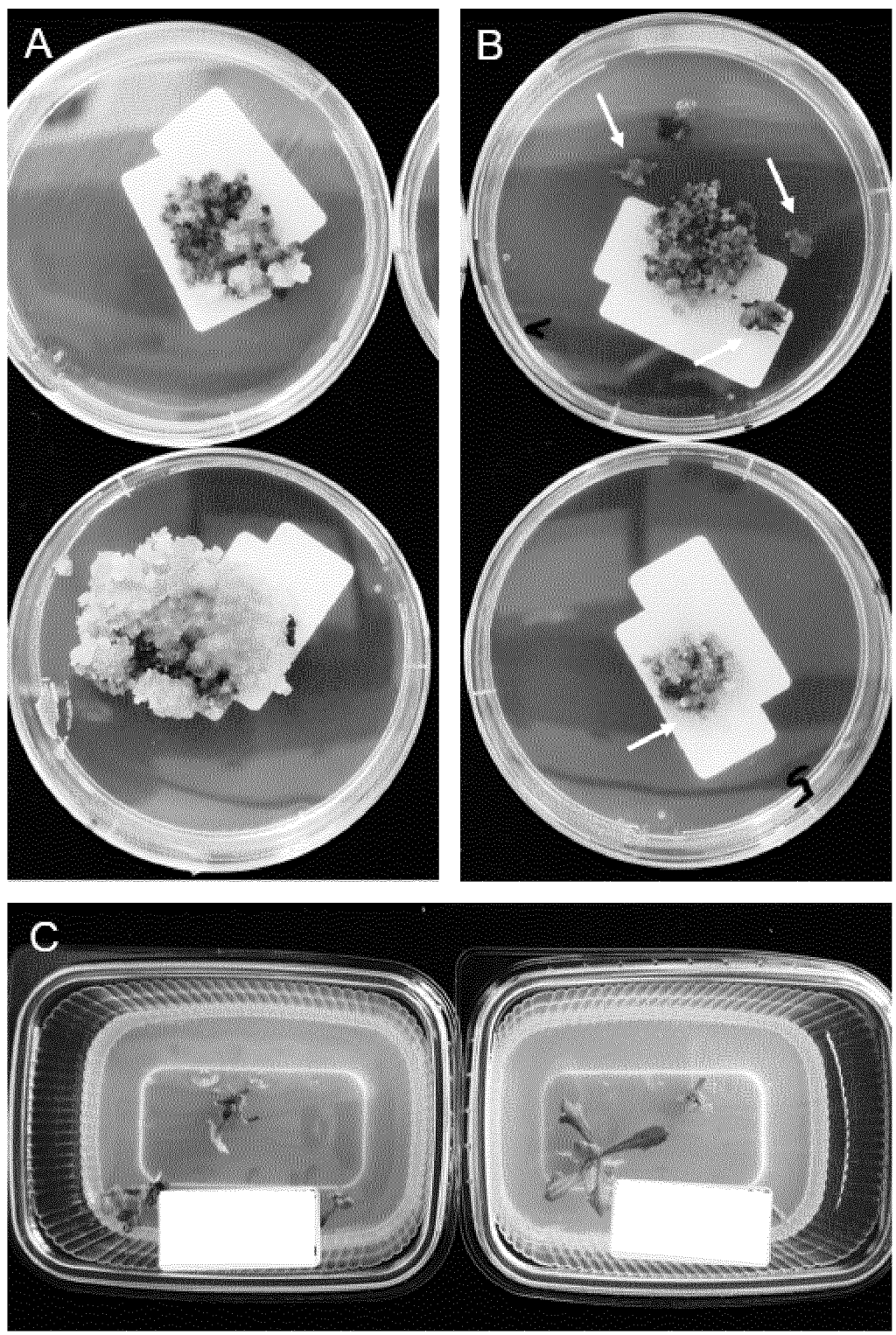
Figure 7:
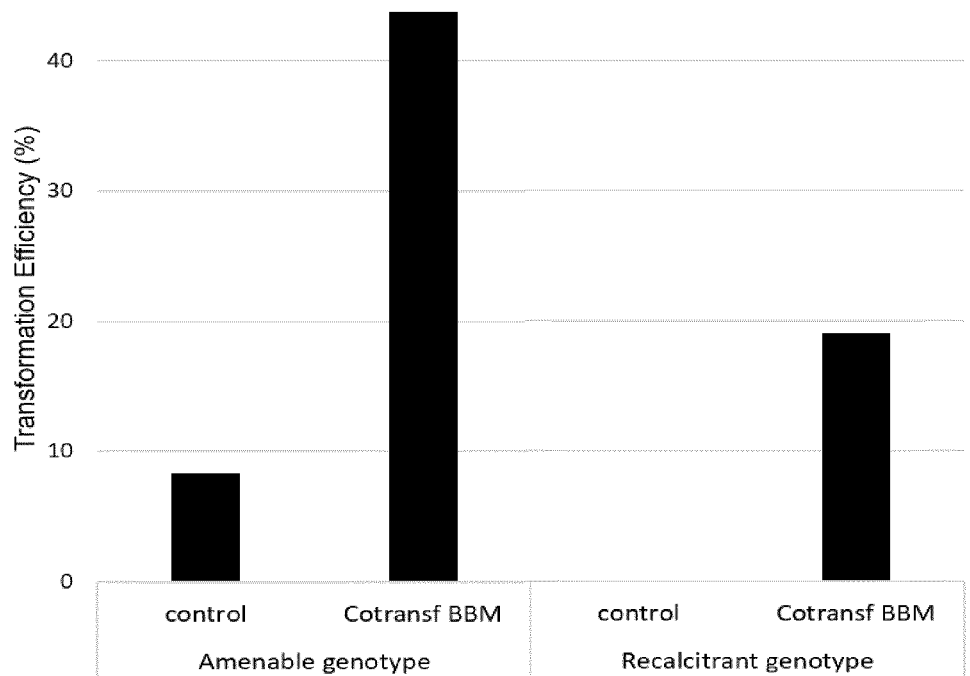
Figure 8:
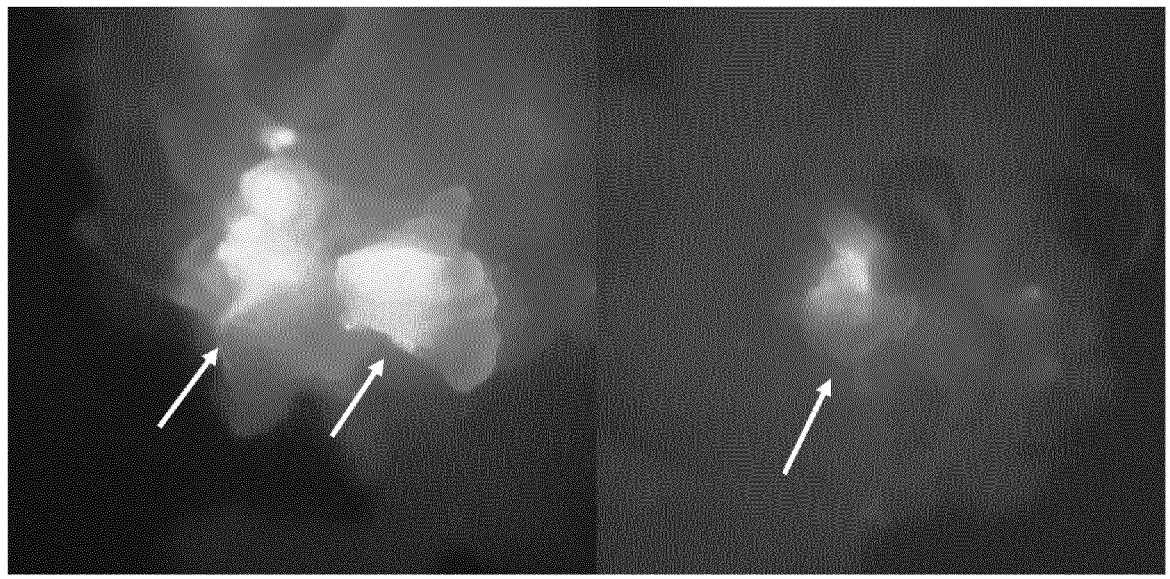
Figure 9:
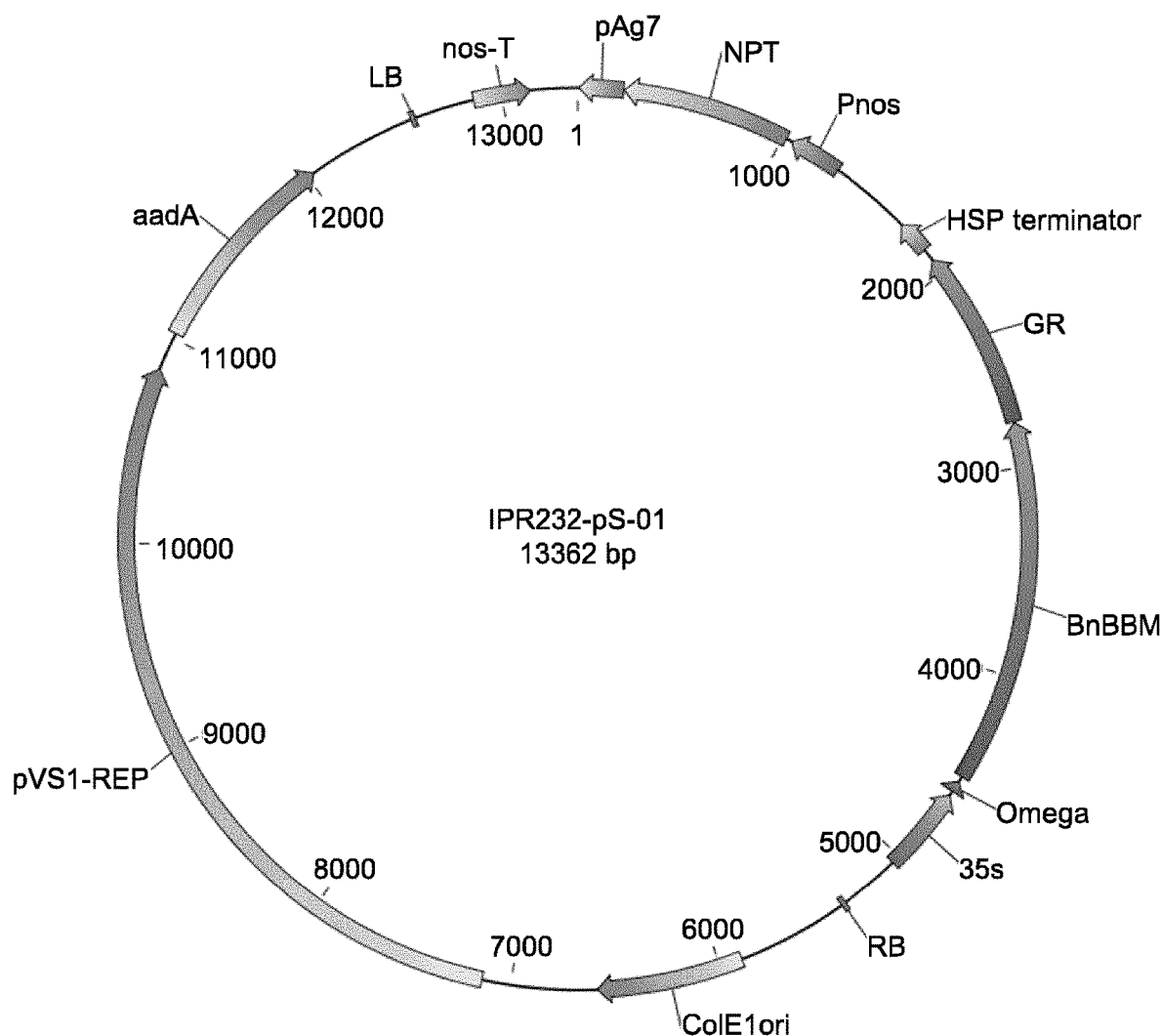
Figure 10:
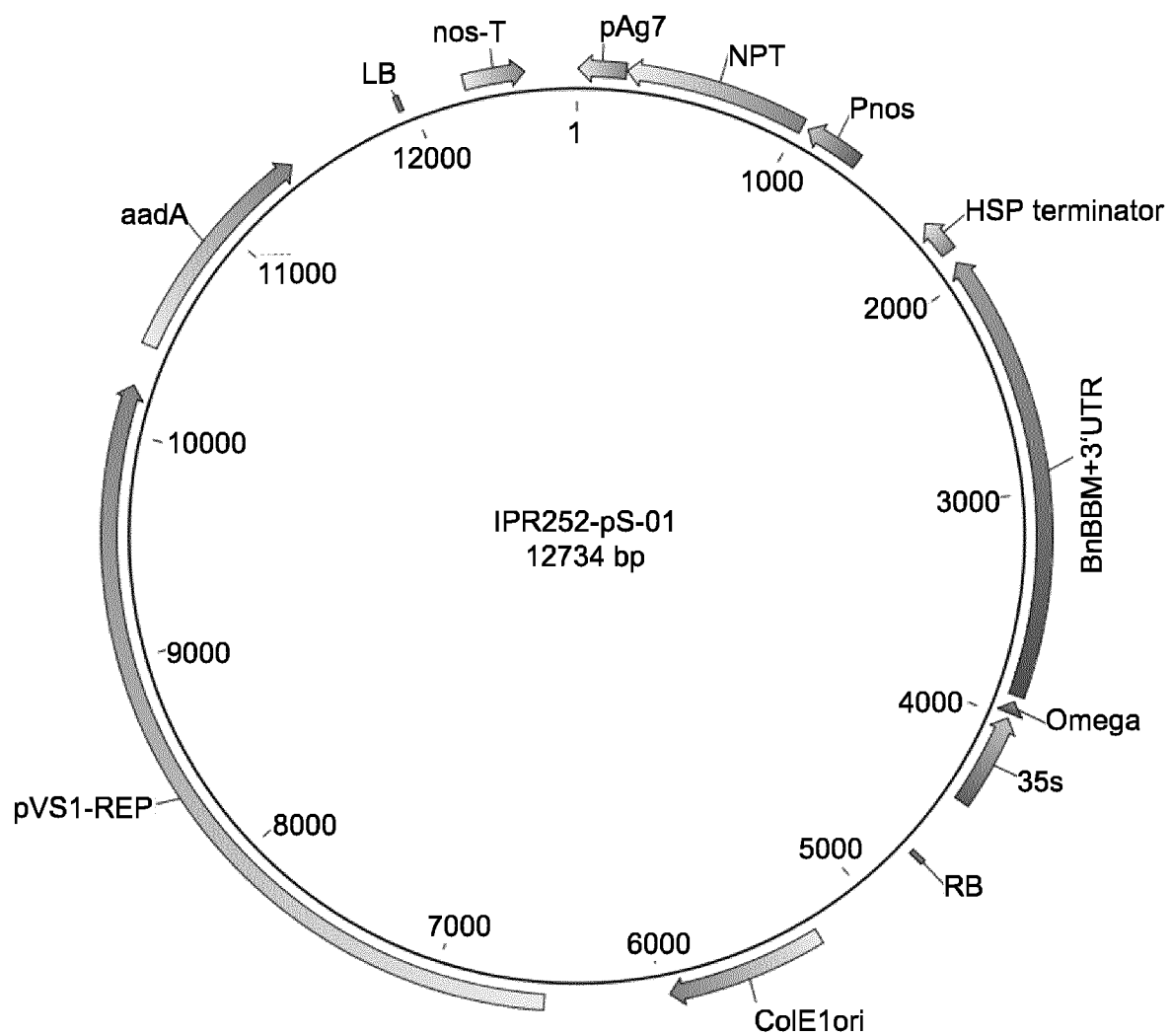
Figure 11:
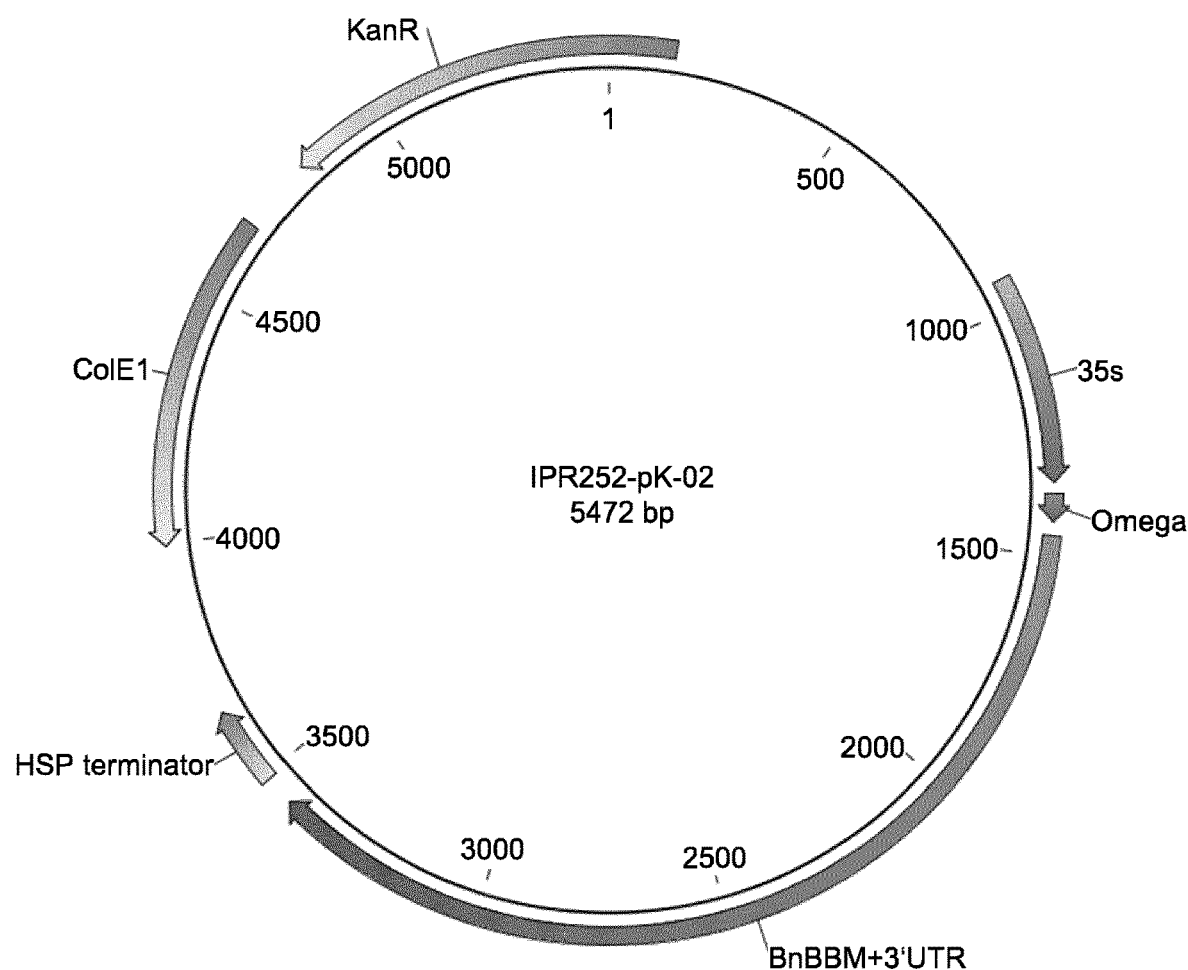
Figure 12:
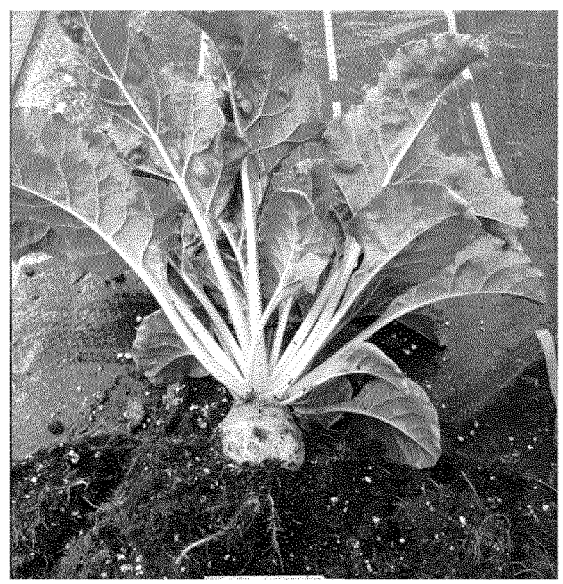
Figure 13:
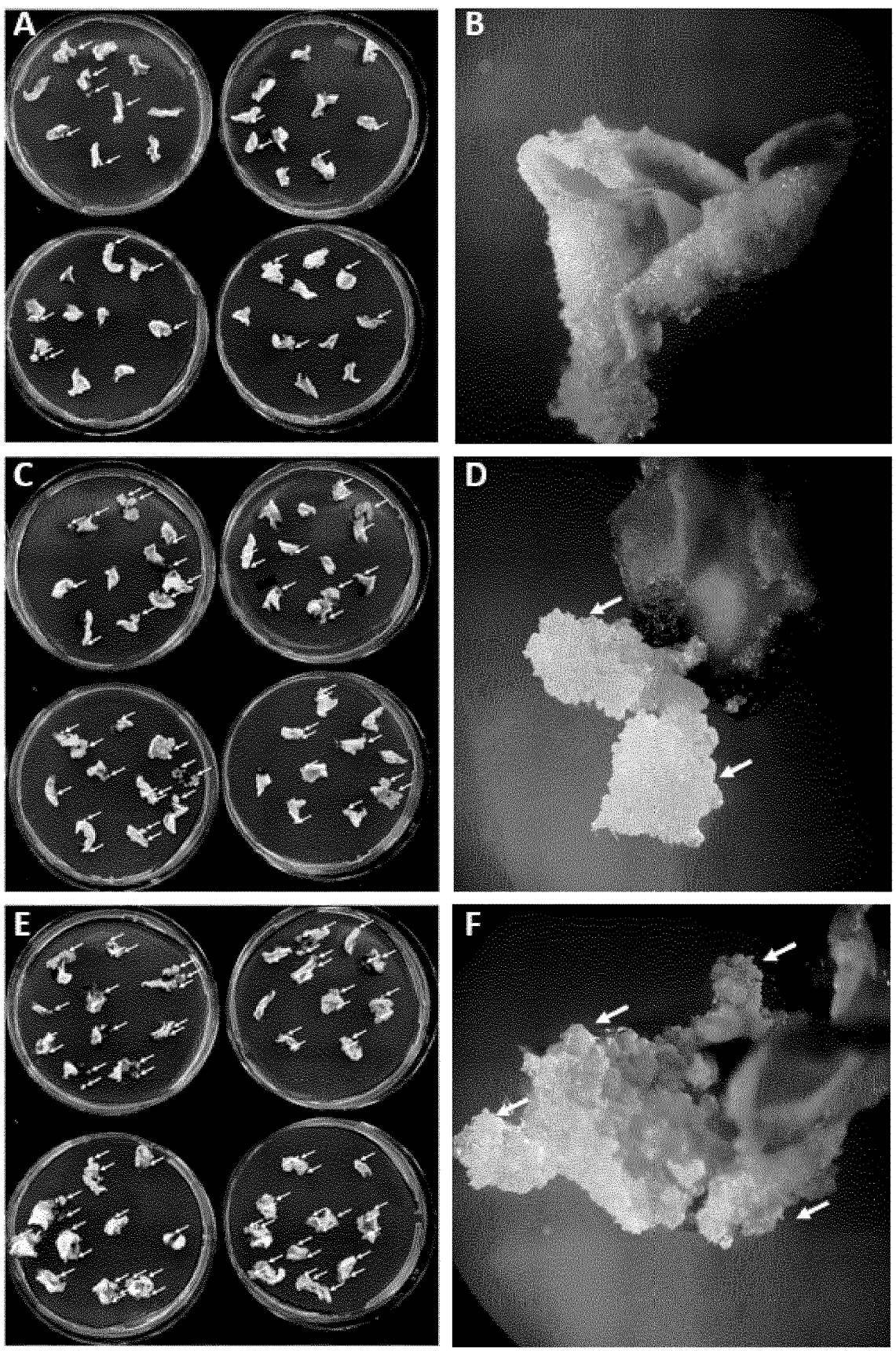
FIGS. 13-15 and 18-20 show that with SNP as media component callus tissue was induced from leaf explants of the genotypes 9BS0448, 1RV6183, 8RV6921, 8RR3222, 6RR1798 and 7RV5706, while without SNP only less or no shoot formation was observable.
Figure 14:
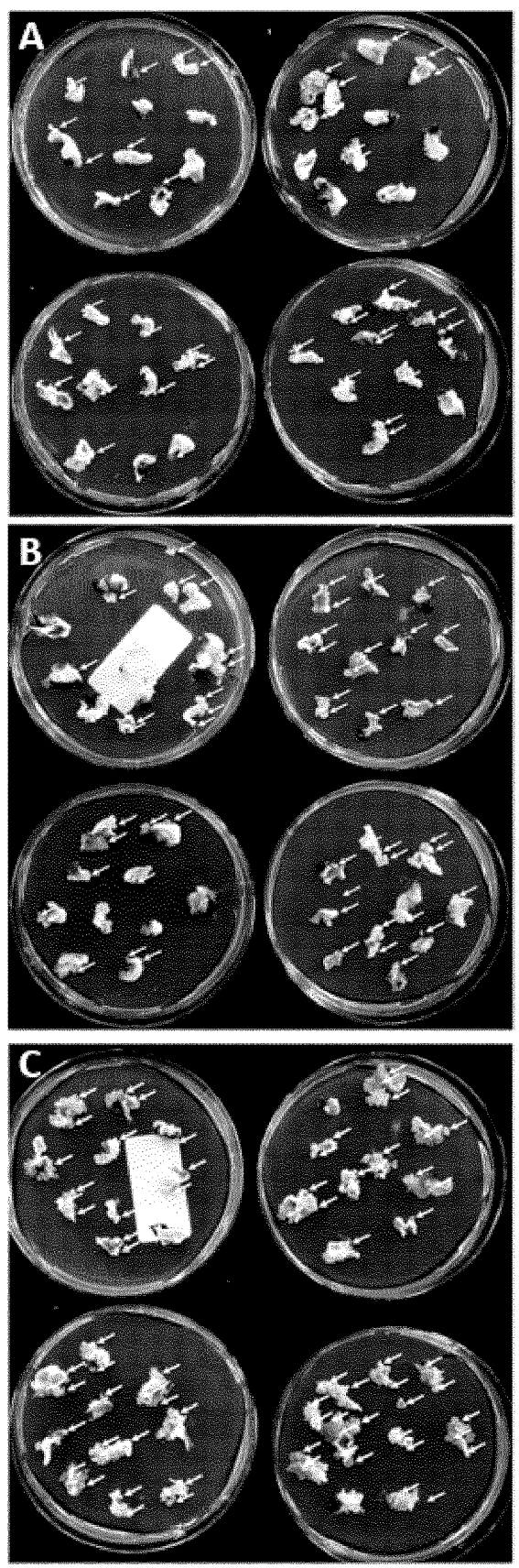
Figure 15:
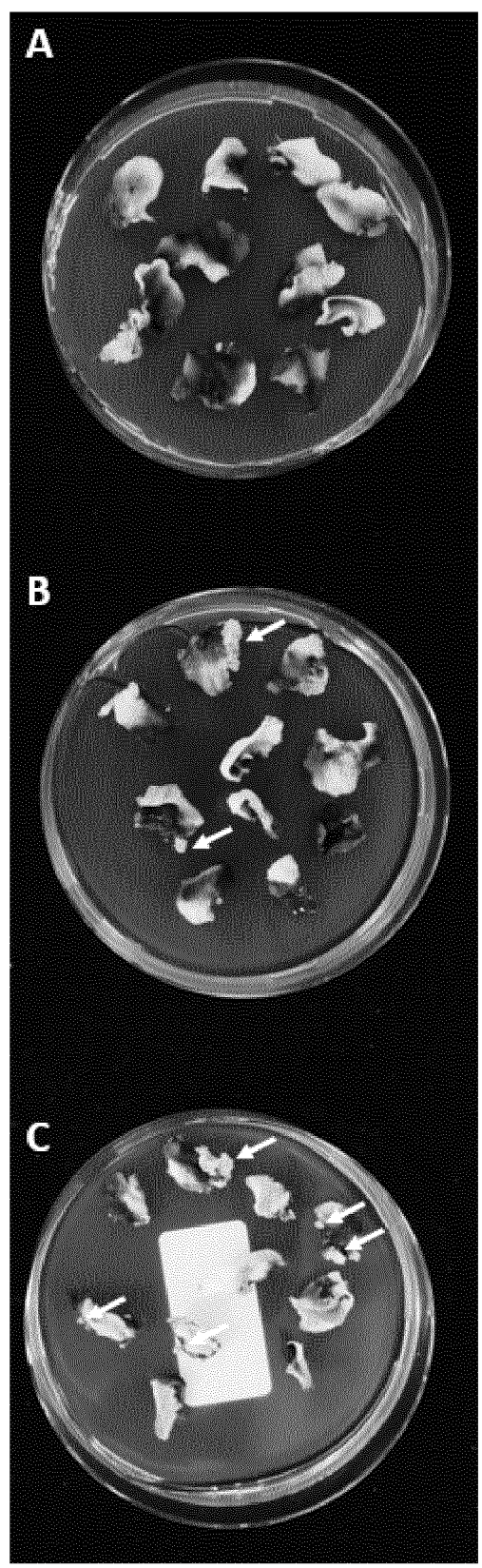
Figure 16:
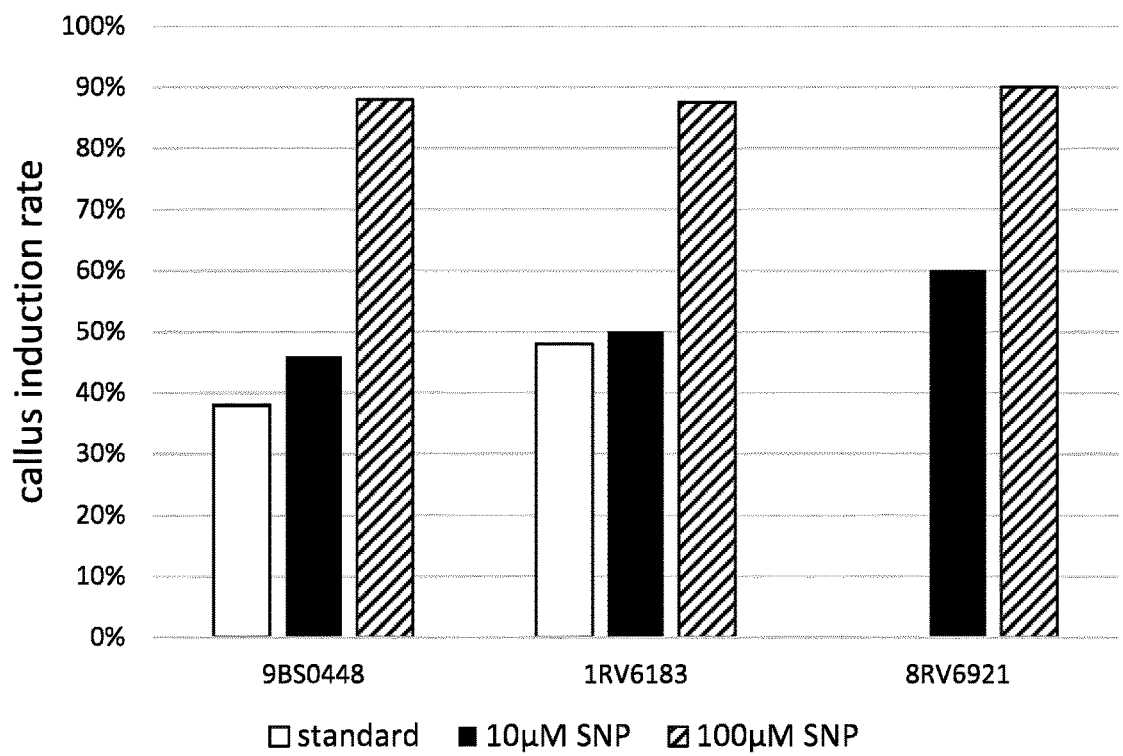
FIG. 16 shows the quantification of the callus induction rate from the genotypes 9BS0448, 1RV6183 and 8RV6921.
Figure 17:
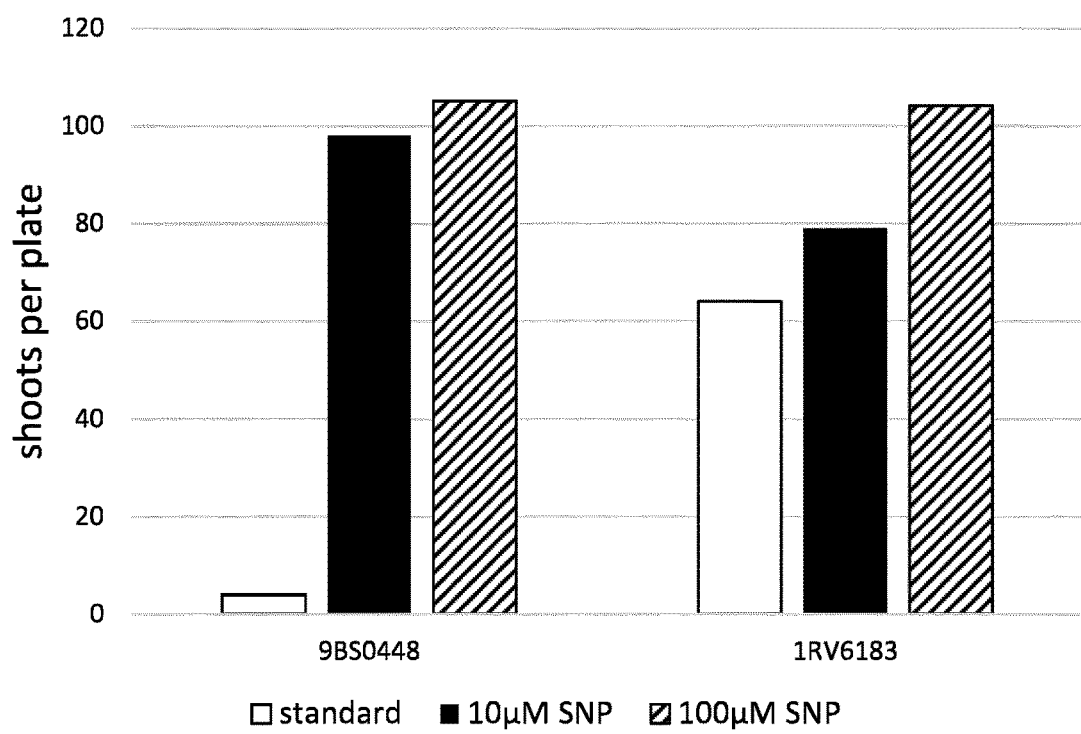
Figure 18:
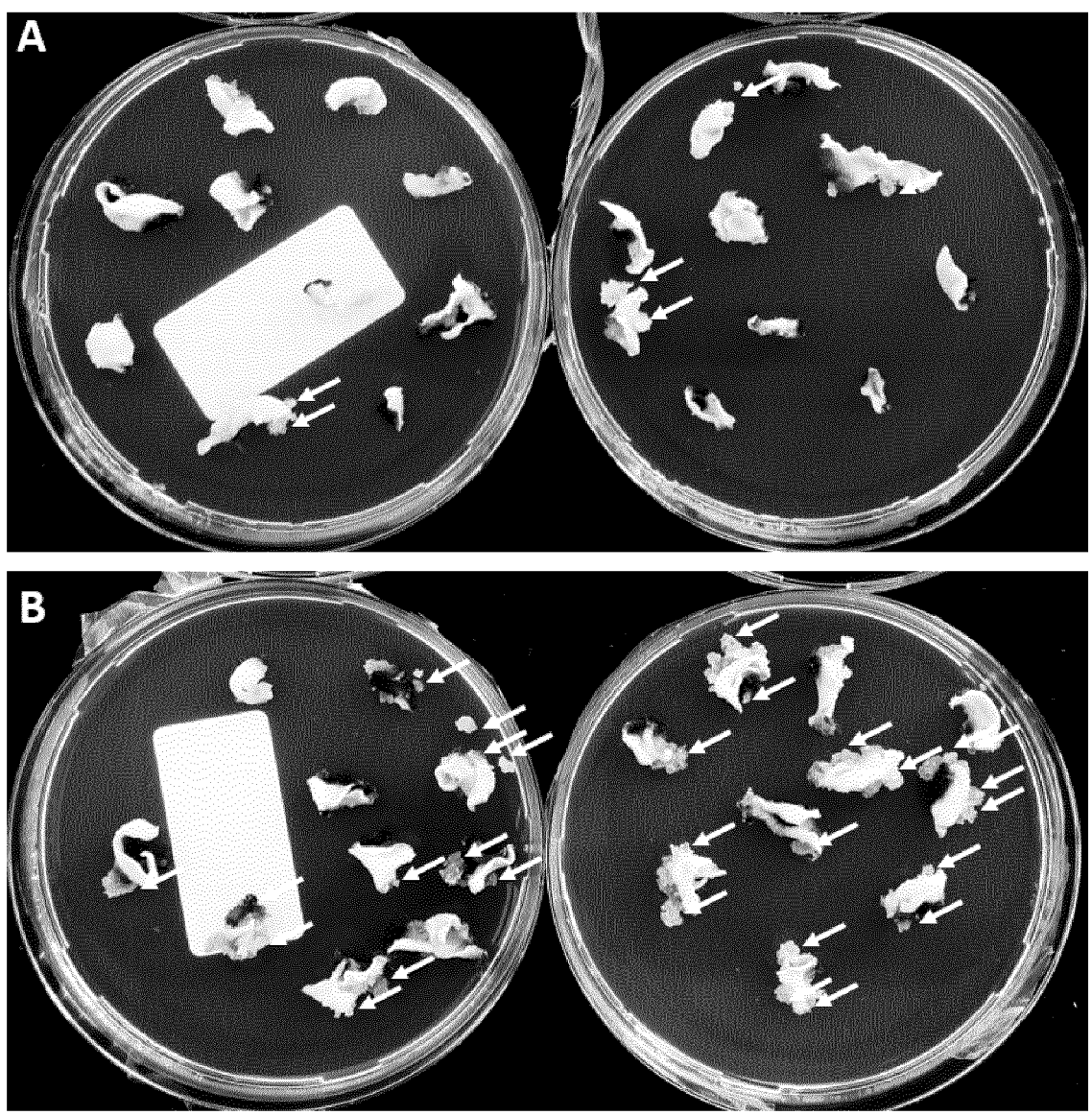
Figure 19:
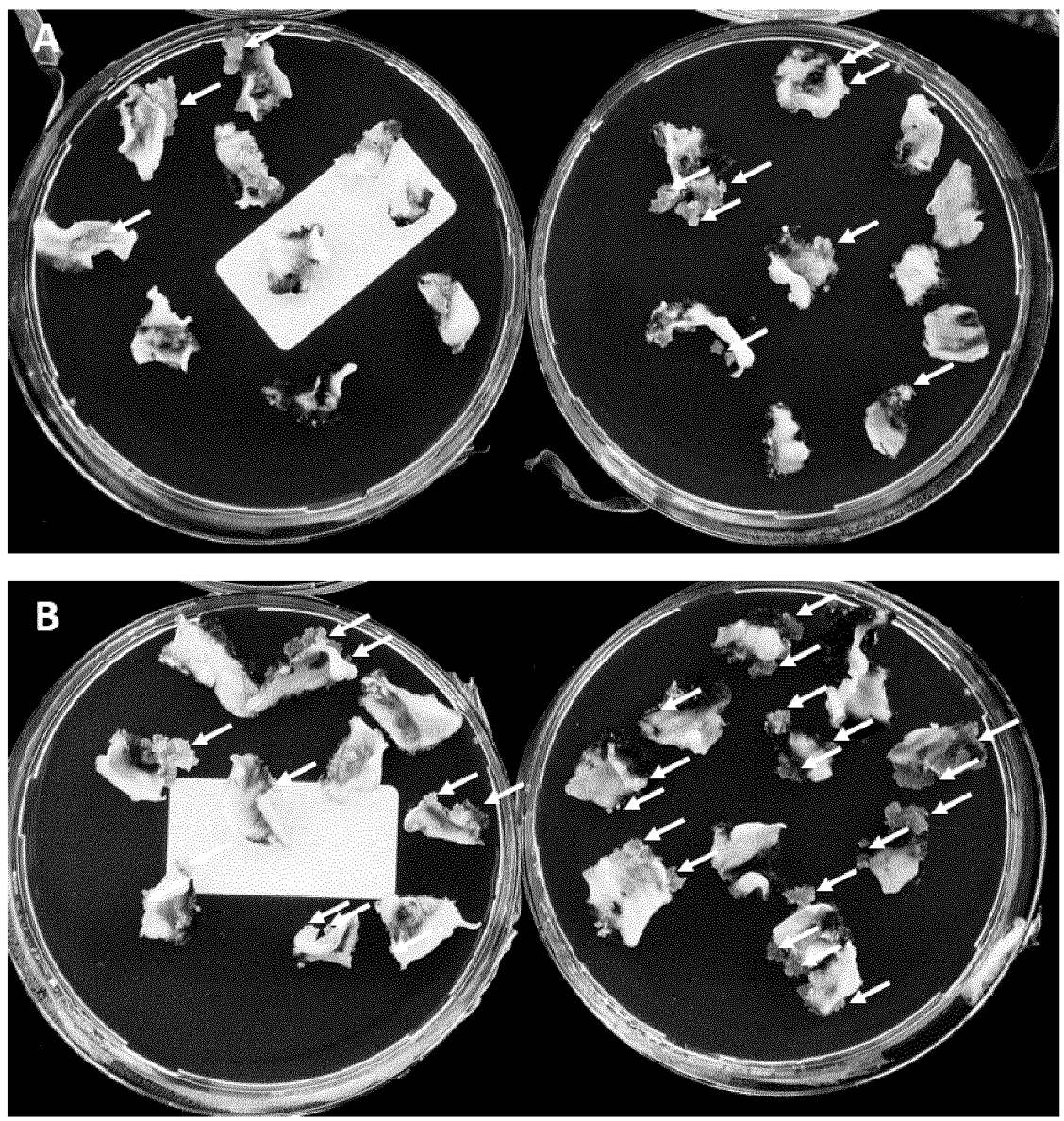
Figure 20:
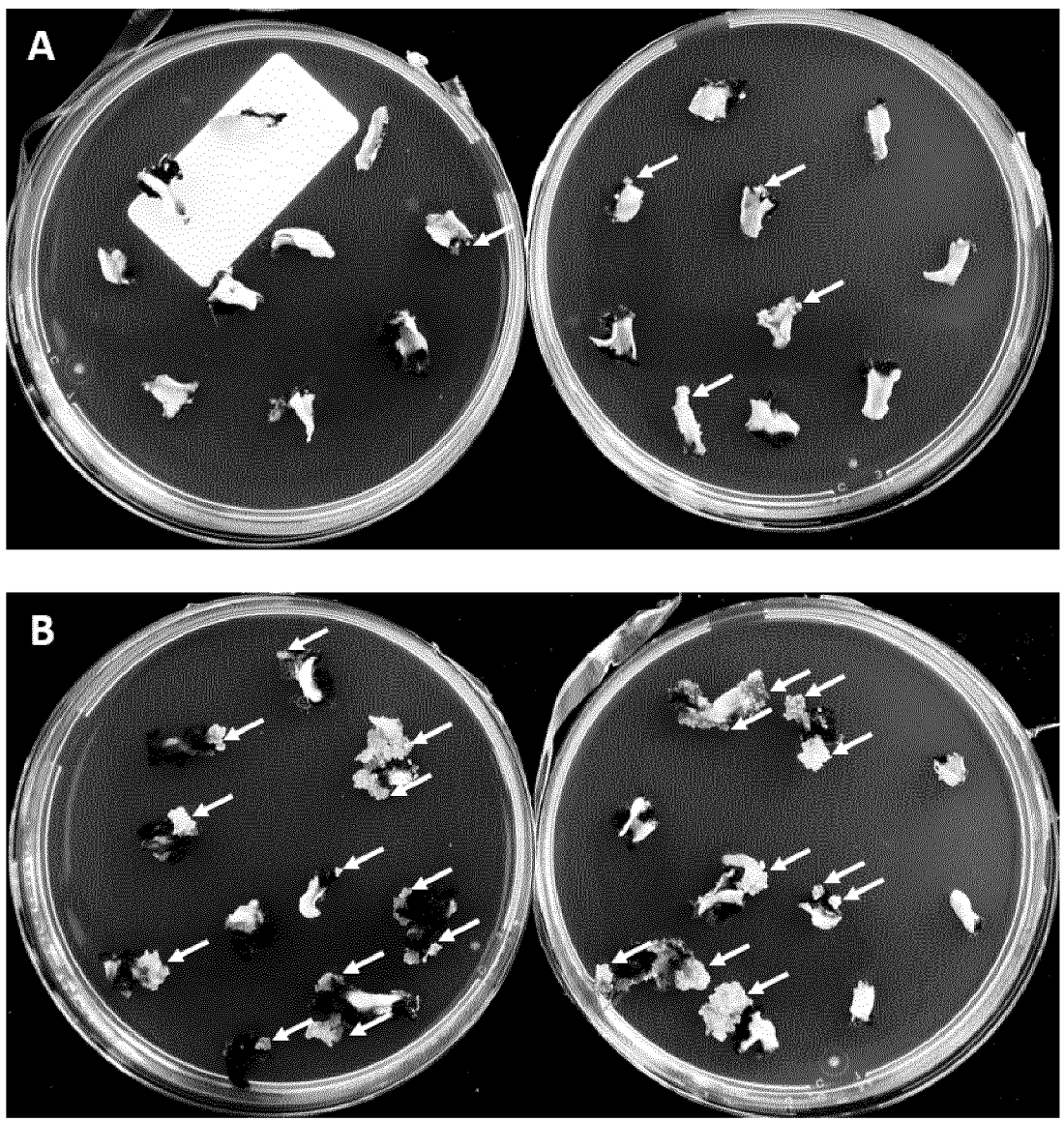

FIG. 17 shows that callus shoot induction of sugar beet genotypes 9BS0448 and 1RV6183 was clearly increased when callus was induced with SNP.

For 9BS0448 only a very low number of shoots were obtained from callus without SNP treatment, whereas when callus of this genotype was induced with SNP a dramatic increase was observed.

With genotype 1RV6183 significant number of shoots were obtainable from callus that received no SNP treatment, however also here a clear increase was detected when the callus was induced with SNP.

These results clearly show the beneficial influence of SNP treatment on shoot induction 14. Sugar Beet Callus of the Recalcitrant Genotype 1T4000 Induced by SNP and Transformed with BnBBM Micropropagated shoots of the sugar beet genotype 1T4000 were induced as described above. To induce friable callus, leaf explants were incubated in medium described above with 100 µM SNP or without SNP, at 28° C. for 7-8 weeks.

The obtained sugar beet calli have been transformed by agrobacteria-mediated transformation or by biolistic delivery with BnBBM-GR under the control of a 70s promoter. No SNP was given to the media used during transformation.

Figure 25:
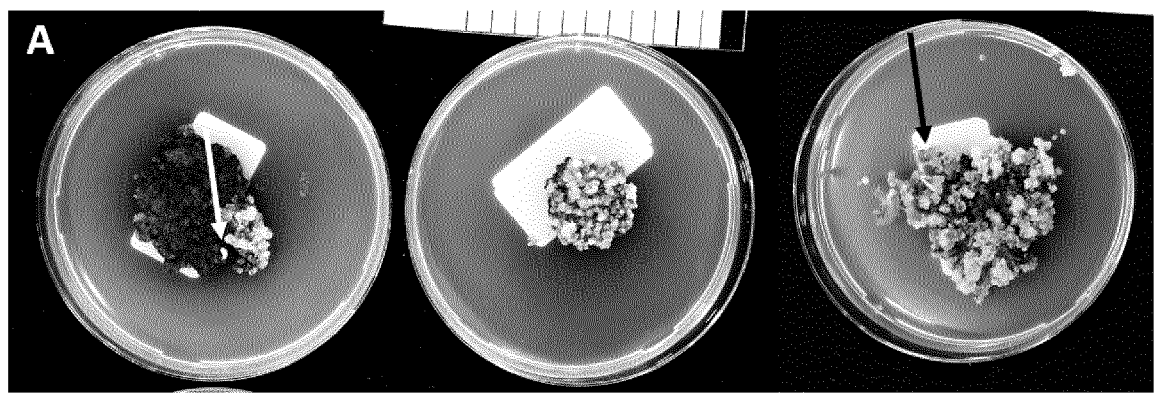
Figure 25:
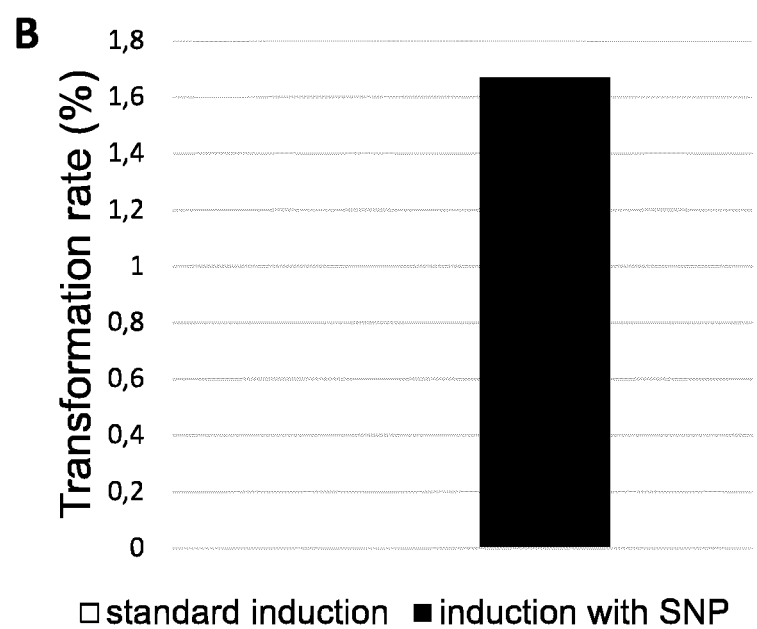

FIG. 25 shows callus of the recalcitrant phenotype 1T4000 induced with SNP and transformed with BnBBM. With SNP a transformation rate of 1.67% was observed when transforming the tissue with BnBBM-GR under the control of a 70s promoter. Without SNP and BnBBM treatment, no shoots have been obtained.

15. Influence of SNP on Seed Production

The total number of seeds as well as the number of viable seeds were determined from sugar beet plants obtained by callus induction including SNP. The results were either compared to data from plants obtained by callus induction without SNP or to data from plants that have not gone through the cycle of callus induction and regeneration but were obtained conventionally (donor plants).

For these approaches, two sugar beet lines have been used (1RV6921 & 9BS0448) and two different SNP concentrations were applied in the callus induction media with 10 µM and with 100 µM.

Figure 26:
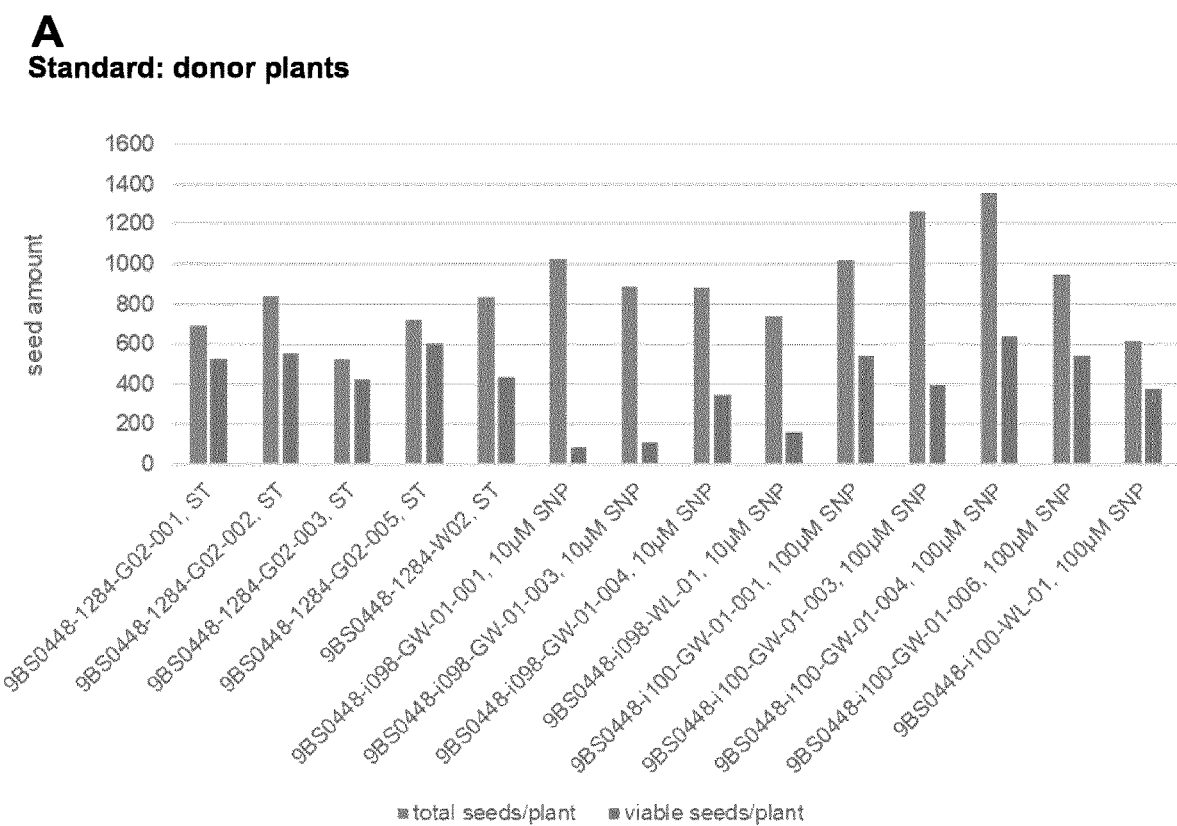
Figure 26:
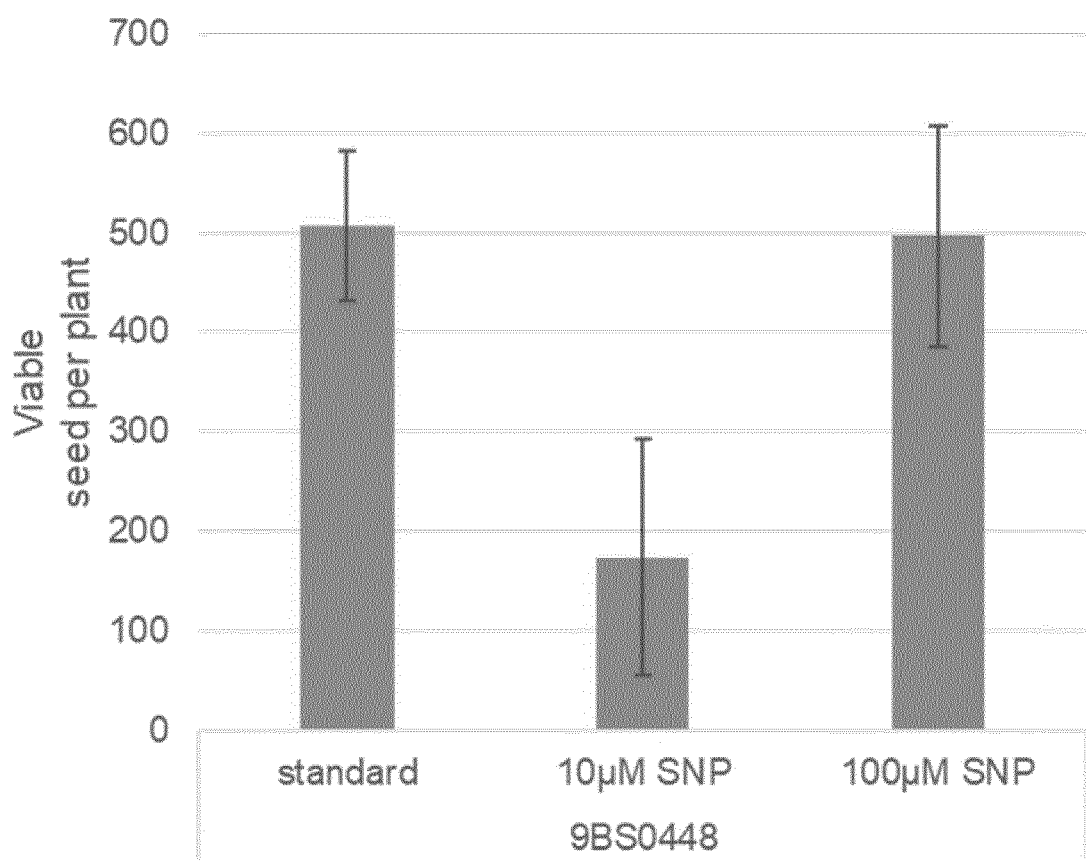

FIG. 26 shows the results obtained with the sugar beet genotype 9BS0448, as comparison donor plants have been used that have not gone through the cycle of callus induction and regeneration but have been obtained conventunally. As shown in FIG. 26 A and B treatment with a low SNP concentration (10 mµM) was leading to relatively low numbers of viable seeds per plant. The rate of viable seeds was approximately lowered by two thirds, when being compared to the donor plants as well as to plants which are obtained with a high SNP treatment for callus induction. Surprisingly, plants obtained from callus induction with a 10× higher SNP concentration produced as many viable seeds as the conventional donor plants. This observation was unexpected, since plants obtained from callus induction and regeneration have normally a reduced seed production rate compared to conventional produced plants.

Figure 27:
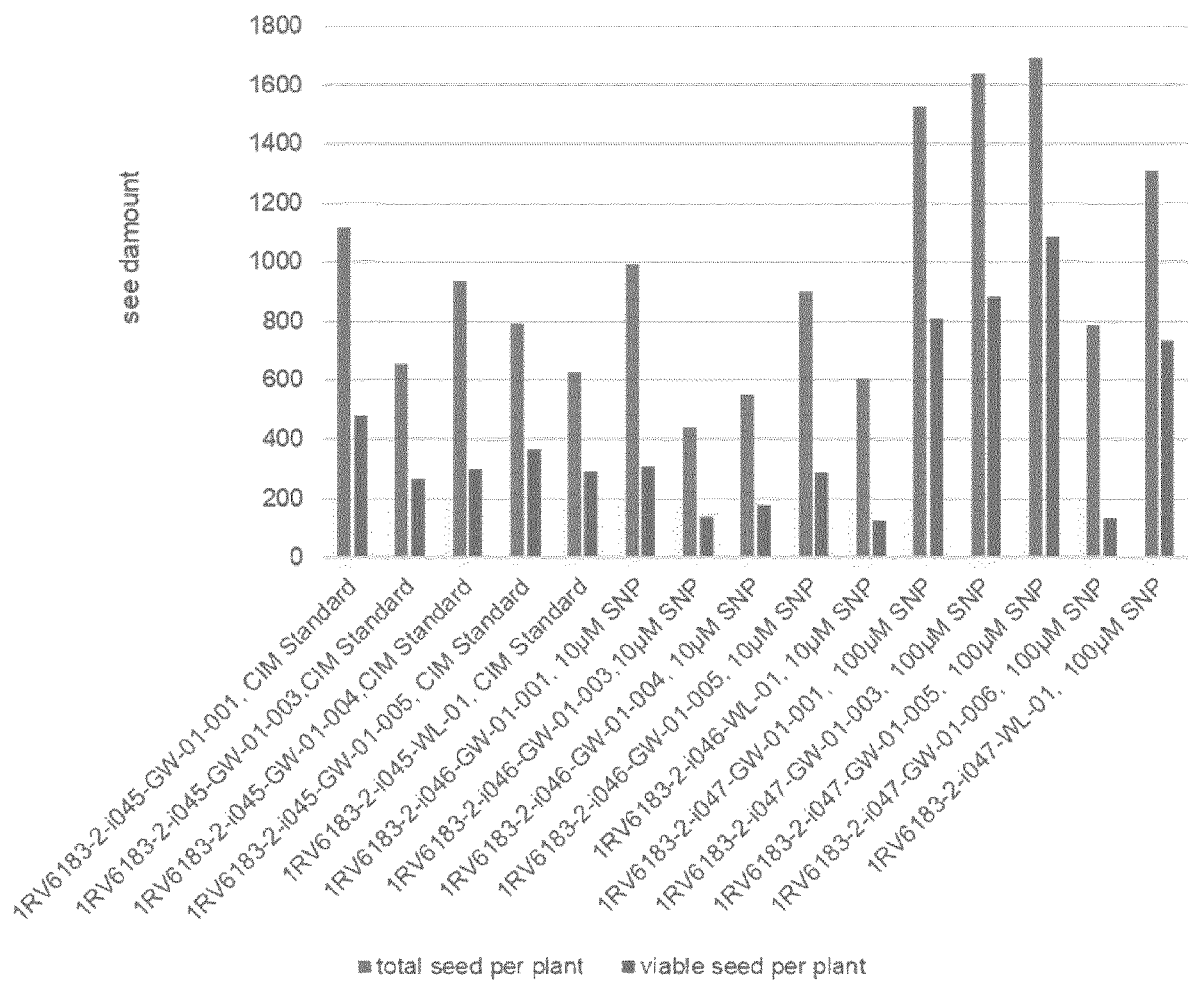
Figure 27:
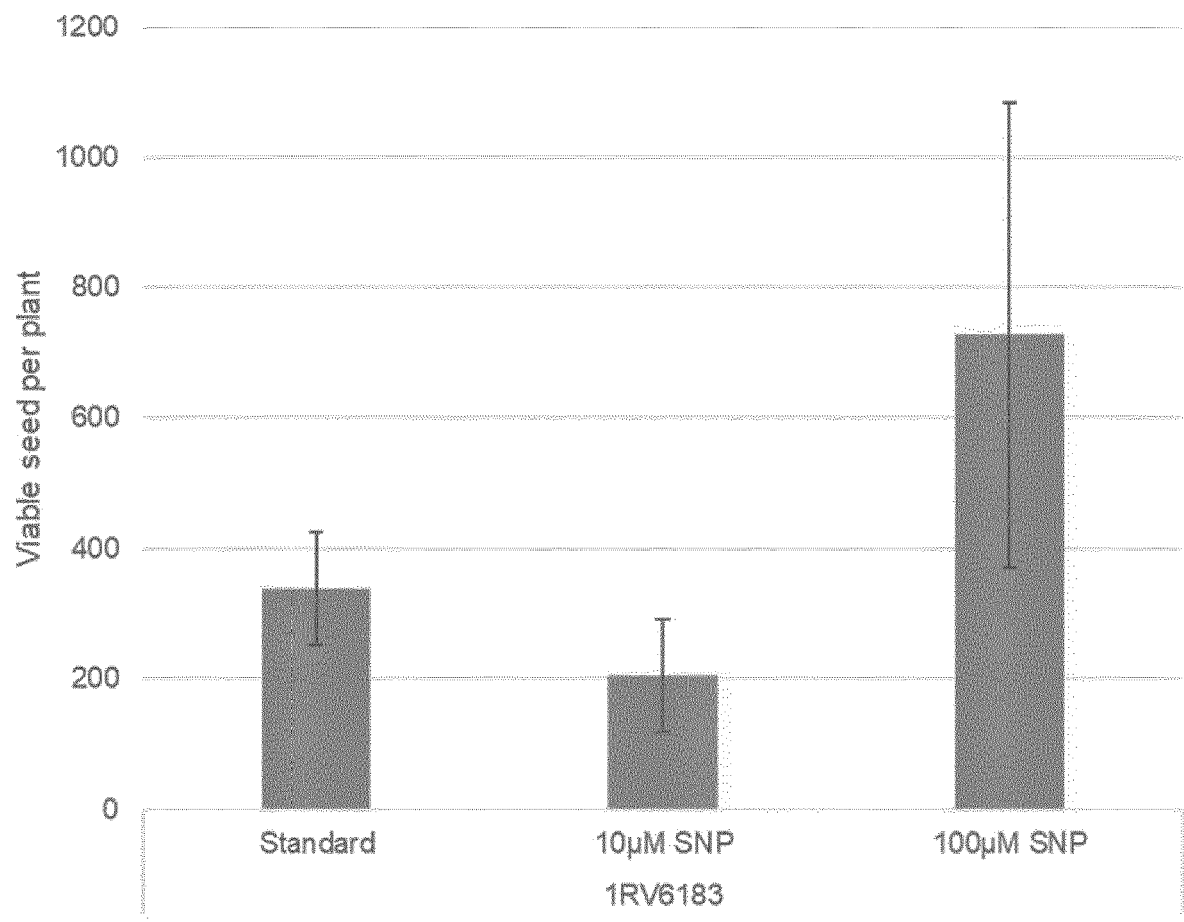

In FIG. 27 results regarding the number of viable seeds are shown from the sugar beet genotype 1RV6921. As a control plants were used which had been generated from callus without SNP treatment. FIG. 27 *b* shows that the number of viable seeds per plant is again relatively low when the callus was induced with 10 µM SNP. Whereas callus induction with 100 µM lead to a clear increase in the number of viable seeds per plant. when being compared to plants from the 10 µM regime but also to plants were no SNP was used for callus induction. This observation supports the data of FIG. 26 and shows the beneficial effect of SNP treatment not only on the callus regeneration but also on the quality of the obtained plants.

16. Plant Development on Media with and without Hormones

Figure 28:
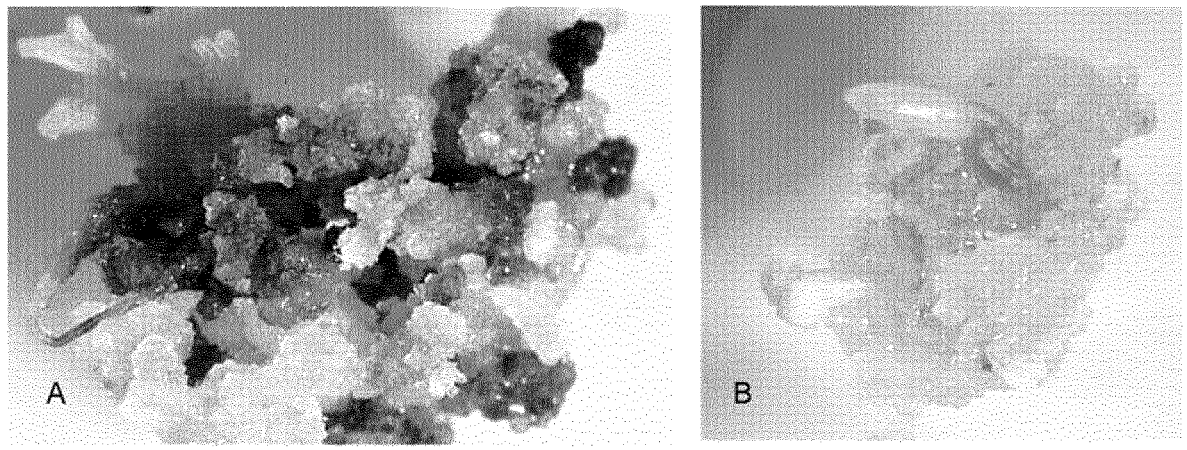
Figure 29:
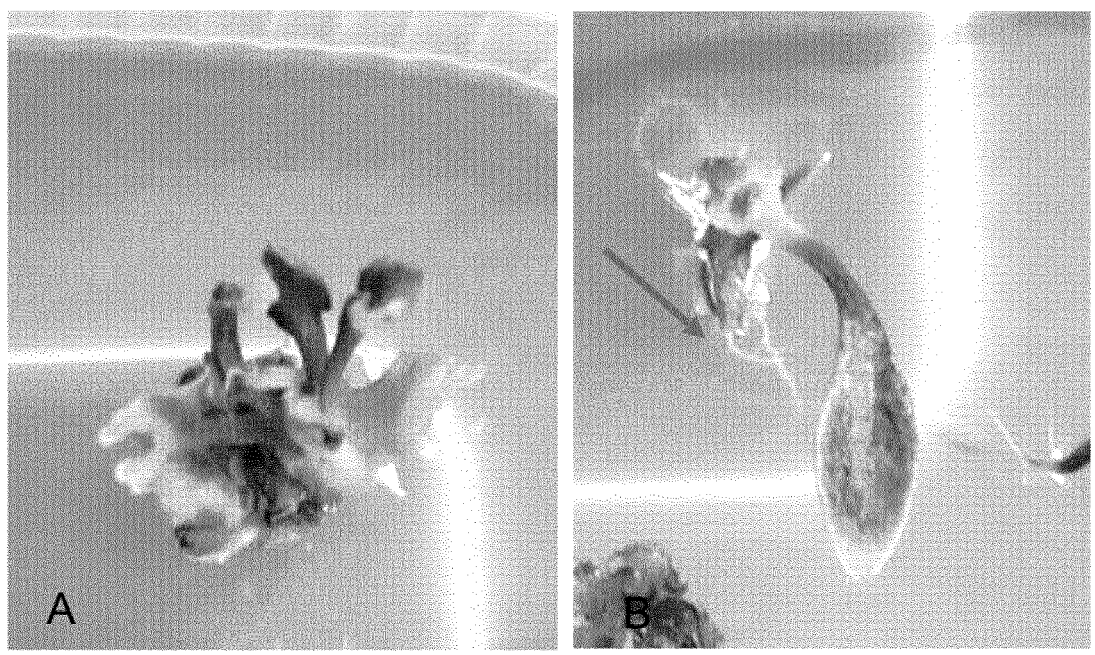

Sugar beet calli were transformed with 35S-BnBBM-GR and placed either on standard medium with hormones (GA3 and BAP) or without hormones. By omitting the hormones GA3 and BAP as medium components somatic embryo formation was clearly more pronounced in comparison to calli cultivated on media with hormones (FIG. 28 and B). In the standard protocol the development of shoots is clearly visible. In subsequent development, seedlings derived from embryos cultivated on hormone free media developed a normal root system (FIG. 29), whereas shoots, which were cultivated on media containing hormones, showed no roots (FIG. 29). This protocol for plant development is also called one-seedling protocol.

Figure 30:
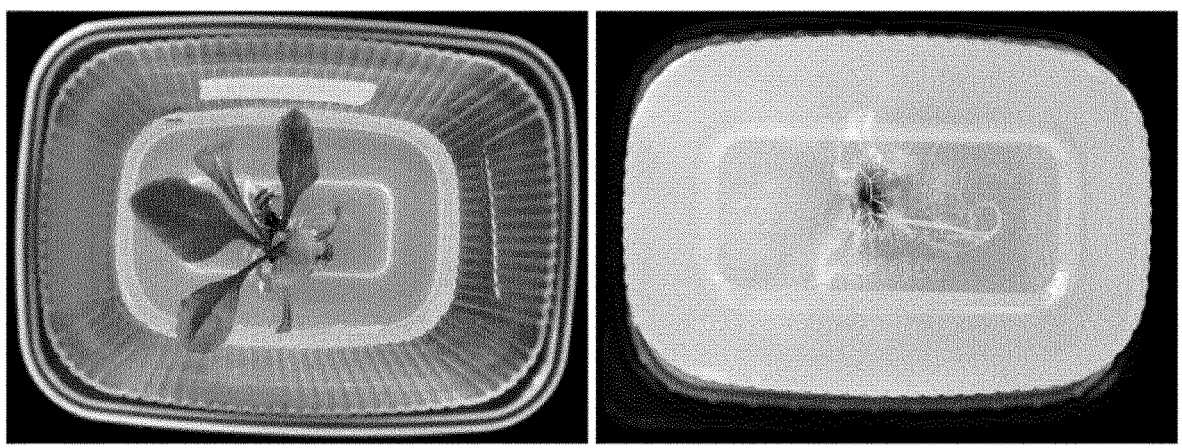
Figure 30:
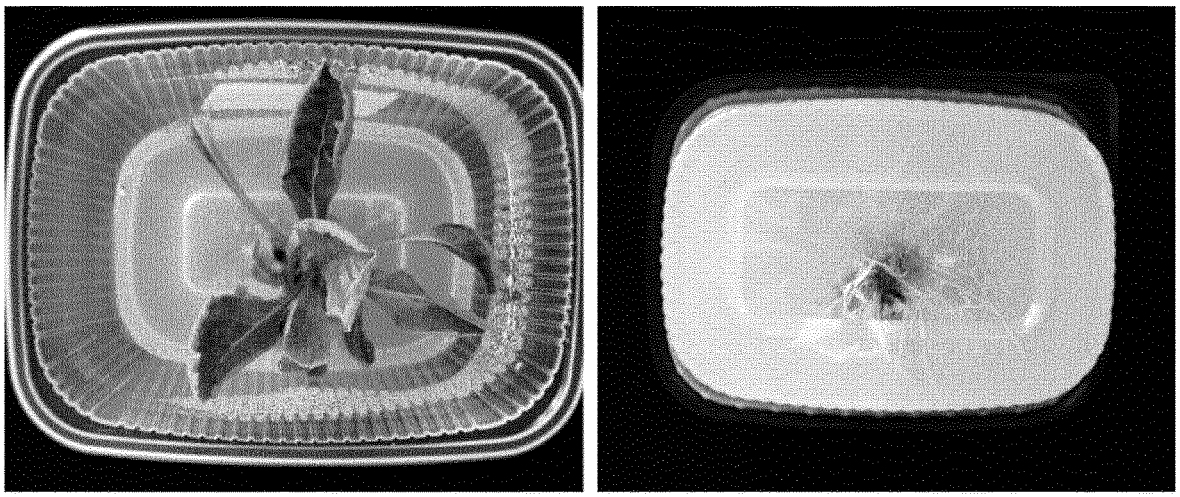

In FIGS. 30 and B plants are shown which have been developed from seedlings grown on hormone free media. These plants have no obvious phenotype and developed a normal root system without artificial induction of root growth.

Figure 31:
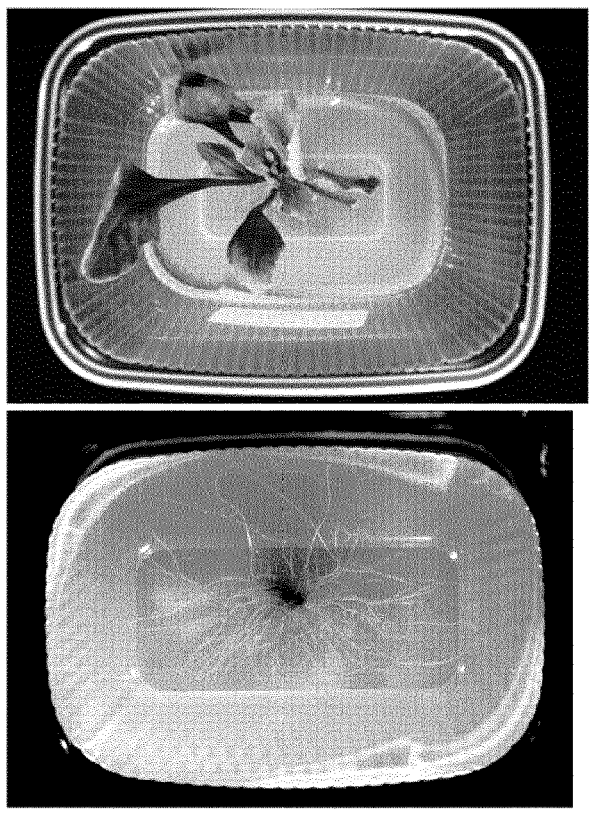
Figure 31:
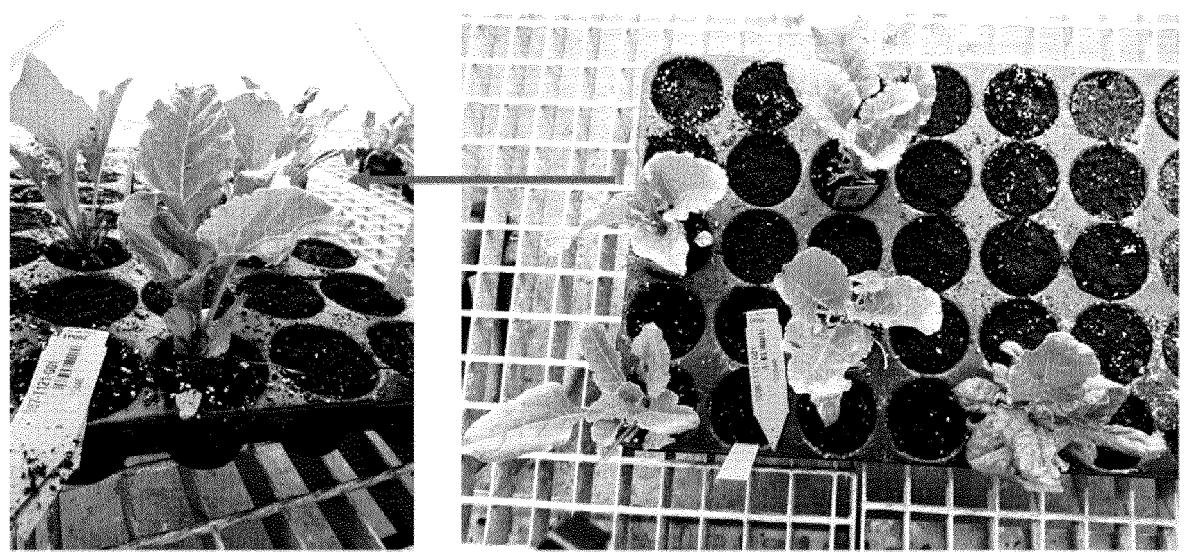
Figure 32:
Figure 33:
Figure 33:

It could be demonstrated that this beneficial effect on BnBBM is achievable by *Agrobacterium* transformation (see FIGS. 28-30) as well as by particle bombardment (FIG. 31). Transgenic 35S-BnBBM-GR plants obtained by transformation via particle bombardment developed in vitro also a proper root system (FIG. 31A). After transfer to the greenhouse these plants do not develop an obvious visible phenotype (FIG. 31B) and have a similar appearance like plants obtained by *Agrobacterium* mediated transformation.
17. Development of Plants after Transfer to Soil and Cultivation in the Greenhouse Plants were transferred from hormone free media to soil after one to three months depending on the developmental status and were cultivated for one month in the greenhouse. In FIG. 32 the root system of such a *Beta vulgaris* plant is shown which has been developed from a seedling grown on hormone free media. The plant shows a robust root system and also the upper ground part of these plants have developed no obvious phenotype (FIG. 33).

Figure 34:
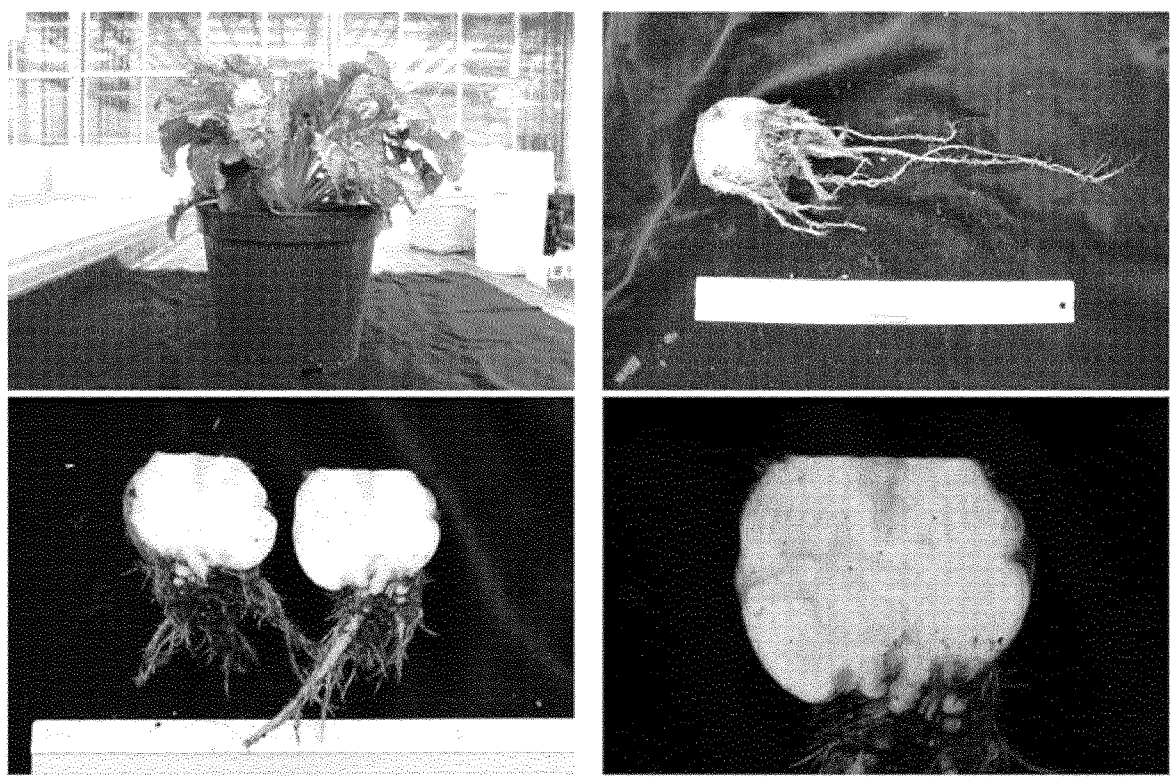
Figure 35:
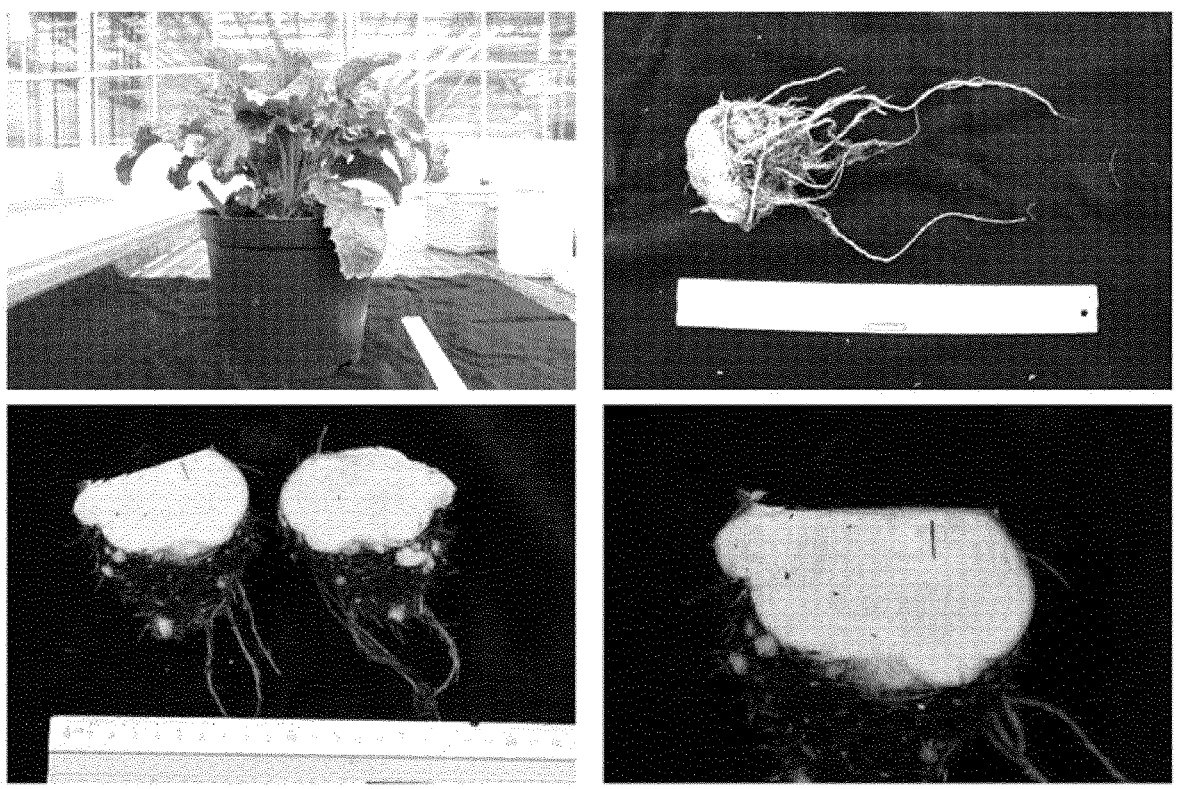

After 4 months in the greenhouse the morphology of the tap root was evaluated. In the cross section, the overall size as well as the overall appearance no obvious abnormalities of the tap root morphology had been observed (FIGS. 34 and 35) Beside the tap root morphology also photosynthesis rate (FIG. 36*a*), and sucrose concentration in tap roots have been analysed (FIG. 36*b*).

Figure 36:
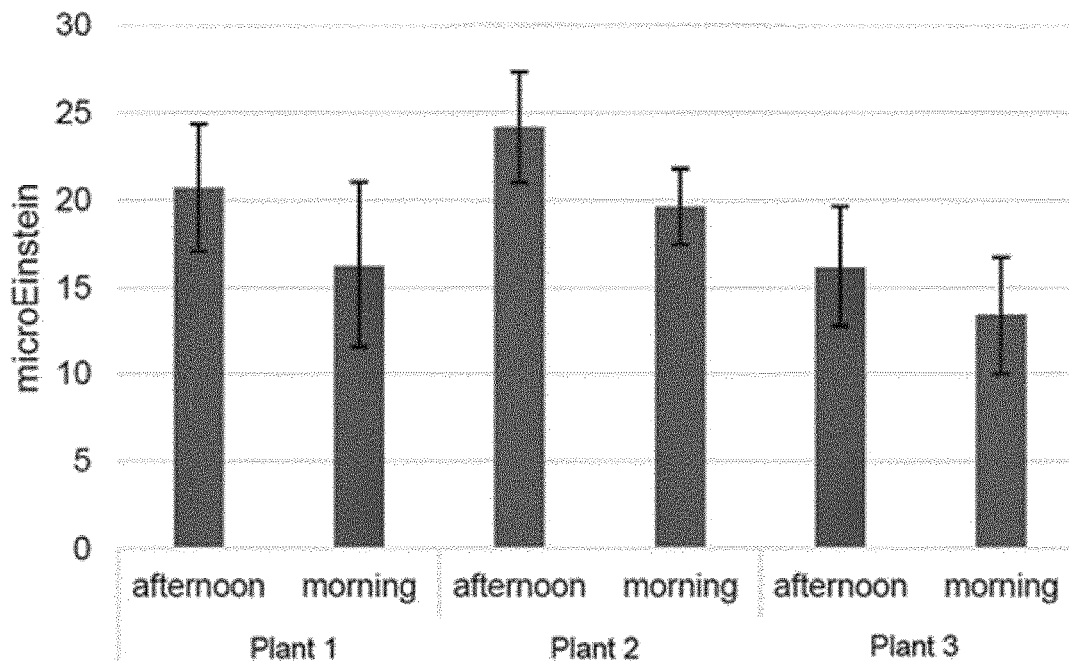
Figure 36:
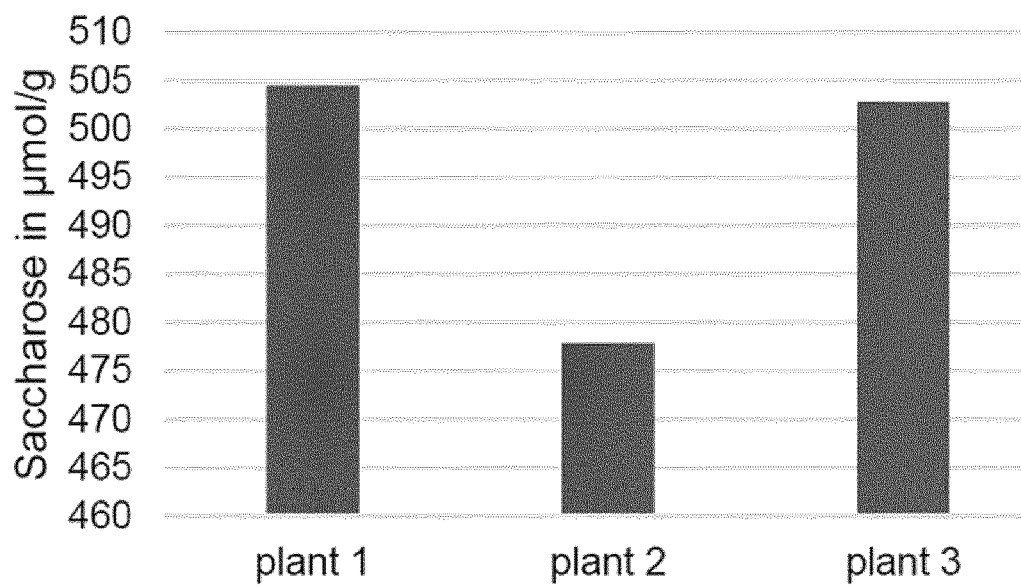

As shown in FIG. 36*a* for three plants the photosynthesis rate has been determined two times a day. All results were approximately in the range of 15 microEinstein to 25 microEinstein.

In FIG. 36*b* the results of the sucrose content in the tap roots are shown in μmol/g for three different plants, the results are between 475 and 505 μmol/g.
Starch and Soluble Sugar Contents Extraction: Plant material is extracted with 80% ethanol at 80° C. for 1 h. Soluble sugars dissolve in ethanol. The extract is dried with help of a vacuum centrifuge and material resolved in water. The remaining extracted material will be ground if it had not already been so for ethanol extraction and again extracted with 0.2N KOH at 95° C. for 1 h. Starch is partly hydrolyzed and dissolved at this step. After cooling down the samples to room temperature, 1M acetic acid is added to set the pH to 5-6. By addition of appropriate amounts of amyloglucosidase and alpha-amylase and incubation at 37° C. for at least 4 h and additionally at room temperature overnight starch is degraded to glucose.

Determination of concentrations: Aqueous solutions are used to measure the concentrations of glucose, fructose, sucrose and starch (via glucose) by a coupled optical-enzymatic test using any type of photometer. The measuring buffer contains of 100 mM HEPES pH 7.4, 1 mM NAD, 2 mM ATP, 10 mM $MgCl_2$ and an appropriate amount of glucose-6-phosphate dehydrogenase. After addition of aqueous extract extinction/absorption is measured at a wavelength of I=340 nm (0 value). To measure glucose, an appropriate amount of hexokinase is added and measured long enough to convert all glucose to glucose-6-phosphate and fructose to fructose-6-phosphate. To measure fructose, an appropriate amount of phosphoglucoisomerase is added to convert all fructose-6-phosphate to glucose-6-phosphate. To measure sucrose, an appropriate amount of invertase (beta-fructosidase) is added to fully split sucrose into glucose and fructose which, in turn, are further converted to glucose-6-phosphate intermediary. Whenever in this series of enzyme reactions glucose-6-phosphate is produced, it is further oxidized to gluconate-6-phosphate with a simultaneous reduction of NAD to NADH. The latter reduction gives the read-out for the respective concentrations as NAD does not absorb light of 340 nm wavelength whereas NADH does. With help of the extinction coefficient of NADH at 340 nm and the Lambert-Beer quotation, the concentration of NADH in solution can be calculated. Knowing that glucose and fructose give rise to an equimolar concentration of NADH, both sugar concentrations can be calculated. For 1 mole of sucrose, 2 moles of NADH are formed. By also knowing the sample weight and volumes of liquids used in the process, the amounts of glucose, fructose, sucrose and starch (as mol hexose unit per mass) can be calculated form the concentrations measured.

The described data for plants derived from a hormone free transformation are in the normal range of seed derived plants.

Figure 37:
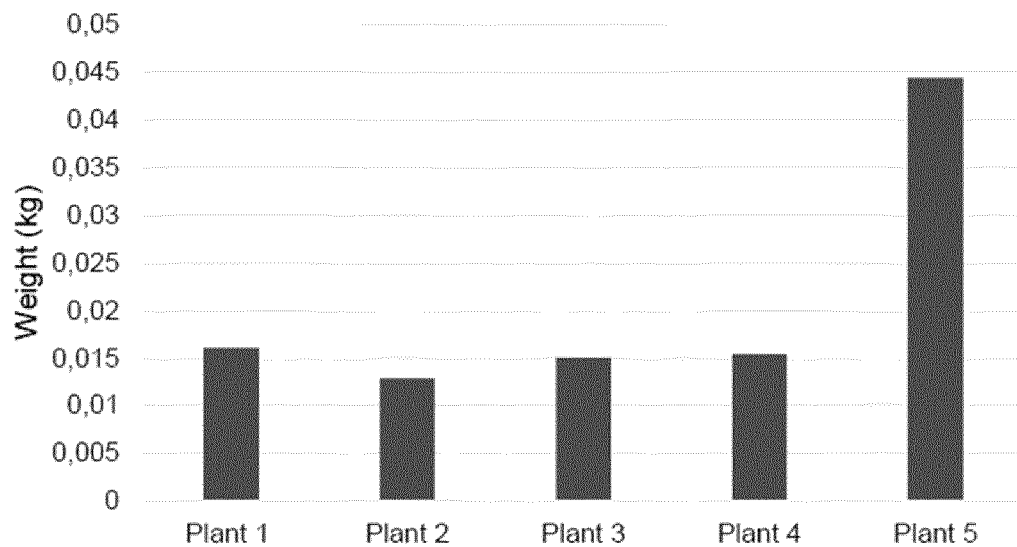
Figure 37:
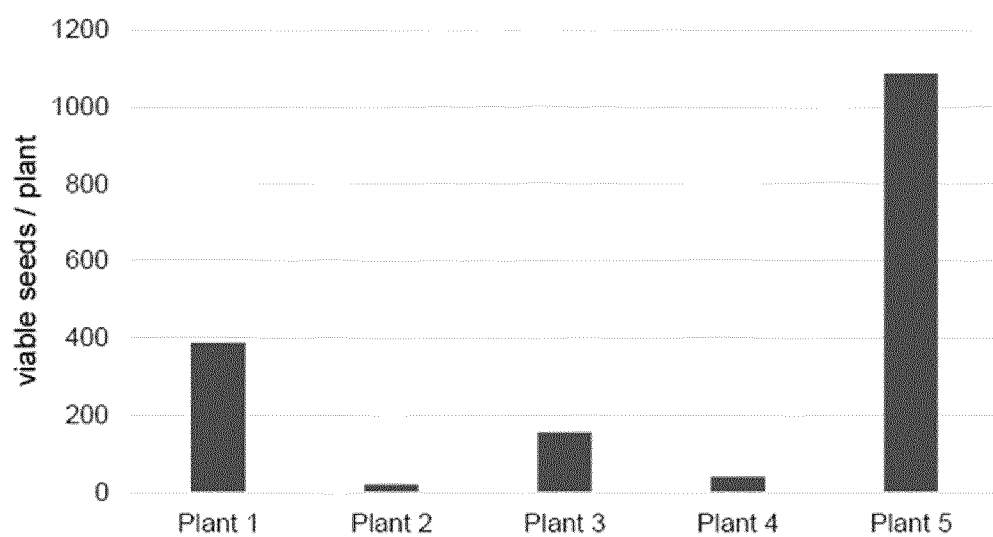

The transgenic 35S-BnBBM-GR plants obtained by the hormone free transformation protocol show a normal development and a properly developed root system, furthermore these plants are also fertile as shown in FIG. 37. The seed weight in kg per plants has been determined from 5 different transgenic plants (FIG. 37), additionally the viable seeds per plants have been counted (FIG. 38).

The results for seed weight are around 0.015 kg/plant for 4 plants, one plant had almost 0.045 kg seeds. Viable seeds have been obtained from all 5 tested plants; however, the results show a certain range with 30 viable seeds per plant to 1100 viable seeds per plant.

Figure 38:
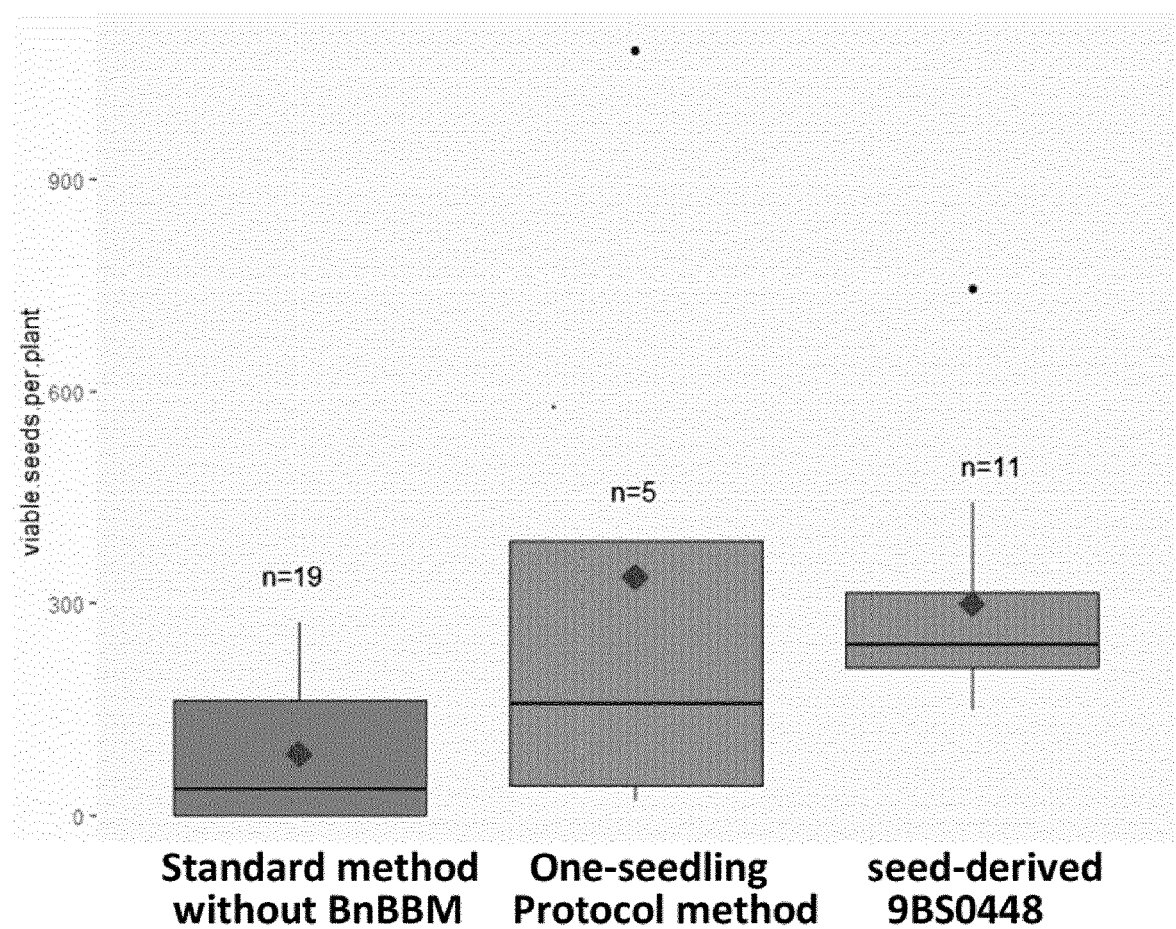

In FIG. 38 the number of viable seeds per plants is compared between plants obtained by a standard *Agrobacterium*-based transformation without BnBBM, the described hormone free transformation method with BnBBM and plants derived from seeds of SB line 9BS0448 as reference. The presented results show that seed production from transgenic 35S-BnBBM-GR plants is better than from plants obtained by a standard *Agrobacterium* transformation method.
18. Analysis of Tap Roots from a Second Batch of Plants Derived in a Hormone Free Environment.

Figure 39:
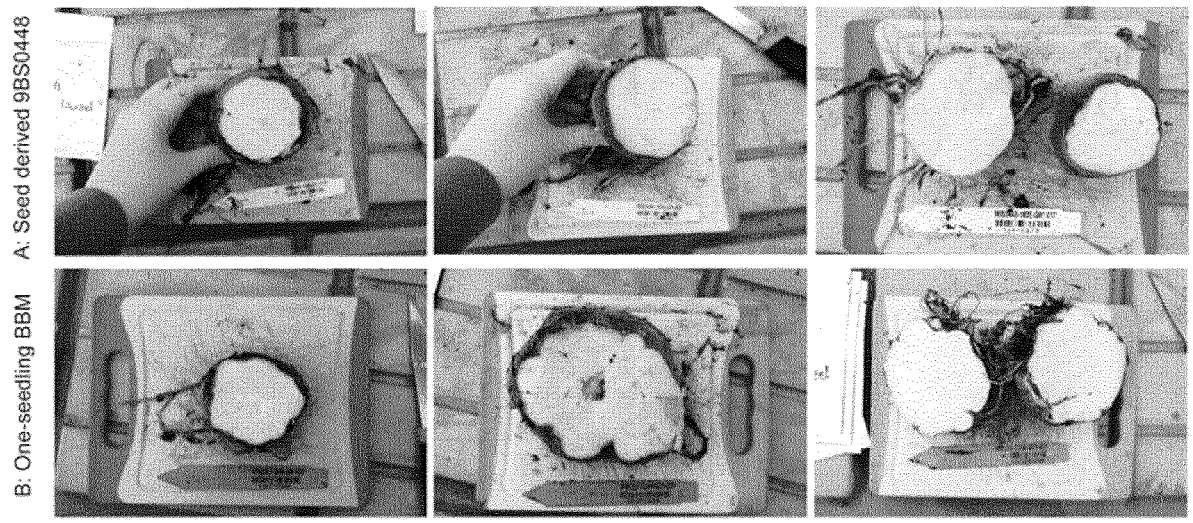
Figure 40:
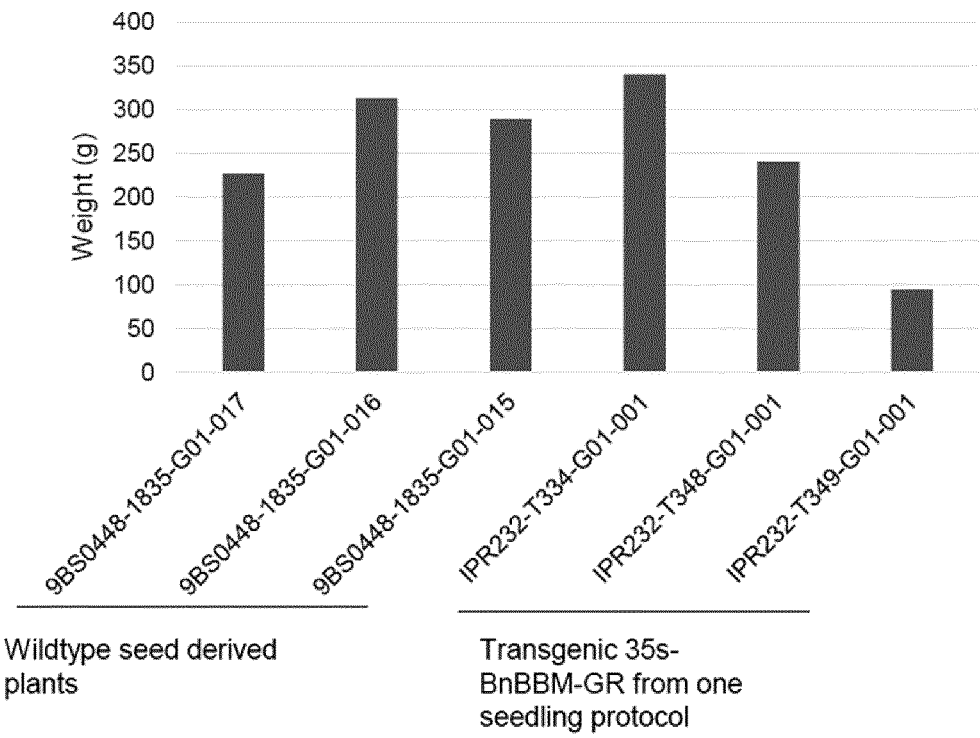
Figure 40:
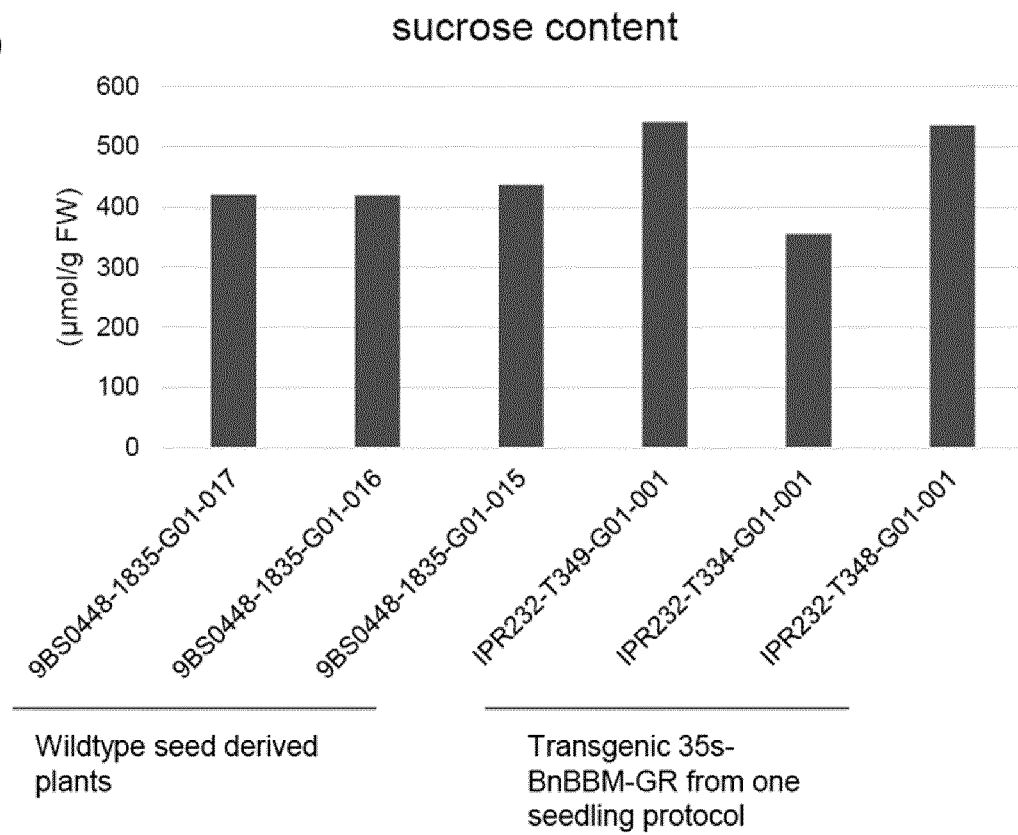
Figure 41:
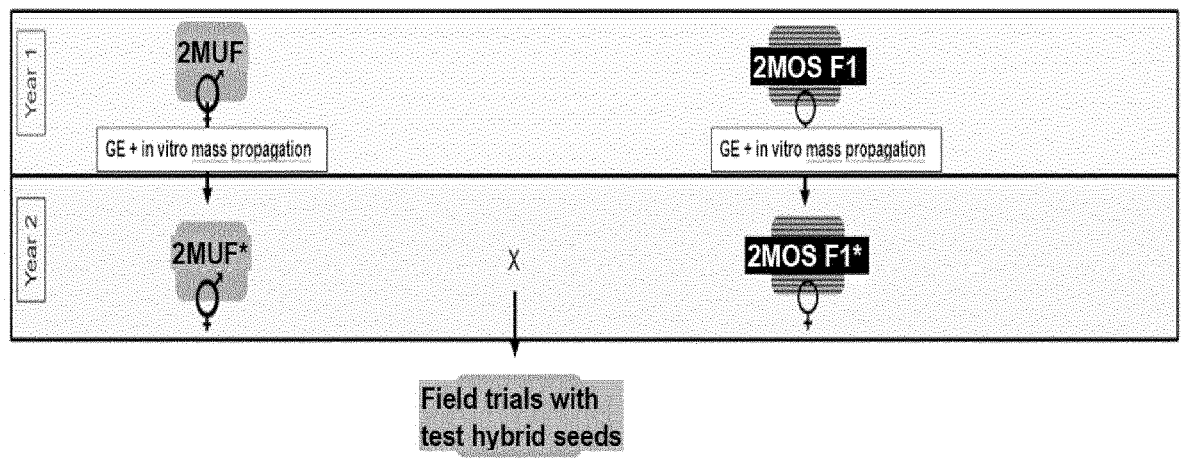
Figure 41:
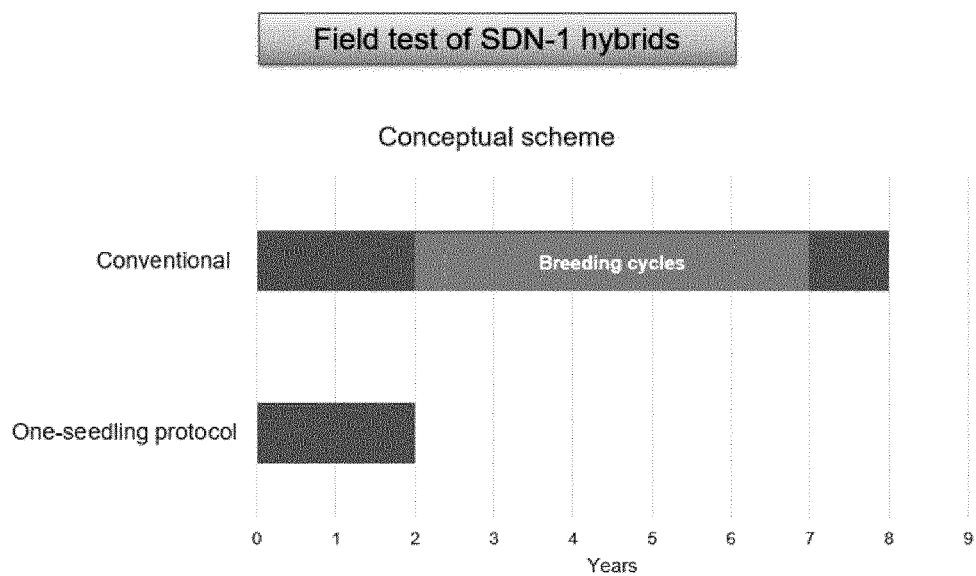

After 4 months of growth in the greenhouse tap roots were harvested from seed derived *Beta vulgaris* plants or from transgenic 35S-BnBBM-GR plants derived from Example 9. No obvious differences were identified as shown in FIGS. 39 and 40.

Furthermore, the tap root weight (FIG. 40) as well as the sucrose content (umol/g FW (fresh weight)) (FIG. 40) were analysed. In FIG. 40*a* the root weight of WT (wild type) seed derived plants and transgenic 35S-BnBBM-GR from the hormone free approach are shown. Results vary between approx. 100-350 g. For the sucrose content values between 350-520 μmol/g FW have been determined.

Overall, these results show that the tap root weight as well as the sucrose content of the transgenic plants from the described hormone free protocol are comparable with seed derived wild type controls.

19. Effect of Deletions at C- or N-Terminal of BnBBM

Experiments in *Arabidopsis thaliana*

Vector Construction

The BBMA (1-161), and BBMA (390-579) deletion constructs used for stable transformation in *Arabidopsis* were PCR amplified and then cloned into the pTYG52 binary vector derived from pGSC1700 (Cornelissen and Vandewiele, 1989).

The respective sequences in *Arabidopsis* were under the control of a 35S promotor.

Plant Transformation and Selection

Figure 42:
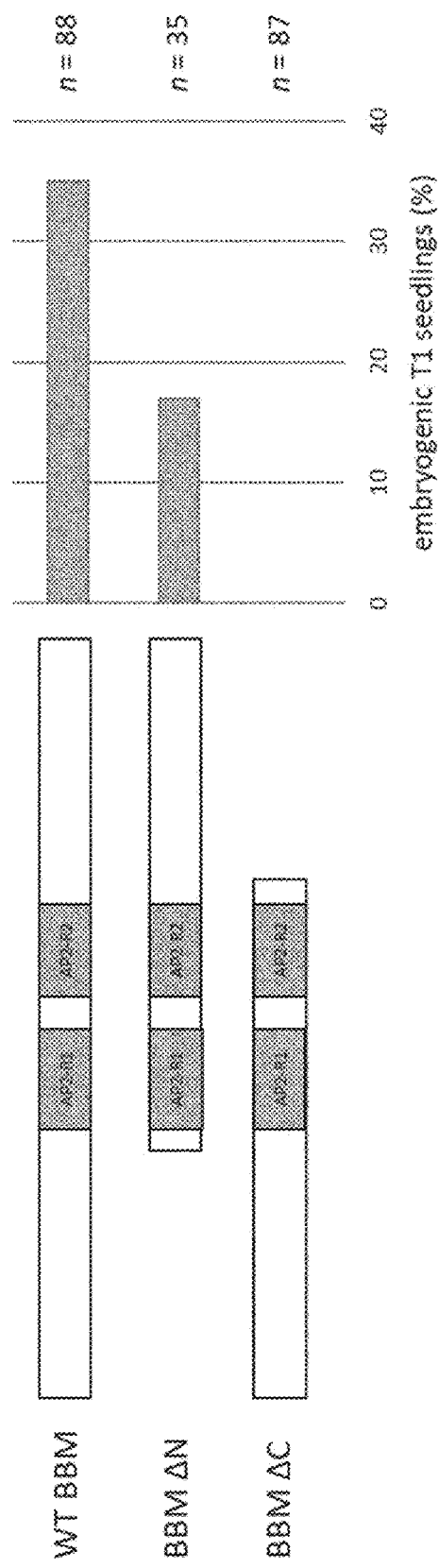
Figure 43:
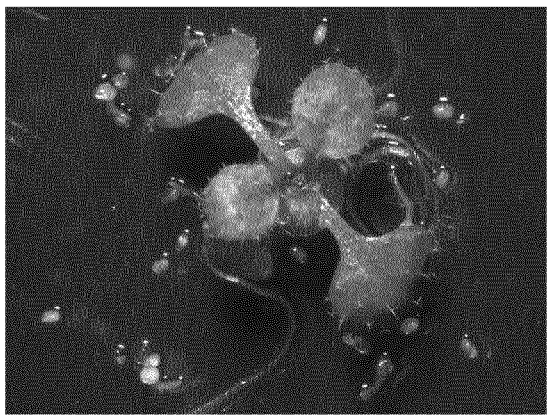
Figure 43:
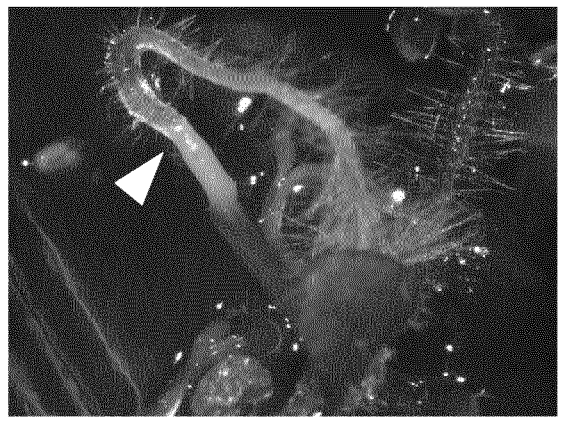
Figure 43:
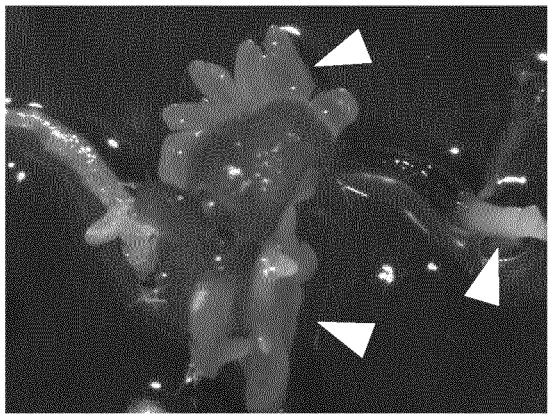
Figure 43:
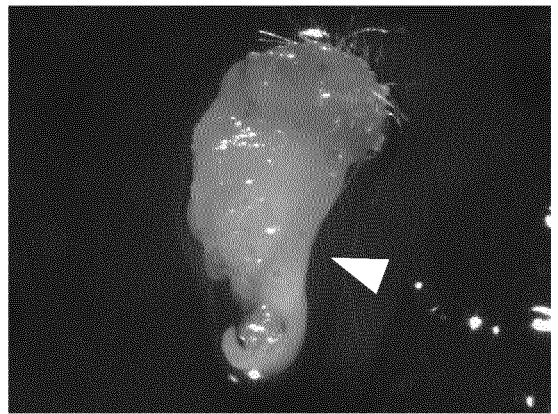

All constructs were transformed using the floral dip method (Clough and Bent, 1998). Seeds were sterilized with liquid bleach as described previously (Horstman et al., 2017) and plated on ½ MS-10 medium (half-strength Murashige and Skoog salts with vitamins, pH 5.8, 1% sucrose, and 0.8% agar) with phosphinothricin (PPT) for selection. T1-plants were cultured at 21° C. (16 h light/8 h dark cycle) for ten days, after which the phenotypes were assessed by visual inspection using a stereo microscope. T1-Seedlings were scored as non-embryogenic (FIG. 43A) or embryogenic (FIG. 43B-D). Typical phenotypes observed from transgenic seedlings expressing either the full-length BnBBM or the BBMΔ (1-161) construct are shown in FIG. 42.

The data suggest that the N-terminal region of the BnBBM protein is not absolutely required for its function, as such an N-terminal truncated protein is still able to induce somatic embryogenesis. By contrast, deletion of the C-terminal region of the BnBBM protein compromises its function, as its ectopic expression is not sufficient to induce somatic embryogenesis. The C-terminal protein sequences might be required for essential BBM protein-protein interactions, BBM transcriptional activation and/or BBM protein stability.

In sum, one can say there is no obvious explanation therefore this result could be understood as unexpected.

Experiments in Sugar Beet

Figure 44:
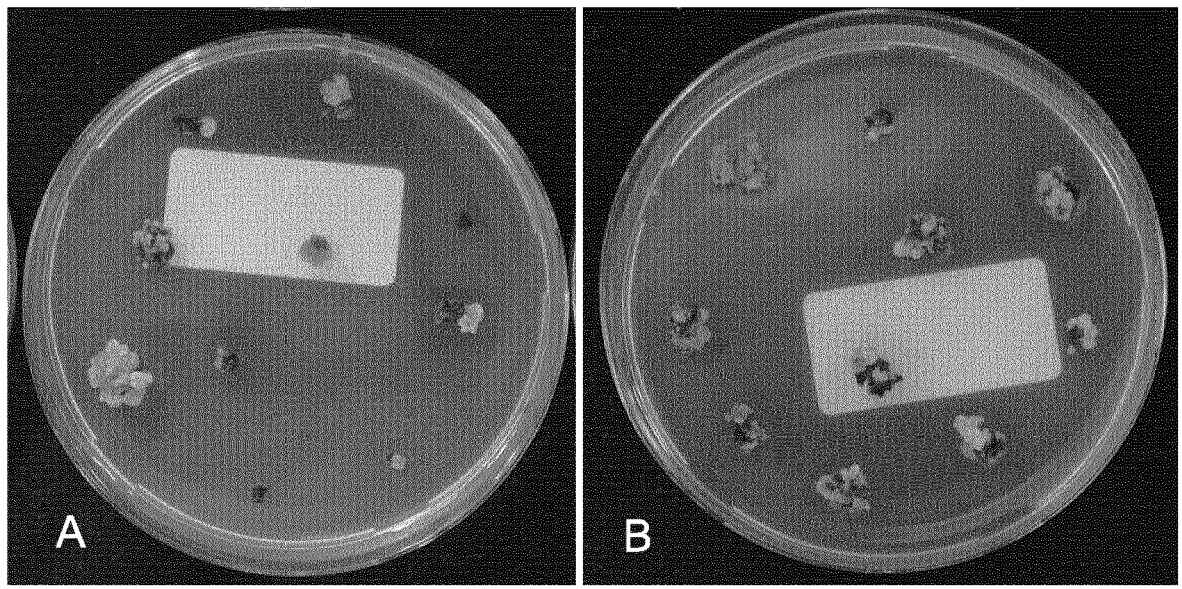
Figure 44:
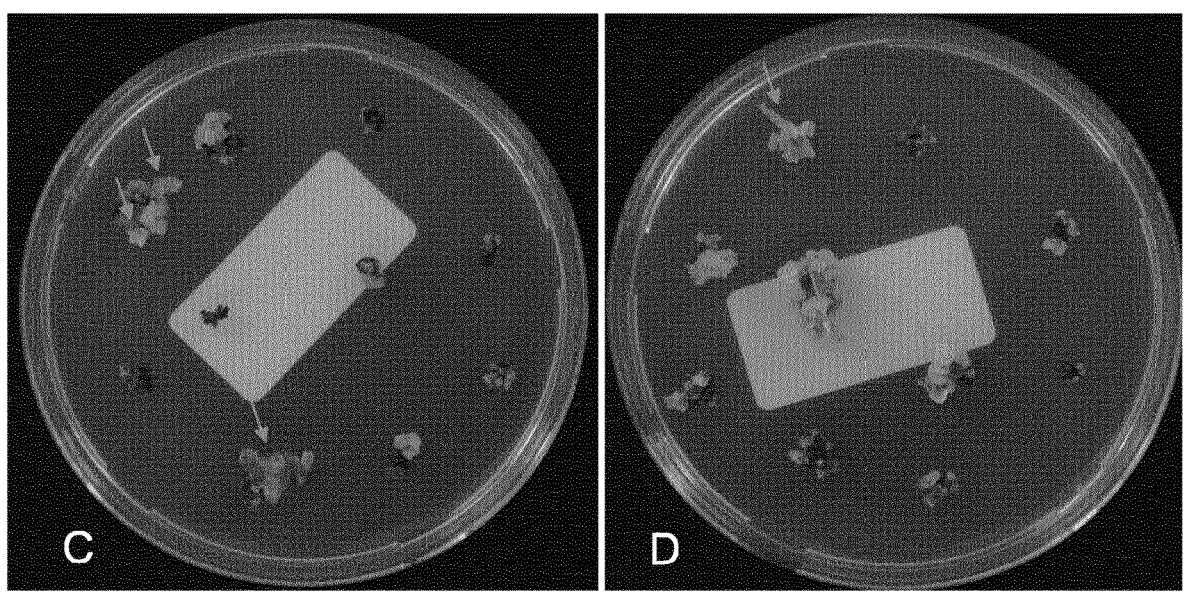
Figure 45:
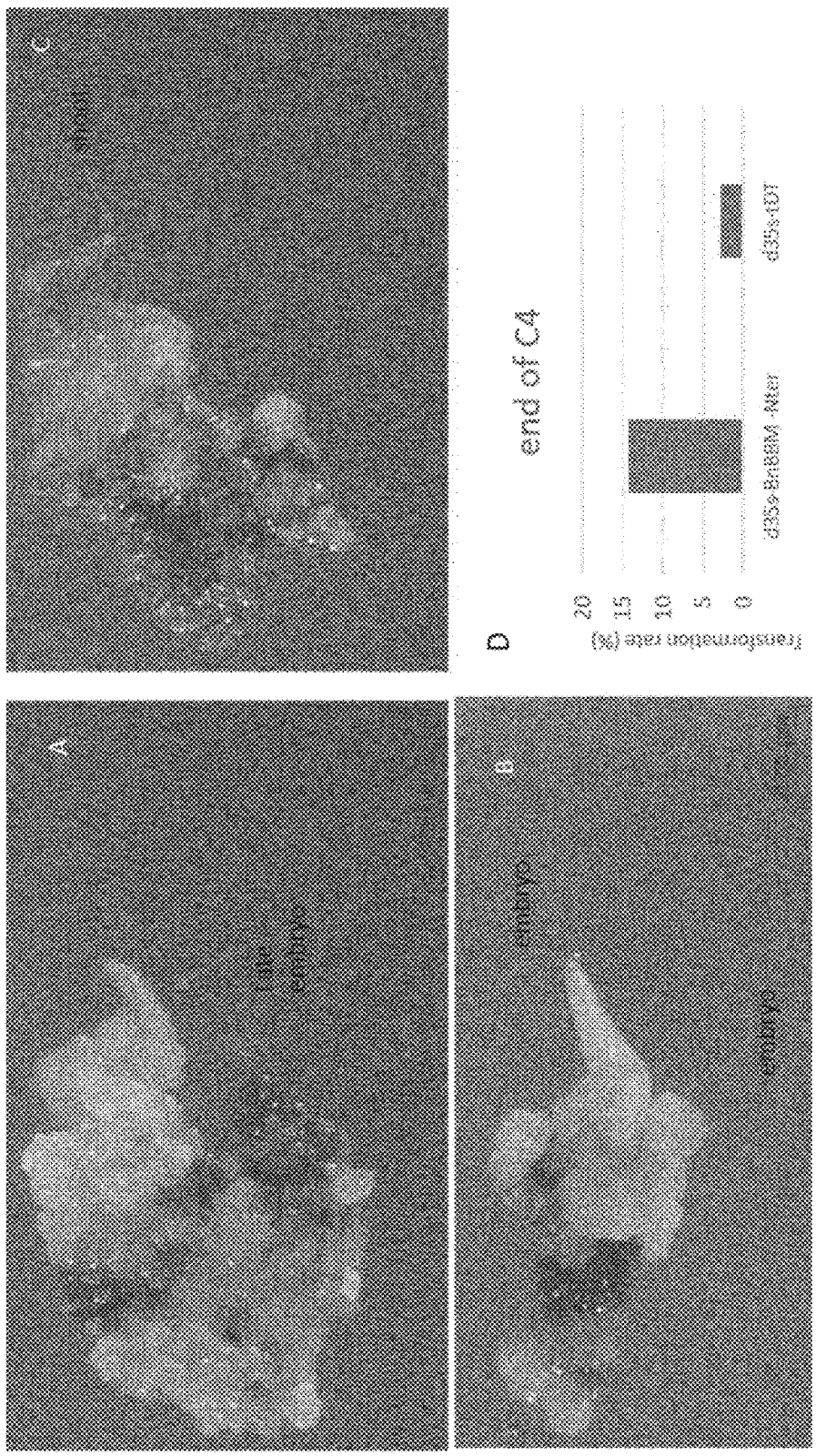
Figure 46:
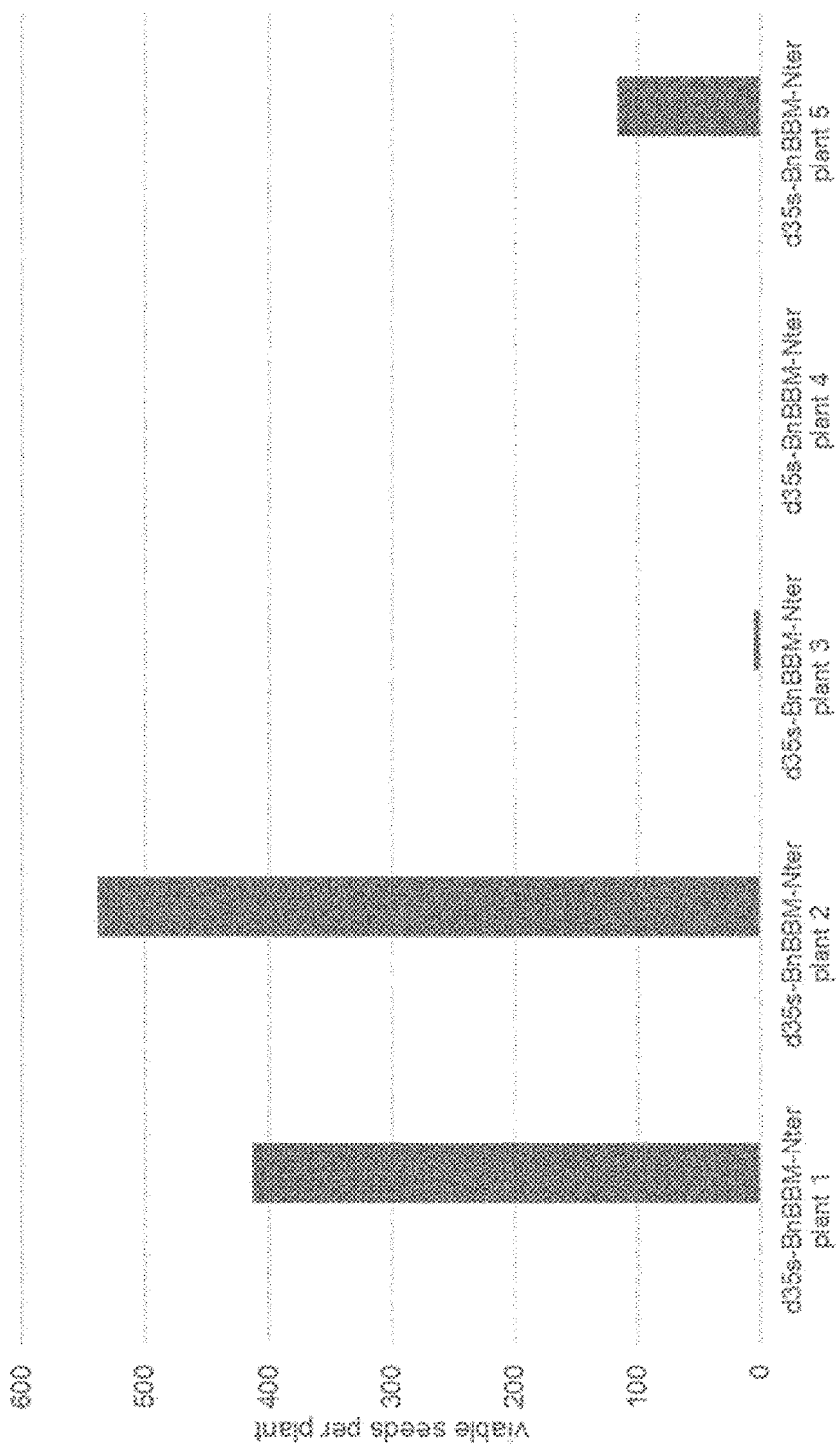

Sugar beet results were obtained for the full length and the N-truncated version of BnBBM in a similar way as described for *Arabidopsis*. A much higher transformation frequency using the N-truncated version of BnBBM can be achieved, compared to control experiments (FIG. 44 and FIG. 45D).

One can see a three-fold higher efficiency with the full length BnBBM version with regard to transformation frequency compared to the N-truncated version. This is in line with the *Arabidopsis* data.

Sequences:

| SEQ ID NO: | Name | Description |
|---|---|---|
| 1 | BnBBM | cDNA of *Brassica napus* Babyboom |
| 2 | BnBBM | protein of *Brassica napus* Babyboom |
| 3 | BnBBM + 3'UTR | DNA sequence of *Brassica napus* Babyboom with 3'UTR |
| 4 | BnBBM + GR | DNA sequence of *Brassica napus* Babyboom with rat glucocorticoid receptor domain |
| 5 | pZFNnptII-70s tDT | Vector sequence |
| 6 | NPT | Neomycin phosphotransferase |
| 7 | tDt | tdTomato, orange fluorescent protein |
| 8 | d35S | double 35S promoter |
| 9 | ColE1 ori | Col E1 origin of replication |
| 10 | pVS1 REP | pVS1 Replicon |
| 11 | aadA | Aminoglycoside 3'-adenyl transferase from *Escherichia coli* |
| 12 | ZmWUS2 | cDNA sequence of ZmWUS2 |
| 13 | ZmWUS2 | protein sequence of ZmWUS2 |
| 14 | IPR232-pS-01 | Full length vector |
| 15 | IPR252-pS-01 | Full length vector |
| 16 | IPR 252-pK-02 | Full length vector |
| 17 | BnBBM cDNA Ndel | cDNA BnBBM Version with shortened N terminus |
| 18 | BnBBM cDNA Cdel | cDNA BnBBM Version with shortened C terminus |
| 19 | BnBBM PRT Ndel | PRT BnBBM Version with shortened N terminus |
| 20 | BnBBM PRT Cdel | PRT BnBBM Version with shortened C terminus |

The invention claimed is:

1. A method of promoting somatic embryogenesis or organogenesis of a plant, comprising the following steps:
   (a) inducing callus formation from at least one plant cell comprising incubating the at least one plant cell in the presence of sodium nitroprusside (SNP), and
   (b) introducing into the at least one plant cell to be used in step (a) or into at least one cell of the callus obtained in step (a) an expression cassette comprising a coding nucleotide sequence selected from
      (i) the nucleotide sequence of SEQ ID NO: 1; and
      (ii) a nucleotide sequence encoding a polypeptide having the amino acid sequence of SEQ ID NO: 2,
   wherein the nucleotide sequence is operably linked to a heterologous constitutive regulatory element or a heterologous inducible regulatory element; and
   (c) cultivating the callus obtained in step (b) under conditions promoting growth of embryos and/or shoots out of the callus, wherein in the callus the polypeptide is expressed from the expression cassette constitutively or upon induction of the heterologous inducible regulatory element.

2. The method of claim 1, wherein the heterologous constitutive regulatory element is a constitutive promoter.

3. The method of claim 1, wherein the heterologous inducible regulatory element is an inducible promoter or an inducible expression system.

4. The method of claim 1, wherein step (b) comprises *Agrobacterium*-mediated transformation, particle bombardment, electroporation or microinjection.

5. The method of claim 1, wherein the at least one plant cell of step (a) is a somatic or embryonic cell.

6. The method of claim 1, wherein the at least one plant cell is a plant cell from *Beta vulgaris, Zea mays* or *Spinacia oleracea*.

7. The method of claim 1, wherein in step (b) introducing the expression cassette results in a stable integration thereof into the genome of the at least one plant cell or in a progeny cell thereof.

8. The method of claim 1, wherein in step (c), embryos are directly grown from the callus.

9. The method of claim 1, wherein in step (c), shoots are directly grown from the callus.

10. The method of claim 1, wherein the cultivating in step (c) is carried out in a medium free of plant hormones.

11. The method of claim 1, further comprising a step of
    (d1) introducing at least one nucleotide sequence of interest into the at least one plant cell or a predecessor thereof to be used in step (a), into at least one cell of the callus obtained in step (a) which itself or a progeny thereof is then to be used in step (b) or has been used in step (b), and/or
    (d2) modifying the genome of the at least one plant cell or a predecessor thereof to be used in step (a), of the at least one cell of the callus obtained in step (a) which itself or a progeny thereof is then to be used in step (b) or has been used in step (b), by introducing into said cell a single stranded DNA break (SSB) inducing enzyme or a double stranded DNA break (DSB) inducing enzyme which recognizes a predetermined site in the genome of said cell, and optionally a repair nucleic acid molecule, or a single stranded DNA break (SSB) inducing enzyme which recognizes a predetermined site in the genome of said cell and is fused to a base editor enzyme,
    wherein the modification of said genome is selected from
      I) a replacement of at least one nucleotide;
      II) a deletion of at least one nucleotide;
      III) an insertion of at least one nucleotide; and
      IV) any combination of I).

12. A transgenic plant or a modified plant obtained or obtainable by the method of claim 11 or a progeny plant thereof.

13. A plant cell or a seed of the plant of claim 12, wherein the plant cell or the seed comprises the at least one nucleotide sequence of interest as transgene or wherein the plant cell or the seed comprises the modification in the genome.

14. A method of using a SNP in combination with a coding nucleotide sequence selected from the group consisting of:
    (i) the nucleotide sequence of SEQ ID NO: 1; and
    (ii) a nucleotide sequence encoding a polypeptide having the amino acid sequence of SEQ ID NO: 2,
    wherein the nucleotide sequence is operably linked to a heterologous constitutive regulatory element or a heterologous inducible regulatory element,
       (a) in a method for inducing callus formation from at least one plant cell from *Beta vulgaris, Zea mays* or *Spinacia oleracea*, or in a method for somatic embryogenesis or indirect regeneration of a *Beta vulgaris* plant, *Zea mays* plant or *Spinacia oleracea* plant, from callus;
       (b) in a method of transformation of a plant cell from *Beta vulgaris, Zea mays* or *Spinacia oleracea*, or in a method of modifying the genome of a plant cell from *Beta vulgaris, Zea mays* or *Spinacia oleracea*; or
       (c) in the production of a transgenic plant cell, plant or seed from *Beta vulgaris, Zea mays* or *Spinacia oleracea*, or in the production of a genetically modified plant cell, plant or seed from *Beta vulgaris, Zea mays* or *Spinacia oleracea*.

* * * * *

SEQUENCE LISTING

<160> NUMBER OF SEQ ID NOS: 20

<210> SEQ ID NO 1
<211> LENGTH: 1737
<212> TYPE: DNA
<213> ORGANISM: artificial sequence
<220> FEATURE:
<223> OTHER INFORMATION: cDNA of Brassica napus Babyboom

<400> SEQUENCE: 1

```
atggataata actggttagg cttttctctc tctccttatg aacaaaatca ccatcgtaag    60
```

```
gacgtctact cttccaccac cacaaccgtc gtagatgtcg ccggagagta ctgttacgat    120
ccgaccgctg cctccgatga gtcttcagcc atccaaacat cgtttccttc tcccttbggt    180
gtcgtcgtcg atgctttcac cagagacaac aatagtcact cccgagattg gacatcaat    240 ggttgtgcat gcaataacat ccacaacgat gagcaagatg gaccaaagct tgagaatttc    300
cttggccgca ccaccacgat ttacaacacc aacgaaaacg ttggagatgg aagtggaagt    360
ggctgttatg gaggaggaga cggtggtggt ggctcactag gactttcgat gataaagaca    420
tggctgagaa atcaacccgt ggataatgtt gataatcaag aaaatggcaa tgctgcaaaa    480
ggcctgtccc tctcaatgaa ctcatctact tcttgtgata caacaacga cagcaataac    540 aacgttgttg cccaagggaa gactattgat gatagcgttg aagctacacc gaagaaaact    600
attgagagtt ttggacagag gacgtctata taccgcggtg ttacaaggca tcggtggaca    660
ggaagatatg aggcacattt atgggataat agttgtaaaa gagaaggcca aacgcgcaaa    720
ggaagacaag tttatttggg aggttatgac aaagaagaaa aagcagctag gcttatgat    780 ttagccgcac tcaagtattg gggaaccacc actactacta acttcccccat gagcgaatat    840 gaaaaagagg tagaagagat gaagcacatg acaaggcaag agtatgttgc ctcactgcgc    900
aggaaaagta gtggtttctc tcgtggtgca tcgatttatc gtggagtaac aagacatcac    960
caacatggaa gatggcaagc taggatagga agagtcgccg gtaacaaaga cctctacttg    1020 ggaactttg gcacacaaga gaagctgca gaggcatacg acattgcggc catcaaattc     1080
agaggattaa ccgcagtgac taacttcgac atgaacagat acaacgttaa agcaatcctc     1140
gaaagcccta gtcttcctat tggtagcgcc gcaaaacgtc tcaaggaggc taaccgtccg    1200
gttccaagta tgatgatgat cagtaataac gtttcagaga gtgagaatag tgctagcggt    1260
tggcaaaacg ctgcggttca gcatcatcag ggagtagatt tgagcttatt gcaccaacat    1320
caagagaggt acaatggtta ttattacaat ggaggaaact tgtcttcgga gagtgctagg    1380
gcttgtttca acaagagga tgatcaacac catttcttga gcaacacgca gagcctcatg    1440
actaatatcg atcatcaaag ttctgtttcg gatgattcgg ttactgtttg tggaaatgtt    1500
gttggttatg gtggttatca aggatttgca gccccggtta actgcgatgc ctacgctgct    1560
agtgagtttg attataacgc aagaaaccat tattactttg ctcagcagca gcagacccag    1620
cagtcgccag gtggagattt tccccgcggca atgacgaata atgttggctc taatatgtat    1680
taccatgggg aagtggtgg agaagttgct ccaacattta cagtttggaa cgacaat       1737
```

<210> SEQ ID NO 2
<211> LENGTH: 579
<212> TYPE: PRT
<213> ORGANISM: Brassica napus

<400> SEQUENCE: 2

Met Asp Asn Asn Trp Leu Gly Phe Ser Leu Ser Pro Tyr Glu Gln Asn
1               5                   10                  15

His His Arg Lys Asp Val Tyr Ser Ser Thr Thr Thr Val Val Asp
            20                  25                  30

Val Ala Gly Glu Tyr Cys Tyr Asp Pro Thr Ala Ala Ser Asp Glu Ser
        35                  40                  45

Ser Ala Ile Gln Thr Ser Phe Pro Ser Pro Phe Gly Val Val Val Asp
    50                  55                  60

Ala Phe Thr Arg Asp Asn Asn Ser His Ser Arg Asp Trp Asp Ile Asn
65                  70                  75                  80

```
Gly Cys Ala Cys Asn Ile His Asn Asp Glu Gln Asp Gly Pro Lys
                    85                  90                  95

Leu Glu Asn Phe Leu Gly Arg Thr Thr Thr Ile Tyr Asn Thr Asn Glu
                100                 105                 110

Asn Val Gly Asp Gly Ser Gly Ser Gly Cys Tyr Gly Gly Asp Gly
            115                 120                 125

Gly Gly Gly Ser Leu Gly Leu Ser Met Ile Lys Thr Trp Leu Arg Asn
130                 135                 140

Gln Pro Val Asp Asn Val Asp Asn Gln Glu Asn Gly Asn Ala Ala Lys
145                 150                 155                 160

Gly Leu Ser Leu Ser Met Asn Ser Ser Thr Ser Cys Asn Asn Asn
                165                 170                 175

Asp Ser Asn Asn Asn Val Val Ala Gln Gly Lys Thr Ile Asp Asp Ser
                180                 185                 190

Val Glu Ala Thr Pro Lys Lys Thr Ile Glu Ser Phe Gly Gln Arg Thr
                195                 200                 205

Ser Ile Tyr Arg Gly Val Thr Arg His Arg Trp Thr Gly Arg Tyr Glu
                210                 215                 220

Ala His Leu Trp Asp Asn Ser Cys Lys Arg Glu Gly Gln Thr Arg Lys
225                 230                 235                 240

Gly Arg Gln Val Tyr Leu Gly Gly Tyr Asp Lys Glu Lys Ala Ala
                245                 250                 255

Arg Ala Tyr Asp Leu Ala Ala Leu Lys Tyr Trp Gly Thr Thr Thr Thr
                260                 265                 270

Thr Asn Phe Pro Met Ser Glu Tyr Glu Lys Glu Val Glu Glu Met Lys
                275                 280                 285

His Met Thr Arg Gln Glu Tyr Val Ala Ser Leu Arg Arg Lys Ser Ser
            290                 295                 300

Gly Phe Ser Arg Gly Ala Ser Ile Tyr Arg Gly Val Thr Arg His His
305                 310                 315                 320

Gln His Gly Arg Trp Gln Ala Arg Ile Gly Arg Val Ala Gly Asn Lys
                325                 330                 335

Asp Leu Tyr Leu Gly Thr Phe Gly Thr Gln Glu Glu Ala Ala Glu Ala
            340                 345                 350

Tyr Asp Ile Ala Ala Ile Lys Phe Arg Gly Leu Thr Ala Val Thr Asn
            355                 360                 365

Phe Asp Met Asn Arg Tyr Asn Val Lys Ala Ile Leu Glu Ser Pro Ser
370                 375                 380

Leu Pro Ile Gly Ser Ala Ala Lys Arg Leu Lys Glu Ala Asn Arg Pro
385                 390                 395                 400

Val Pro Ser Met Met Met Ile Ser Asn Asn Val Ser Glu Ser Glu Asn
                405                 410                 415

Ser Ala Ser Gly Trp Gln Asn Ala Ala Val Gln His His Gln Gly Val
                420                 425                 430

Asp Leu Ser Leu Leu His Gln His Gln Glu Arg Tyr Asn Gly Tyr Tyr
            435                 440                 445

Tyr Asn Gly Gly Asn Leu Ser Ser Glu Ser Ala Arg Ala Cys Phe Lys
            450                 455                 460

Gln Glu Asp Asp Gln His His Phe Leu Ser Asn Thr Gln Ser Leu Met
465                 470                 475                 480

Thr Asn Ile Asp His Gln Ser Ser Val Ser Asp Ser Val Thr Val
                485                 490                 495
```

```
Cys Gly Asn Val Val Gly Tyr Gly Gly Tyr Gln Gly Phe Ala Ala Pro
            500                 505                 510

Val Asn Cys Asp Ala Tyr Ala Ala Ser Glu Phe Asp Tyr Asn Ala Arg
            515                 520                 525

Asn His Tyr Tyr Phe Ala Gln Gln Gln Gln Thr Gln Gln Ser Pro Gly
            530                 535                 540

Gly Asp Phe Pro Ala Ala Met Thr Asn Asn Val Gly Ser Asn Met Tyr
545                 550                 555                 560

Tyr His Gly Glu Gly Gly Gly Glu Val Ala Pro Thr Phe Thr Val Trp
                565                 570                 575

Asn Asp Asn

<210> SEQ ID NO 3
<211> LENGTH: 1974
<212> TYPE: DNA
<213> ORGANISM: artificial sequence
<220> FEATURE:
<223> OTHER INFORMATION: cDNA sequence of Brassica napus Babyboom with
      3'UTR

<400> SEQUENCE: 3
atggataata actggttagg cttttctctc tctccttatg aacaaaatca ccatcgtaag      60
gacgtctact cttccaccac cacaaccgtc gtagatgtcg ccggagagta ctgttacgat     120
ccgaccgctg cctccgatga gtcttcagcc atccaaacat cgtttccttc tcccttttggt   180 gtcgtcgtcg atgctttcac cagagacaac aatagtcact cccgagattg gacatcaat    240 ggttgtgcat gcaataacat ccacaacgat gagcaagatg accaaagct tgagaatttc    300 cttggccgca ccaccacgat ttacaacacc aacgaaaacg ttggagatgg aagtggaagt    360
ggctgttatg gaggaggaga cggtggtggt ggctcactag gactttcgat gataaagaca    420
tggctgagaa atcaacccgt ggataatgtt gataatcaag aaaatggcaa tgctgcaaaa    480
ggcctgtccc tctcaatgaa ctcatctact tcttgtgata caacaacga cagcaataac    540 aacgttgttg cccaagggaa gactattgat gatagcgttg aagctacacc gaagaaaact    600
attgagagtt ttggacagag gacgtctata taccgcggtg ttacaaggca tcggtggaca    660
ggaagatatg aggcacattt atgggataat agttgtaaaa gagaaggcca acgcgcaaa    720 ggaagacaag tttatttggg aggttatgac aaagaagaaa aagcagctag gcttatgat    780 ttagccgcac tcaagtattg ggaaccacc actactacta acttccccat gagcgaatat    840
gaaaaagagg tagaagagat gaagcacatg acaaggcaag agtatgttgc ctcactgcgc    900
aggaaaagta gtggtttctc tcgtggtgca tcgatttatc gtggagtaac aagacatcac    960
caacatggaa gatggcaagc taggatagga gagtcgccg taacaaaga cctctacttg    1020 ggaactttg gcacacaaga agaagctgca gaggcatacg acattgcggc catcaaattc    1080
agaggattaa ccgcagtgac taacttcgac atgaacagat acaacgttaa agcaatcctc    1140
gaaagcccta gtcttcctat tggtagcgcc gcaaaacgtc tcaaggaggc taaccgtccg    1200
gttccaagta tgatgatgat cagtaataac gtttcagaga gtgagaatag tgctagcgt    1260 tggcaaaacg ctgcggttca gcatcatcag ggagtagatt tgagcttatt gcaccaacat    1320
caagagaggt acaatggtta ttattacaat ggaggaaact tgtcttcgga gagtgctagg    1380
gcttgtttca aacaagagga tgatcaacac catttcttga gcaacacgca gagcctcatg    1440
actaatatcg atcatcaaag ttctgtttcg gatgattcgg ttactgtttg tggaaatgtt    1500
gttggttatg gtggttatca aggatttgca gccccggtta actgcgatgc ctacgctgct    1560
```

```
agtgagtttg attataacgc aagaaaccat tattactttg ctcagcagca gcagacccag   1620
cagtcgccag gtggagattt ccccgcggca atgacgaata atgttggctc taatatgtat   1680
taccatgggg aaggtggtgg agaagttgct ccaacattta cagtttggaa cgacaattag   1740
aaaaaatagt taaagatctt tagttatatg cgttgttgtg tgctggtgaa cagtgtgata   1800
ctttgattat gtttttttct ttctcttttt cttttcttg gttaatttct taagacttat    1860
ttttagtttc cattagttgg ataaatttc agactaaaaa aaaaaaaaa aaaaaactcg     1920 agggggggcc cggtaccgag ctcgaatttc cccgatcgtt caaacatttg tacc          1974
```

<210> SEQ ID NO 4
<211> LENGTH: 2603
<212> TYPE: DNA
<213> ORGANISM: artificial sequence
<220> FEATURE:
<223> OTHER INFORMATION: DNA sequence of Brassica napus Babyboom with
      rat glucocorticoid receptor domain <400> SEQUENCE: 4

```
atggataata actggttagg cttttctctc tctccttatg aacaaaatca ccatcgtaag    60
gacgtctact cttccaccac cacaaccgtc gtagatgtcg ccggagagta ctgttacgat   120
ccgaccgctg cctccgatga gtcttcagcc atccaaacat cgtttccttc tccctttggt   180
gtcgtcgtcg atgctttcac cagagacaac aatagtcact cccgagattg ggacatcaat   240
ggttgtgcat gcaataacat ccacaacgat gagcaagatg gaccaaagct tgagaatttc   300
cttggccgca ccaccacgat ttacaacacc aacgaaaacg ttggagatgg aagtggaagt   360
ggctgttatg gaggaggaga cggtggtggt ggctcactag gactttcgat gataaagaca   420
tggctgagaa atcaacccgt ggataatgtt gataatcaag aaaatggcaa tgctgcaaaa   480
ggcctgtccc tctcaatgaa ctcatctact tcttgtgata caacaacga cagcaataac   540 aacgttgttg cccaagggaa gactattgat gatagcgttg aagctacacc gaagaaaact   600
attgagagtt ttggacagag gacgtctata taccgcggtg ttacaaggca tcggtggaca   660
ggaagatatg aggcacattt atgggataat agttgtaaaa gagaaggcca aacgcgcaaa   720
ggaagacaag tttatttggg aggttatgac aaagaagaaa aagcagctag ggcttatgat   780
ttagccgcac tcaagtattg gggaaccacc actactacta cttccccat gagcgaatat   840 gaaaagagg tagaagagat gaagcacatg acaaggcaag agtatgttgc ctcactgcgc   900
aggaaaagta gtggtttctc tcgtggtgca tcgatttatc gtggagtaac aagacatcac   960
caacatggaa gatggcaagc taggatagga agagtcgccg gtaacaaaga cctctacttg   1020 ggaactttg gcacacaaga agaagctgca gaggcatacg acattgcggc catcaaattc  1080
agaggattaa ccgcagtgac taacttcgac atgaacagat caacgttaa agcaatcctc   1140 gaaagcccta gtcttcctat tggtagcgcc gcaaaacgtc tcaaggaggc taaccgtccg   1200
gttccaagta tgatgatgat cagtaataac gtttcagaga gtgagaatag tgctagcggt   1260
tggcaaaacg ctgcggttca gcatcatcag ggagtagatt tgagcttatt gcaccaacat   1320
caagagaggt acaatggtta ttattacaat ggaggaaact tgtcttcgga gagtgctagg   1380
gcttgtttca acaagagga tgatcaacac catttcttga gcaacacgca gagcctcatg   1440
actaatatcg atcatcaaag ttctgttttcg gatgattcgg ttactgtttg tggaaatgtt   1500
gttggttatg tggttatca aggatttgca gccccggtta actgcgatgc ctacgctgct   1560
agtgagtttg attataacgc aagaaaccat tattactttg ctcagcagca gcagacccag   1620
```

```
cagtcgccag gtggagattt tcccgcggca atgacgaata atgttggctc taatatgtat    1680
taccatgggg aagtggtgg  agaagttgct ccaacattta cagtttggaa cgacaatgga    1740
tctacaaaga aaaaaatcaa agggattcag caagccactg caggagtctc acaagacact    1800
tcggaaaatc ctaacaaaac aatagttcct gctgcattac acagctcac  ccctaccttg    1860 gtgtcactgc tggaggtgat tgaacccgag gtgttgtatg caggatatga tagctctgtt    1920
ccagattcag cgtggagaat tatgaccaca ctcaacatgt taggtgggcg tcaagtgatt    1980
gcagcagtga atgggcaaa  ggcgatacca ggcttcagaa acttacacct ggatgaccaa    2040
atgaccctgc tacagtactc atggatgttt ctcatggcat ttgccctggg ttggagatca    2100
tacagacaat caagtggaaa cctgctctgc tttgctcctg atctgattat taatgagcag    2160
agaatgtctc taccctgcat gtatgaccaa tgtaaacaca tgctgtttgt ctcctctgaa    2220
ttacaaagat tgcaggtatc ctatgaagag tatctctgta tgaaaacctt actgcttctc    2280
tcctcagttc ctaaggaagg tctgaagagc caagagttat ttgatgagat tcgaatgact    2340
tatatcaaag agctaggaaa agccatcgtc aaaagggaag ggaactccag tcagaactgg    2400
caacggtttt accaactgac aaagcttctg gactccatgc atgaggtggt tgagaatctc    2460
cttacctact gcttccagac attttttggat aagaccatga gtattgagtt cccagagatg    2520
ttagctgaaa tcatcactaa tcagatacca aaatattcaa atggaaatat caaaaagctc    2580
ctgtttcatc aaaaatgaca ccc                                           2603

<210> SEQ ID NO 5
<211> LENGTH: 11632
<212> TYPE: DNA
<213> ORGANISM: artificial sequence
<220> FEATURE:
<223> OTHER INFORMATION: vector pZFNnptII

<400> SEQUENCE: 5
cggccgcgtc gagcgatcta gtaacataga tgacaccgcg cgcgataatt tatcctagtt     60
tgcgcgctat attttgtttt ctatcgcgta ttaaatgtat aattgcggga ctctaatcat    120
aaaaacccat ctcataaata acgtcatgca ttacatgtta attattacat gcttaacgta    180
attcaacaga aattatatga taatcatcgc aagaccggca acaggattca atcttaagaa    240
actttattgc caaatgtttg aacgatcggg gaaattcgag tcgagttttt cagcaagatt    300
ctagacttgt acagctcgtc catgccgtac aggaacaggt ggtggcggcc ctcggagcgc    360
tcgtactgtt ccacgatggt gtagtcctcg ttgtgggagg tgatgtccag cttggtgtcc    420
acgtagtagt agccgggcag ttgcacgggc ttcttggcca tgtagatggt cttgaactcc    480
accaggtagt ggccgccgtc cttcagcttc agggcctggt ggatctcgcc cttcagcacg    540
ccgtcgcggg ggtacaggcg ctcggtggag gcctcccagc ccatggtctt cttctgcatt    600
acggggccgt cgggggggaa gttggtgccg cgcatcttca ccttgtagat cagcgtgccg    660
tcctgcaggg aggagtcctg ggtcacggtc accagaccgc cgtcctcgaa gttcatcacg    720
cgctcccact tgaagccctc ggggaaggac agcttcttgt aatcggggat gtcggcgggg    780
tgcttcacgt acgccttgga gccgtacatg aactgggggg acaggatgtc ccaggcgaag    840 ggcaggggc  cgcccttggt caccttcagc ttggcggtct gggtgccctc gtagggcgg     900 ccctcgccct cgccctcgat ctcgaactcg tggccgttca tggagccctc catgcgcacc    960
ttgaagcgca tgaactcttt gatgacctcc tcgcccttgc tcaccatggt ggcgggatcg   1020
```

-continued

```
cgccctatcg ttcgtaaatg gtgaaaattt tcagaaaatt gcttttgctt taaaagaaat      1080
gatttaaatt gctgcaatag aagtagaatg cttgattgct tgagattcgt ttgttttgta      1140
tatgttgtgt tgagaggatc cactagttct agagcggccg ccaccgcggt ggagctcgaa      1200
ttctcgaggt cctctccaaa tgaaatgaac ttccttatat agaggaaggg tcttgcgaag      1260
gatagtggga ttgtgcgtca tcccttacgt cagtggagat atcacatcaa tccacttgct      1320
ttgaagacgt ggttggaacg tcttcttttt ccacgatgtt cctcgtgggt ggggtccat       1380 ctttgggacc actgtcggta gaggcatctt gaacgatagc ctttccttta tcgcaatgat      1440
ggcatttgta gaagccatct tccttttcta ctgtcctttc gatgaagtga cagatagctg      1500
ggcaatggaa tccgaggagg tttcccgata ttacccttg ttgaaaagtc tcaatagccc       1560
tctggtcttc tgagactgta tctttgatat tcttggagta gacgagagtg tcgtgctcca      1620
ccatgtatca catcaatcca cttgctttga agacgtggtt ggaacgtctt ctttttccac      1680
gatgttcctc gtgggtgggg gtccatcttt gggaccactg tcggtagagg catcttgaac      1740
gatagccttt cctttatcgc aatgatgca tttgtagaag ccatcttcct tttctactgt       1800
cctttcgatg aagtgacaga tagctgggca atggaatccg aggaggtttc ccgatattac      1860
cctttgttga aaagtctcaa tagccctctg gtcttctgaa cctgcaggca tgcaagctct      1920
agtaaggcct taagggccag atcttgggcc cggtacccga tcagattgtc gtttcccgcc      1980
ttcggtttaa actatcagtg tttgacagga tatattggcg ggtaaaccta agagaaaaga      2040
gcgtttatta gaataatcgg atatttaaaa gggcgtgaaa aggtttatcc gttcgtccat      2100
ttgtatgtgc atgccaacca cagggttccc ctcgggagtg cttggcattc cgtgcgataa      2160
tgacttctgt tcaaccaccc aaacgtcgga aagcctgacg acggagcagc attccaaaaa      2220
gatcccttgg ctcgtctggg tcggctagaa ggtcgagtgg gctgctgtgg cttgatccct      2280
caacgcggtc gcggacgtag cgcagcgccg aaaaatcctc gatcgcaaat ccgacgctgt      2340
cgaaaagcgt gatctgcttg tcgctctttc ggccgacgtc ctggccagtc atcacgcgcc      2400
aaagttccgt cacaggatga tctggcgcga gttgctggat ctcgccttca atccgggtct      2460
gtggcgggaa ctccacgaaa atatccgaac gcagcaagat atcgcggtgc atctcggtct      2520
tgcctgggca gtcgccgccg acgccgttga tgtggacgcc gaaaaggatc taggtgaaga      2580 tccttttga taatctcatg accaaaatcc cttaacgtga ttttcgttc cactgagcgt       2640 cagacccgt agaaaagatc aaaggatctt cttgagatcc ttttttttctg cgcgtaatct      2700 gctgcttgca acaaaaaaa ccaccgctac cagcggtggt ttgtttgccg gatcaagagc      2760
taccaactct ttttccgaag gtaactggct tcagcagagc gcagatacca aatactgttc      2820
ttctagtgta gccgtagtta ggccaccact tcaagaactc tgtagcaccg cctacatacc      2880
tcgctctgct aatcctgtta ccagtggctg ctgccagtgg cgataagtcg tgtcttaccg      2940
ggttggactc aagacgatag ttaccggata aggcgcagcg gtcgggctga acggggggtt      3000
cgtgcacaca gcccagcttg gagcgaacga cctacaccga actgagatac ctacagcgtg      3060
agctatgaga aagcgccacg cttcccgaag ggagaaaggc ggacaggtat ccggtaagcg      3120
gcagggtcgg aacaggagag cgcacgaggg agcttccagg gggaaacgcc tggtatcttt      3180
atagtcctgt cgggtttcgc cacctctgac ttgagcgtcg attttttgtga tgctcgtcag      3240 gggggcggag cctatggaaa aacgccagca acgcggcctt tttacggttc ctggccttt       3300 gctggccttt tgctcacatg ttctttcctg cgttatcccc tgattctgtg ataaccgat       3360 taccgccttt gagtgagctg ataccgctcg ccgcagccga acgaccgagc gcagcgagtc      3420
```

```
agtgagcgag gaagcggaag agcgcctgat gcggtatttt ctccttacgc atctgtgcgg    3480
tatttcacac cgcatatggt gcactctcag tacaatctgc tctgatgccg catagttaag    3540
ccagtataca ctccgctatc gctacgtgac tgggtcatgg ctgcgccccg acacccgcca    3600
acacccgctg acgcgccctg acgggcttgt ctgctcccgg catccgctta cagacaagct    3660
gtgaccgtct ccgggagctg catgtgtcag aggttttcac cgtcatcacc gaaacgcgcg    3720
aggcaggggt acgtcgaggt cgatccaacc cctccgctgc tatagtgcag tcggcttctg    3780
acgttcagtg cagccgtctt ctgaaaacga catgtcgcac aagtcctaag ttacgcgaca    3840
ggctgccgcc ctgccctttt cctggcgttt cttgtcgcg tgttttagtc gcataaagta    3900
gaatacttgc gactagaacc ggagacatta cgccatgaac aagagcgccg ccgctggcct    3960
gctgggctat gcccgcgtca gcaccgacga ccaggacttg accaaccaac gggccgaact    4020
gcacgcggcc ggctgcacca agctgttttc cgagaagatc accggcacca ggcgcgaccg    4080
cccggagctg gccaggatgc ttgaccacct acgccctggc gacgttgtga cagtgaccag    4140
gctagaccgc ctggcccgca gcacccgcga cctactggac attgccgagc gcatccagga    4200
ggccggcgcg ggcctgcgta gcctggcaga gccgtgggcc gacaccacca cgccggccgg    4260
ccgcatggtg ttgaccgtgt cgccggcat tgccgagttc gagcgttccc taatcatcga    4320
ccgcacccgg agcgggcgcg aggccgccaa ggcgcgaggc gtgaagtttg gcccccgccc    4380
taccctcacc ccggcacaga tcgcgcacgc ccgcgagctg atcgaccagg aaggccgcac    4440
cgtgaaagag gcggctgcac tgcttggcgt gcatcgctcg accctgtacc gcgcacttga    4500
gcgcagcgag gaagtgacgc ccaccgaggc caggcggcgc ggtgccttcc gtgaggacgc    4560
attgaccgag gccgacgccc tggcggccgc cgagaatgaa cgccaagagg aacaagcatg    4620
aaaccgcacc aggacggcca ggacgaaccg tttttcatta ccgaagagat cgaggcggag    4680
atgatcgcgg ccgggtacgt gttcgagccg cccgcgcacg tctcaaccgt gcggctgcat    4740
gaaatcctgg ccggtttgtc tgatgccaag ctcgcggcct ggccggcgag cttggccgct    4800
gaagaaaccg agcgccgccg tctaaaaagg tgatgtgtat ttgagtaaaa cagcttgcgt    4860
catgcggtcg ctgcgtatat gatgcgatga gtaaataaac aaatacgcaa ggggaacgca    4920
tgaaggttat cgctgtactt aaccagaaag gcgggtcagg caagacgacc atcgcaaccc    4980
atctagcccg cgccctgcaa ctcgccgggg ccgatgttct gttagtcgat tccgatcccc    5040
agggcagtgc ccgcgattgg gcggccgtgc gggaagatca accgctaacc gttgtcggca    5100
tcgaccgccc gacgattgac cgcgacgtga aggccatcgg ccggcgcgac ttcgtagtga    5160
tcgacggagc gccccaggcg gcggacttgg ctgtgtccgc gatcaaggca gccgacttcg    5220
tgctgattcc ggtgcagcca agcccttacg acatatgggc caccgccgac ctggtggagc    5280
tggttaagca gcgcattgag gtcacggatg aaggctaca gcggcctttt gtcgtgtcgc    5340
gggcgatcaa aggcacgcgc atcggcgtg aggttgccga ggcgctggcc gggtacgagc    5400
tgcccattct tgagtcccgt atcacgcagc gcgtgagcta cccaggcact gccgccgccg    5460
gcacaaccgt tcttgaatca gaacccgagg gcgacgctgc ccgcgaggtc caggcgctgg    5520
ccgctgaaat taaatcaaaa ctcatttgag ttaatgaggt aaagagaaaa tgagcaaaag    5580
cacaaacacg ctaagtgccg gccgtccgag cgcacgcagc agcaaggctg caacgttggc    5640
cagcctggca gacacgccag ccatgaagcg ggtcaacttt cagttgccgg cggaggatca    5700
caccaagctg aagatgtacg cggtacgcca aggcaagacc attaccgagc tgctatctga    5760
```

```
atacatcgcg cagctaccag agtaaatgag caaatgaata aatgagtaga tgaattttag    5820
cggctaaagg aggcggcatg gaaaatcaag aacaaccagg caccgacgcc gtggaatgcc    5880
ccatgtgtgg aggaacgggc ggttggccag gcgtaagcgg ctgggttgtc tgccggccct    5940
gcaatggcac tggaaccccc aagcccgagg aatcggcgtg agcggtcgca aaccatccgg    6000
cccggtacaa atcggcgcgg cgctgggtga tgacctggtg gagaagttga aggcggcgca    6060
ggccgcccag cggcaacgca tcgaggcaga agcacgcccc ggtgaatcgt ggcaagcggc    6120
cgctgatcga atccgcaaag aatcccggca accgccggca gccggtgcgc cgtcgattag    6180
gaagccgccc aagggcgacg agcaaccaga ttttttcgtt ccgatgctct atgacgtggg    6240
cacccgcgat agtcgcagca tcatggacgt ggccgttttc cgtctgtcga agcgtgaccg    6300
acgagctggc gaggtgatcc gctacgagct tccagacggg cacgtagagg tttccgcagg    6360
gccggccggc atggcgagtg tgtgggatta cgacctggta ctgatggcgg tttcccatct    6420
aaccgaatcc atgaaccgat accgggaagg gaagggagac aagcccggcc gcgtgttccg    6480
tccacacgtt gcggacgtac tcaagttctg ccggcgagcc gatggcggaa agcagaaaga    6540
cgacctggta gaaacctgca ttcggttaaa caccacgcac gttgccatgc agcgtacgaa    6600
gaaggccaag aacggccgcc tggtgacggt atccgagggt gaagccttga ttagccgcta    6660
caagatcgta aagagcgaaa ccgggcggcc ggagtacatc gagatcgagc tagctgattg    6720
gatgtaccgc gagatcacag aaggcaagaa cccggacgtg ctgacggttc accccgatta    6780
cttttttgatc gatcccggca tcggccgttt tctctaccgc ctggcacgcc gcgccgcagg    6840
caaggcagaa gccagatggt tgttcaagac gatctacgaa cgcagtggca gcgccggaga    6900
gttcaagaag ttctgtttca ccgtgcgcaa gctgatcggg tcaaatgacc tgccggagta    6960
cgatttgaag gaggaggcgg ggcaggctgg cccgatccta gtcatgcgct accgcaacct    7020
gatcgagggc gaagcatccg ccggttccta atgtacggag cagatgctag ggcaaattgc    7080
cctagcaggg gaaaaaggtc gaaaggtct ctttcctgtg gatagcacgt acattgggaa    7140
cccaaagccg tacattggga accggaaccc gtacattggg aacccaaagc cgtacattgg    7200
gaaccggtca cacatgtaag tgactgatat aaaagagaaa aaaggcgatt tttccgccta    7260
aaactctta aaacttatta aaactcttaa aacccgcctg gcctgtgcat aactgtctgg    7320
ccagcgcaca gccgaagagc tgcaaaaagc gcctacccct cggtcgctgc gctccctacg    7380
ccccgccgct tcgcgtcggc ctatcgcggc cgctggccgc tcaaaaatgg ctggcctacg    7440
gccaggcaat ctaccagggc gcggacaagc gcgccgtcg ccactcgacc gccggcgccc    7500
acatcaaggc accggtgggt atgcctgacg atgcgtggag accgaaacct tgcgctcgtt    7560
cgccagccag gacagaaatg cctcgacttc gctgctgccc aaggttgccg ggtgacgcac    7620
accgtggaaa cggatgaagg cacgaaccca gtggacataa gcctgttcgg ttcgtaagct    7680
gtaatgcaag tagcgtatgc gctcacgcaa ctggtccaga accttgaccg aacgcagcgg    7740
tggtaacggc gcagtggcgg ttttcatggc ttgttatgac tgttttttg gggtacagtc    7800
tatgcctcgg gcatccaagc agcaagcgcg ttacgccgtg ggtcgatgtt tgatgttatg    7860
gagcagcaac gatgttacgc agcagggcag tcgccctaaa acaaagttaa acatcatgag    7920
ggaagcggtg atcgccgaag tatcgactca actatcagag gtagttggcg tcatcgagcg    7980
ccatctcgaa ccgacgttgc tggccgtaca tttgtacggc tccgcagtgg atggcggcct    8040
gaagccacac agtgatattg atttgctggt tacggtgacc gtaaggcttg atgaaacaac    8100
gcggcgagct ttgatcaacg acctttggaa aacttcggct tcccctggag agagcgagat    8160
```

-continued

```
tctccgcgct gtagaagtca ccattgttgt gcacgacgac atcattccgt ggcgttatcc    8220
agctaagcgc gaactgcaat ttggagaatg gcagcgcaat gacattcttg caggtatctt    8280
cgagccagcc acgatcgaca ttgatctggc tatcttgctg acaaaagcaa gagaacatag    8340
cgttgccttg gtaggtccag cggcggagga actctttgat ccggttcctg aacaggatct    8400
atttgaggcg ctaaatgaaa ccttaacgct atggaactcg ccgcccgact gggctggcga    8460
tgagcgaaat gtagtgctta cgttgtcccg catttggtac agcgcagtaa ccggcaaaat    8520
cgcgccgaag gatgtcgctg ccgactgggc aatggagcgc ctgccggccc agtatcagcc    8580
cgtcatactt gaagctagac aggcttatct tggacaagaa gaagatcgct tggcctcgcg    8640
cgcagatcag ttggaagaat ttgtccacta cgtgaaaggc gagatcacca aggtagtcgg    8700
caaataatgt ctaacaattc gttcaagccg acgccgcttc gcggcgcggc ttaactcaag    8760
cgttagatgc actaagcaca taattgctca cagccaaact atcaggtcaa gtctgctttt    8820
attattttta agcgtgcata taagcccta cacaaattgg gagatatatc atgaaaggct    8880 ggcttttttct tgttatcgca atagttggcg aagtaatcgc aacatagctt gcttggtcgt    8940
tccgcgtgaa cgtcggctcg attgtacctg cgttcaaata ctttgcgatc gtgttgcgcg    9000
cctgcccggt gcgtcggctg atctcacgga tcgactgctt ctctcgcaac gccatccgac    9060
ggatgatgtt taaagtccc atgtggatca ctccgttgcc ccgtcgctca ccgtgttggg    9120
gggaaggtgc acatggctca gttctcaatg gaaattatct gcctaaccgg ctcagttctg    9180
cgtagaaacc aacatgcaag ctccaccggg tgcaaagcgg cagcggcggc aggatatatt    9240
caattgtaaa tggcttcatg tccgggaaat ctacatggat cagcaatgag tatgatggtc    9300
aatatggaga aaagaaaga gtaattacca attttttttc aattcaaaaa tgtagatgtc    9360
cgcagcgtta ttataaaatg aaagtacatt ttgataaaac gacaaattac gatccgtcgt    9420
atttataggc gaaagcaata aacaaattat tctaattcgg aaatctttat ttcgacgtgt    9480
ctacattcac gtccaaatgg gggcttagat gagaaacttc acgatcggct ctagttcgag    9540
cgatctagta acatagatga caccgcgcgc gataatttat cctagtttgc gcgctatatt    9600
ttgttttcta tcgcgtatta aatgtataat tgcgggactc taatcataaa aacccatctc    9660
ataaataacg tcatgcatta catgttaatt attacatgct taacgtaatt caacagaaat    9720
tatatgataa tcatcgcaag accggcaaca ggattcaatc ttaagaaact ttattgccaa    9780
atgtttgaac gatcggggaa attcgtttct atgcttcaat tctgctctat agatgttctt    9840
ctagtcttaa cttttagaag gcacaacatt tgaaatgttg gtaattttc tgctgggtag    9900 tgaaccattg taatttgtgt ttgcttatat tatccgttgg gtttctctat gttatctgtg    9960
gggccatatc ccagaactgg ttgagtcggt ccaacacctg ggtgccaatc atgtcgatgg    10020
tggggtatgg tccggattga agaaatata gtttaaatat ttattgataa aataacaagt    10080
caggtattat agtccaagca aaacataaa tttattgatg caagtttaaa ttcagaaata    10140
tttcaataac tgattatatc agctggtaca ttgccgtaga tgaaagactg agtgcgatat    10200
tatgtgtaat acataaattg atgatatagc tagcttagct catcgggtca gaagaactcg    10260
tcaagaaggc gatagaaggc gatgcgctgc gaatcgggag cggcgatacc gtaaagcacg    10320
aggaagcggt cagcccattc gccgccaagc tcttcagcaa tatcacgggt agccaacgct    10380
atgtcctgat agcggtccgc cacacccagc cggccacagt cgatgaatcc agaaaagcgg    10440
ccattttcca ccatgatatt cggcaagcag gcatcgccat gagtcacgac gagatcctcg    10500
```

| | |
|---|---:|
| ccgtcgggca tgcgcgcctt gagcctggcg aacagttcgg ctggcgcgag cccctgatgc | 10560 |
| tcttcgtcca gatcatcctg atcgacaaga ccggcttcca tccgagtacg tgctcgctcg | 10620 |
| atgcgatgtt tcgcttggtg gtcgaatggg caggtagccg gatcaagcgt atgcagccgc | 10680 |
| cgcattgcat cagccatgat ggatactttc tcggcaggag caaggtgaga tgacaggaga | 10740 |
| tcctgccccg gcacttcgcc aatagcagc cagtcccttc ccgcttcagt gacaacgtcg | 10800 |
| agcacagctg cgcaaggaac gcccgtcgtg gccagccacg atagccgcgc tgcctcgtcc | 10860 |
| tgaagttcat tcagggcacc ggacaggtcg gtcttgacaa aaagaaccgg gcgcccctgc | 10920 |
| gctgacagcc ggaacacggc ggcatcagag cagccgattg tctgttgtgc ccagtcatag | 10980 |
| ccgaatagcc tctccaccca agcggccgga gaacctgcgt gcaatccatc ttgttcaatc | 11040 |
| caagctccca ttttctgtga ttttggatgt gtttttgtat ggattgagag tgaatatgag | 11100 |
| actctaattg gataccgagg ggaatttatg gaacgtcagt ggagcatttt tgacaagaaa | 11160 |
| tatttgctag ctgatagtga ccttaggcga cttttgaacg cgcaataatg gtttctgacg | 11220 |
| tatgtgctta gctcattaaa ctccagaaac ccgcggctga gtggctcctt caacgttgcg | 11280 |
| gttctgtcag ttccaaacgt aaaacggctt gtcccgcgtc atcggcgggg gtcattccgg | 11340 |
| actgtggggc catatcccag aactggttga gtcggtccaa cacctgggtg ccaatcatgt | 11400 |
| cgatggtggg gtatggccaa tttttttca attcaaaaat gtagatgtcc gcagcgttat | 11460 |
| tataaaatga aagtacattt tgataaaacg acaaattacg atccgtcgta tttataggcg | 11520 |
| aaagcaataa acaaattatt ctaattcgga aatctttatt tcgacgtgtc tacattcacg | 11580 |
| tccaaatggg ggcttagatg agaaacttca cgatcggctc tagaggccat gg | 11632 |

<210> SEQ ID NO 6
<211> LENGTH: 801
<212> TYPE: DNA
<213> ORGANISM: artificial sequence
<220> FEATURE:
<223> OTHER INFORMATION: Neomycin phosphotransferase

<400> SEQUENCE: 6

| | |
|---|---:|
| atgggagctt ggattgaaca agatggattg cacgcaggtt ctccggccgc ttgggtggag | 60 |
| aggctattcg gctatgactg ggcacaacag acaatcggct gctctgatgc cgccgtgttc | 120 |
| cggctgtcag cgcaggggcg cccggttctt tttgtcaaga ccgacctgtc cggtgccctg | 180 |
| aatgaacttc aggacgaggc agcgcggcta tcgtggctgg ccacgacggg cgttccttgc | 240 |
| gcagctgtgc tcgacgttgt cactgaagcg ggaagggact ggctgctatt gggcgaagtg | 300 |
| ccggggcagg atctcctgtc atctcacctt gctcctgccg agaaagtatc catcatggct | 360 |
| gatgcaatgc ggcggctgca tacgcttgat ccggctacct gcccattcga ccaccaagcg | 420 |
| aaacatcgca tcgagcgagc acgtactcgg atggaagccg gtcttgtcga tcaggatgat | 480 |
| ctggacgaag agcatcaggg gctcgcgcca gccgaactgt tcgccaggct caaggcgcgc | 540 |
| atgcccgacg gcgaggatct cgtcgtgact catggcgatg cctgcttgcc gaatatcatg | 600 |
| gtggaaaatg gccgcttttc tggattcatc gactgtggcc ggctgggtgt ggcggaccgc | 660 |
| tatcaggaca tagcgttggc tacccgtgat attgctgaag agcttggcgg cgaatgggct | 720 |
| gaccgcttcc tcgtgcttta cggtatcgcc gctcccgatt cgcagcgcat cgccttctat | 780 |
| cgccttcttg acgagttctt c | 801 |

<210> SEQ ID NO 7
<211> LENGTH: 702

```
<212> TYPE: DNA
<213> ORGANISM: artificial sequence
<220> FEATURE:
<223> OTHER INFORMATION: tdTomato, orange fluorescent protein

<400> SEQUENCE: 7
atggtgagca agggcgagga ggtcatcaaa gagttcatgc gcttcaaggt gcgcatggag      60
ggctccatga acggccacga gttcgagatc gagggcgagg gcgagggccg cccctacgag     120
ggcacccaga ccgccaagct gaaggtgacc aagggcggcc cctgcccctt cgcctgggac     180
atcctgtccc ccagttcat gtacggctcc aaggcgtacg tgaagcaccc cgccgacatc      240
cccgattaca agaagctgtc cttccccgag ggcttcaagt gggagcgcgt gatgaacttc     300
gaggacggcg gtctggtgac cgtgacccag gactcctccc tgcaggacgg cacgctgatc     360
tacaaggtga agatgcgcgg caccaacttc ccccccgacg gccccgtaat gcagaagaag     420
accatgggct gggaggcctc caccgagcgc ctgtaccccc gcgacggcgt gctgaagggc     480
gagatccacc aggccctgaa gctgaaggac ggcggccact acctggtgga gttcaagacc     540
atctacatgg ccaagaagcc cgtgcaactg cccggctact actacgtgga caccaagctg     600
gacatcacct cccacaacga ggactacacc atcgtggaac agtacgagcg ctccgagggc     660
cgccaccacc tgttcctgta cggcatggac gagctgtaca ag                        702

<210> SEQ ID NO 8
<211> LENGTH: 691
<212> TYPE: DNA
<213> ORGANISM: artificial sequence
<220> FEATURE:
<223> OTHER INFORMATION: double 35s promoter

<400> SEQUENCE: 8
gttcagaaga ccagagggct attgagactt ttcaacaaag ggtaatatcg ggaaacctcc      60
tcggattcca ttgcccagct atctgtcact tcatcgaaag gacagtagaa aaggaagatg     120
gcttctacaa atgccatcat tgcgataaag gaaaggctat cgttcaagat gcctctaccg     180
acagtggtcc caaagatgga cccccaccca cgaggaacat cgtggaaaaa gaagacgttc     240
caaccacgtc ttcaaagcaa gtggattgat gtgatacatg gtggagcacg acactctcgt     300
ctactccaag aatatcaaag atacagtctc agaagaccag agggctattg agacttttca     360 acaagggta atatcgggaa acctcctcgg attccattgc ccagctatct gtcacttcat      420
cgaaaggaca gtagaaaagg aagatggctt ctacaaatgc catcattgcg ataaaggaaa     480
ggctatcgtt caagatgcct ctaccgacag tggtcccaaa gatggacccc cacccacgag     540
gaacatcgtg gaaaaagaag acgttccaac cacgtcttca aagcaagtgg attgatgtga     600
tatctccact gacgtaaggg atgacgcaca atcccactat ccttcgcaag acccttcctc     660
tatataagga agttcatttc atttggagag g                                    691

<210> SEQ ID NO 9
<211> LENGTH: 698
<212> TYPE: DNA
<213> ORGANISM: artificial sequence
<220> FEATURE:
<223> OTHER INFORMATION: Col E1 origin of replication

<400> SEQUENCE: 9
aaaaggatct aggtgaagat cctttttgat aatctcatga ccaaaatccc ttaacgtgag      60
ttttcgttcc actgagcgtc agaccccgta gaaaagatca aggatcttc ttgagatcct     120
```

| | |
|---|---|
| ttttttctgc gcgtaatctg ctgcttgcaa acaaaaaaac caccgctacc agcggtggtt | 180 |
| tgtttgccgg atcaagagct accaactctt tttccgaagg taactggctt cagcagagcg | 240 |
| cagataccaa atactgttct tctagtgtag ccgtagttag gccaccactt caagaactct | 300 |
| gtagcaccgc ctacatacct cgctctgcta atcctgttac cagtggctgc tgccagtggc | 360 |
| gataagtcgt gtcttaccgg gttggactca agacgatagt taccggataa ggcgcagcgg | 420 |
| tcgggctgaa cggggggttc gtgcacacag cccagcttgg agcgaacgac ctacaccgaa | 480 |
| ctgagatacc tacagcgtga gctatgagaa agcgccacgc ttcccgaagg gagaaaggcg | 540 |
| gacaggtatc cggtaagcgg cagggtcgga acaggagagc gcacgaggga gcttccaggg | 600 |
| ggaaacgcct ggtatcttta tagtcctgtc gggtttcgcc acctctgact tgagcgtcga | 660 |
| tttttgtgat gctcgtcagg ggggcggagc ctatggaa | 698 |

<210> SEQ ID NO 10
<211> LENGTH: 3706
<212> TYPE: DNA
<213> ORGANISM: artificial sequence
<220> FEATURE:
<223> OTHER INFORMATION: pVS1 Replicon

<400> SEQUENCE: 10

| | |
|---|---|
| cgacatgtcg cacaagtcct aagttacgcg acaggctgcc gccctgccct tttcctggcg | 60 |
| ttttcttgtc gcgtgtttta gtcgcataaa gtagaatact tgcgactaga accggagaca | 120 |
| ttacgccatg aacaagagcg ccgccgctgg cctgctgggc tatgcccgcg tcagcaccga | 180 |
| cgaccaggac ttgaccaacc aacgggccga actgcacgcg gccggctgca ccaagctgtt | 240 |
| ttccgagaag atcaccggca ccaggcgcga ccgcccggag ctggccagga tgcttgacca | 300 |
| cctacgccct ggcgacgttg tgacagtgac caggctagac cgcctggccc gcagcacccg | 360 |
| cgacctactg gacattgccg agcgcatcca ggaggccggc gcgggcctgc gtagcctggc | 420 |
| agagccgtgg gccgacacca ccacgccggc cggccgcatg gtgttgaccg tgttcgccgg | 480 |
| cattgccgag ttcgagcgtt ccctaatcat cgaccgcacc cggagcgggc gcgaggccgc | 540 |
| caaggcgcga ggcgtgaagt ttggcccccg ccctaccctc accccggcac agatcgcgca | 600 |
| cgcccgcgag ctgatcgacc aggaaggccg caccgtgaaa gaggcggctg cactgcttgg | 660 |
| cgtgcatcgc tcgaccctgt accgcgcact tgagcgcagc gaggaagtga cgcccaccga | 720 |
| ggccaggcgg cgcggtgcct tccgtgagga cgcattgacc gaggccgacg ccctggcggc | 780 |
| cgccgagaat gaacgccaag aggaacaagc atgaaaccgc accaggacgg ccaggacgaa | 840 |
| ccgttttttca ttaccgaaga gatcgaggcg gagatgatcg cggccgggta cgtgttcgag | 900 |
| ccgcccgcgc acgtctcaac cgtgcggctg catgaaatcc tggccggttt gtctgatgcc | 960 |
| aagctcgcgg cctggccggc gagcttggcc gctgaagaaa ccgagcgccg ccgtctaaaa | 1020 |
| aggtgatgtg tatttgagta aaacagcttg cgtcatgcgg tcgctgcgta tatgatgcga | 1080 |
| tgagtaaata aacaaatacg caaggggaac gcatgaaggt tatcgctgta cttaaccaga | 1140 |
| aaggcgggtc aggcaagacg accatcgcaa cccatctagc ccgcgccctg caactcgccg | 1200 |
| gggccgatgt tctgttagtc gattccgatc cccaggcag tgcccgcgat gggcggccg | 1260 |
| tgcgggaaga tcaaccgcta accgttgtcg gcatcgaccg cccgacgatt gaccgcgacg | 1320 |
| tgaaggccat cggccggcgc gacttcgtag tgatcgacgg agcgcccag gcggcggact | 1380 |
| tggctgtgtc cgcgatcaag gcagccgact cgtgctgat tccggtgcag ccaagccctt | 1440 |
| acgacatatg ggccaccgcc gacctggtgg agctggttaa gcagcgcatt gaggtcacgg | 1500 |

-continued

```
atggaaggct acaagcggcc tttgtcgtgt cgcgggcgat caaaggcacg cgcatcggcg    1560
gtgaggttgc cgaggcgctg gccgggtacg agctgcccat tcttgagtcc cgtatcacgc    1620
agcgcgtgag ctaccaggc actgccgccg ccggcacaac cgttcttgaa tcagaacccg    1680
agggcgacgc tgcccgcgag gtccaggcgc tggccgctga aattaaatca aaactcattt    1740
gagttaatga ggtaaagaga aaatgagcaa aagcacaaac acgctaagtg ccggccgtcc    1800
gagcgcacgc agcagcaagg ctgcaacgtt ggccagcctg cagacacgc cagccatgaa    1860
gcgggtcaac tttcagttgc cggcggagga tcacaccaag ctgaagatgt acgcggtacg    1920
ccaaggcaag accattaccg agctgctatc tgaatacatc gcgcagctac cagagtaaat    1980
gagcaaatga ataaatgagt agatgaattt tagcggctaa aggaggcggc atggaaaatc    2040
aagaacaacc aggcaccgac gccgtggaat gccccatgtg tggaggaacg ggcggttggc    2100
caggcgtaag cggctgggtt gtctgccggc cctgcaatgg cactggaacc cccaagcccg    2160
aggaatcggc gtgagcggtc gcaaaccatc cggcccggta caaatcggcg cggcgctggg    2220
tgatgacctg gtggagaagt tgaaggcggc gcaggccgcc cagcggcaac gcatcgaggc    2280
agaagcacgc cccggtgaat cgtggcaagc ggccgctgat cgaatccgca agaatcccg    2340
gcaaccgccg gcagccggtg cgccgtcgat taggaagccg cccaagggcg acgagcaacc    2400
agattttttc gttccgatgc tctatgacgt gggcacccgc gatagtgca gcatcatgga    2460
cgtggccgtt ttccgtctgt cgaagcgtga ccgacgagct ggcgaggtga tccgctacga    2520
gcttccagac gggcacgtag aggtttccgc agggccggcc ggcatggcga gtgtgtggga    2580
ttacgacctg gtactgatgg cggtttccca tctaaccgaa tccatgaacc gataccggga    2640
agggaaggga gacaagcccg gccgcgtgtt ccgtccacac gttgcggacg tactcaagtt    2700
ctgccggcga gccgatggcg gaaagcagaa agacgacctg gtagaaacct gcattcggtt    2760
aaacaccacg cacgttgcca tgcagcgtac gaagaaggcc aagaacggcc gcctggtgac    2820
ggtatccgag ggtgaagcct tgattagccg ctacaagatc gtaaagagcg aaaccgggcg    2880
gccggagtac atcgagatcg agctagctga ttggatgtac cgcgagatca cagaaggcaa    2940
gaacccggac gtgctgacgg ttcaccccga ttacttttg atcgatcccg gcatcggccg    3000
tttttctctac cgcctggcac gccgcgccgc aggcaaggca gaagccagat ggttgttcaa    3060
gacgatctac gaacgcagtg gcagcgccgg agagttcaag aagttctgtt tcaccgtgcg    3120
caagctgatc gggtcaaatg acctgccgga gtacgatttg aaggaggagg cggggcaggc    3180
tggcccgatc ctagtcatgc gctaccgcaa cctgatcgag ggcgaagcat ccgccggttc    3240
ctaatgtacg gagcagatgc tagggcaaat tgccctagca ggggaaaaag gtcgaaaagg    3300
tctcttcct gtggatagca cgtacattgg gaacccaaag ccgtacattg gaaccggaa    3360
cccgtacatt gggaacccaa agccgtacat tgggaaccgg tcacacatgt aagtgactga    3420
tataaaagag aaaaaggcg attttccgc ctaaaactct ttaaaactta ttaaaactct    3480
taaacccgc ctggcctgtg cataactgtc tggccagcgc acagccgaag agctgcaaaa    3540
agcgcctacc cttcggtcgc tgcgctccct acgccccgcc gcttcgcgtc ggcctatcgc    3600
ggccgctggc cgctcaaaaa tggctggcct acggccagge aatctaccag ggcgcggaca    3660
agccgcgccg tcgccactcg accgccggcg cccacatcaa ggcacc            3706
```

<210> SEQ ID NO 11
<211> LENGTH: 1008
<212> TYPE: DNA

<213> ORGANISM: Escherichia coli

<400> SEQUENCE: 11

```
atgcgctcac gcaactggtc cagaaccttg accgaacgca gcggtggtaa cggcgcagtg      60
gcggttttca tggcttgtta tgactgtttt tttggggtac agtctatgcc tcgggcatcc     120
aagcagcaag cgcgttacgc cgtgggtcga tgtttgatgt tatggagcag caacgatgtt     180
acgcagcagg gcagtcgccc taaaacaaag ttaaacatca tgagggaagc ggtgatcgcc     240
gaagtatcga ctcaactatc agaggtagtt ggcgtcatcg agcgccatct cgaaccgacg     300
ttgctggccg tacatttgta cggctccgca gtggatggcg gcctgaagcc acacagtgat     360
attgatttgc tggttacggt gaccgtaagg cttgatgaaa caacgcggcg agctttgatc     420
aacgaccttt tggaaacttc ggcttcccct ggagagagcg agattctccg cgctgtagaa     480
gtcaccattg ttgtgcacga cgacatcatt ccgtggcgtt atccagctaa gcgcgaactg     540
caatttggag aatggcagcg caatgacatt cttgcaggta tcttcgagcc agccacgatc     600
gacattgatc tggctatctt gctgacaaaa gcaagagaac atagcgttgc cttggtaggt     660
ccagcggcgg aggaactctt tgatccggtt cctgaacagg atctatttga ggcgctaaat     720
gaaaccttaa cgctatggaa ctcgccgccc gactgggctg gcgatgagcg aaatgtagtg     780
cttacgttgt cccgcatttg gtacagcgca gtaaccggca aaatcgcgcc gaaggatgtc     840
gctgccgact gggcaatgga gcgcctgccg gcccagtatc agcccgtcat acttgaagct     900
agacaggctt atcttggaca agaagaagat cgcttggcct cgcgcgcaga tcagttggaa     960
gaatttgtcc actacgtgaa aggcgagatc accaaggtag tcggcaaa                 1008
```

<210> SEQ ID NO 12
<211> LENGTH: 909
<212> TYPE: DNA
<213> ORGANISM: artificial sequence
<220> FEATURE:
<223> OTHER INFORMATION: cDNA sequence of ZmWUS2

<400> SEQUENCE: 12

```
atggcggcca atgcgggcgg cggtggagcg ggaggaggca gcggcagcgg cagcgtggct      60
gcgccggcgg tgtgccgccc cagcggctcg cggtggacgc cgacgccgga gcagatcagg     120
atgctgaagg agctctacta cggctgcggc atccggtcgc ccagctcgga gcagatccag     180
cgcatcaccg ccatgctgcg gcagcacggc aagatcgagg caagaacgt cttctactgg     240
ttccagaacc acaaggcccg cgagcgccag aagcgccgcc tcaccagcct cgacgtcaac     300
gtgcccgccg ccggcgcggc cgacgccacc accagccaac tcggcgtcct ctcgctgtcg     360
tcgccgccgc cttcaggcgc ggcgcctccc tcgcccaccc tcggcttcta cgccgccggc     420
aatggcggcg gatcggctgt gctgctggac acgagttccg actggggcag cagcggcgct     480
gccatggcca ccgagacatg cttcctccag gactacatgg gcgtgacgga cacgggcagc     540
tcgtcgcagt ggccacgctt ctcgtcgtcg gacacgataa tggcggcggc cgcggcgcgg     600
gcggcgacga cgcgggcgcc cgagacgctc cctctcttcc cgacctgcgg cgacgacggc     660
ggcagcggta gcagcagcta cttgccgttc tggggtgccg cgtccacaac tgccggcgcc     720
acttcttccg ttgcgatcca gcagcaacac cagctgcagg agcagtacag ctttttacagc     780
aacagcaaca gcacccagct ggccggcacc ggcaaccaag acgtatcggc aacagcagca     840
gcagccgccg ccctggagct gagcctcagc tcatggtgct ccccttaccc tgctgcaggg     900
agtatgtga                                                              909
```

<210> SEQ ID NO 13
<211> LENGTH: 302
<212> TYPE: PRT
<213> ORGANISM: Zea mays

<400> SEQUENCE: 13

```
Met Ala Asn Ala Gly Gly Gly Ala Gly Gly Ser Gly Ser
1               5                   10                  15

Gly Ser Val Ala Ala Pro Ala Val Cys Arg Pro Ser Gly Ser Arg Trp
                20                  25                  30

Thr Pro Thr Pro Glu Gln Ile Arg Met Leu Lys Glu Leu Tyr Tyr Gly
            35                  40                  45

Cys Gly Ile Arg Ser Pro Ser Ser Glu Gln Ile Gln Arg Ile Thr Ala
        50                  55                  60

Met Leu Arg Gln His Gly Lys Ile Glu Gly Lys Asn Val Phe Tyr Trp
65                  70                  75                  80

Phe Gln Asn His Lys Ala Arg Glu Arg Gln Lys Arg Arg Leu Thr Ser
                85                  90                  95

Leu Asp Val Asn Val Pro Ala Ala Gly Ala Asp Ala Thr Thr Ser
            100                 105                 110

Gln Leu Gly Val Leu Ser Leu Ser Pro Pro Ser Gly Ala Ala
        115                 120                 125

Pro Pro Ser Pro Thr Leu Gly Phe Tyr Ala Ala Gly Asn Gly Gly Gly
    130                 135                 140

Ser Ala Val Leu Leu Asp Thr Ser Ser Asp Trp Gly Ser Ser Gly Ala
145                 150                 155                 160

Ala Met Ala Thr Glu Thr Cys Phe Leu Gln Asp Tyr Met Gly Val Thr
                165                 170                 175

Asp Thr Gly Ser Ser Ser Gln Trp Pro Arg Phe Ser Ser Ser Asp Thr
            180                 185                 190

Ile Met Ala Ala Ala Ala Arg Ala Ala Thr Thr Arg Ala Pro Glu
        195                 200                 205

Thr Leu Pro Leu Phe Pro Thr Cys Gly Asp Asp Gly Gly Ser Gly Ser
    210                 215                 220

Ser Ser Tyr Leu Pro Phe Trp Gly Ala Ala Ser Thr Ala Gly Ala
225                 230                 235                 240

Thr Ser Ser Val Ala Ile Gln Gln Gln His Gln Leu Gln Glu Gln Tyr
                245                 250                 255

Ser Phe Tyr Ser Asn Ser Asn Ser Thr Gln Leu Ala Gly Thr Gly Asn
            260                 265                 270

Gln Asp Val Ser Ala Thr Ala Ala Ala Ala Ala Leu Glu Leu Ser
        275                 280                 285

Leu Ser Ser Trp Cys Ser Pro Tyr Pro Ala Ala Gly Ser Met
    290                 295                 300
```

<210> SEQ ID NO 14
<211> LENGTH: 13362
<212> TYPE: DNA
<213> ORGANISM: artificial sequence
<220> FEATURE:
<223> OTHER INFORMATION: IPR232-pS-01

<400> SEQUENCE: 14

```
ccggattgaa agaaatatag tttaaatatt tattgataaa ataacaagtc aggtattata      60
gtccaagcaa aaacataaat ttattgatgc aagtttaaat tcagaaatat ttcaataact     120
```

```
gattatatca gctggtacat tgccgtagat gaaagactga gtgcgatatt atgtgtaata    180
cataaattga tgatatagct agcttagctc atcgggtcag aagaactcgt caagaaggcg    240
atagaaggcg atgcgctgcg aatcgggagc ggcgataccg taaagcacga ggaagcggtc    300
agcccattcg ccgccaagct cttcagcaat atcacgggta gccaacgcta tgtcctgata    360
gcggtccgcc acacccagcc ggccacagtc gatgaatcca gaaaagcggc cattttccac    420
catgatattc ggcaagcagg catcgccatg agtcacgacg agatcctcgc cgtcgggcat    480
gcgcgccttg agcctggcga acagttcggc tggcgcgagc ccctgatgct cttcgtccag    540
atcatcctga tcgacaagac cggcttccat ccgagtacgt gctcgctcga tgcgatgttt    600
cgcttggtgg tcgaatgggc aggtagccgg atcaagcgta tgcagccgcc gcattgcatc    660
agccatgatg gatactttct cggcaggagc aaggtgagat gacaggagat cctgccccgg    720
cacttcgccc aatagcagcc agtcccttcc cgcttcagtg acaacgtcga gcacagctgc    780
gcaaggaacg cccgtcgtgg ccagccacga tagccgcgct gcctcgtcct gaagttcatt    840
cagggcaccg gacaggtcgg tcttgacaaa aagaaccggg cgcccctgcg ctgacagccg    900
gaacacggcg gcatcagagc agccgattgt ctgttgtgcc cagtcatagc cgaatagcct    960
ctccacccaa gcggccggag aacctgcgtg caatccatct tgttcaatcc aagctcccat    1020
tttctgtgat tttggatgtg tttttgtatg gattgagagt gaatatgaga ctctaattgg    1080
ataccgaggg gaatttatgg aacgtcagtg gagcattttt gacaagaaat atttgctagc    1140
tgatagtgac cttaggcgac ttttgaacgc gcaataatgg tttctgacgt atgtgcttag    1200
ctcattaaac tccagaaacc cgcggctgag tggctccttc aacgttgcgg ttctgtcagt    1260
tccaaacgta aaacggcttg tcccgcgtca tcggcggggg tcattccgga ctgtggggcc    1320
atatcccaga actggttgag tcggtccaac acctgggtgc caatcatgtc gatggtgggg    1380
tatggccaat ttttttttcaa ttcaaaaatg tagatgtccg cagcgttatt ataaaatgaa    1440
agtacatttt gataaaacga caaattacga tccgtcgtat ttataggcga aagcaataaa    1500
caaattattc taattcggaa atctttattt cgacgtgtct acattcacgt ccaaatgggg    1560
gcttagatga gaaacttcac gatcggctct agaggccatg gcggccggaa gacaaagata    1620
gcccggggcc tgcaggacca atgcattgga tctggagacc cgccggcggc agaagagatc    1680
caacaaaaca ttcacaatgg attatagaaa catttgttta ttcattataa tgagatctta    1740
cattcattta atattagaaa aagccacaaa ttcataacac aacaagccaa gaaaaaaaca    1800
caaacttaag cacacaagct ttttatttga cacaccaaat atttcatctt catcttcata    1860
tgagctcgtc gacggtaccc cctcaattag ttacatcacc actttgtaca agaaagctgg    1920
gtgtcatttt tgatgaaaca ggagcttttt gatatttcca tttgaatatt ttggtatctg    1980
attagtgatg atttcagcta acatctctgg gaactcaata ctcatggtct tatccaaaaa    2040
tgtctggaag cagtaggtaa ggagattctc aaccacctca tgcatggagt ccagaagctt    2100
tgtcagttgg taaaaccgtt gccagttctg actggagttc ccttccccttt tgacgatggc    2160 ttttcctagc tctttgatat aagtcattcg aatctcatca ataactctt ggctcttcag     2220 accttcctta ggaactgagg agagaagcag taaggttttc atacagagat actcttcata    2280
ggatacctgc aatctttgta attcagagga gacaaacagc atgtgtttac attggtcata    2340
catgcagggt agagacattc tctgctcatt aataatcaga tcaggagcaa agcagagcag    2400
gtttccactt gattgtctgt atgatctcca acccagggca aatgccatga gaaacatcca    2460
```

```
tgagtactgt agcagggtca tttggtcatc caggtgtaag tttctgaagc ctggtatcgc    2520
ctttgcccat ttcactgctg caatcacttg acgcccacct aacatgttga gtgtggtcat    2580
aattctccac gctgaatctg aacagagct atcatatcct gcatacaaca cctcgggttc     2640
aatcacctcc agcagtgaca ccaaggtagg ggtgagctgt ggtaatgcag caggaactat    2700
tgttttgtta ggattttccg aagtgtcttg tgagactcct gcagtggctt gctgaatccc    2760
tttgattttt ttctttgtag atccattgtc gttccaaact gtaaatgttg gagcaacttc    2820
tccaccacct tccccatggt aatacatatt agagccaaca ttattcgtca ttgccgcggg    2880
aaaatctcca cctggcgact gctgggtctg ctgctgctga gcaaagtaat aatggtttct    2940
tgcgttataa tcaaactcac tagcagcgta ggcatcgcag ttaaccgggg ctgcaaatcc    3000
ttgataacca ccataaccaa caacatttcc acaaacagta accgaatcat ccgaaacaga    3060
actttgatga tcgatattag tcatgaggct ctgcgtgttg ctcaagaaat ggtgttgatc    3120
atcctcttgt ttgaaacaag ccctagcact ctccgaagac aagtttcctc cattgtaata    3180
ataaccattg tacctctctt gatgttggtg caataagctc aaatctactc cctgatgatg    3240
ctgaaccgca gcgttttgcc aaccgctagc actattctca ctctctgaaa cgttattact    3300
gatcatcatc atacttggaa ccggacggtt agcctccttg agacgttttg cggcgctacc    3360
aataggaaga ctaggctttt cgaggattgc tttaacgttg tatctgttca tgtcgaagtt    3420
agtcactgcg gttaatcctc tgaatttgat ggccgcaatg tcgtatgcct ctgcagcttc    3480
ttcttgtgtg ccaaaagttc ccaagtagag gtctttgtta ccggcgactc ttcctatcct    3540
agcttgccat cttccatgtt ggtgatgtct tgttactcca cgataaatcg atgcaccacg    3600
agagaaacca ctacttttcc tgcgcagtga ggcaacatac tcttgccttg tcatgtgctt    3660
catctcttct acctcttttt catattcgct catggggaag ttagtagtag tggtggttcc    3720
ccaatacttg agtgcggcta aatcataagc cctagctgct ttttcttctt tgtcataacc    3780
tcccaaataa acttgtcttc cttgtcgcgt ttggccttct cttttacaac tattatccca    3840
taaatgtgcc tcatatcttc ctgtccaccg atgccttgta acaccgcggt atatagacgt    3900
cctctgtcca aaactctcaa tagttttctt cggtgtagct tcaacgctat catcaatagt    3960
cttcccttgg gcaacaacgt tgttattgct gtcgttgttg ttatcacaag aagtagatga    4020
gttcattgag agggacaggc cttttgcagc attgccattt tcttgattat caacattatc    4080
cacgggttga tttctcagcc atgtctttat catcgaaagt cctagtgagc caccaccacc    4140
gtctcctcct ccataacagc cacttccact tccatctcca cgttttcgt tggtgttgta     4200 aatcgtggtg gtgcggccaa ggaaattctc aagctttggt ccatcttgct catcgttgtg    4260
gatgttattg catgcacaac cattgatgtc ccaatctcgg gagtgactat tgttgtctct    4320
ggtgaaagca tcgacgacga caccaaaggg agaaggaaac gatgtttgga tggctgaaga    4380
ctcatcggag gcagcggtcg gatcgtaaca gtactctccg gcgacatcta cgacggttgt    4440
ggtggtggaa gagtagacgt ccttacgatg gtgattttgt tcataaggag agagagaaaa    4500
gcctaaccag ttattatcca ttgagcctgc ttttttgtac aaacttgtga tcgggatctg    4560
taattgtaat gttgtttgtt gtttgttgtt gttggtaatt gtggatcctc tagagtcccc    4620
cgtgttctct ccaaatgaaa tgaacttcct tatatagagg aagggtcttg cgaaggatag    4680
tgggattgtg cgtcatccct tacgtcagtg gagatatcac atcaatccac ttgctttgaa    4740
gacgtggttg gaacgtcttc ttttttccacg atgctcctcg tgggtggggg tccatctttg    4800
ggaccactgt cggcagaggc atcttcaacg atggcctttc ctttatcgca atgatggcat    4860
```

```
ttgtaggagc caccttcctt ttccactatc ttcacaataa agtgacagat agctgggcaa   4920
tggaatccga ggaggtttcc ggatattacc ctttgttgaa aagtctcaat tgcccttggg   4980
tcttctgaga ctgtatcttt gatattttg gagtagacaa gtgtgtcgtg ctccaccatg   5040
ttgacgaaga ttttcttctt gtcattgagt cgtaagagac tctgtatgaa ctgttcgcca   5100
gtctttacgg cgagttctgt taggtcctct atttgaatct ttgactccat ggcctttgat   5160
tcagtgggaa ctacctttt agagactcca atctctatta cttgcctcgc cggcgggtct   5220
cgggatcccc tgcaggacta gtggatttgt cttcaaggcc ttaagggcca gatcttgggc   5280
ccggtacccg atcagattgt cgtttcccgc cttcggttta aactatcagt gtttgacagg   5340
atatattggc gggtaaacct aagagaaaag agcgtttatt agaataatcg gatatttaaa   5400
agggcgtgaa aaggtttatc cgttcgtcca tttgtatgtg catgccaacc acagggttcc   5460
cctcgggagt gcttggcatt ccgtgcgata atgacttctg ttcaaccacc caaacgtcgg   5520
aaagcctgac gacggagcag cattccaaaa agatcccttg gctcgtctgg gtcggctaga   5580
aggtcgagtg ggctgctgtg gcttgatccc tcaacgcggt cgcggacgta gcgcagcgcc   5640
gaaaaatcct cgatcgcaaa tccgacgctg tcgaaaagcg tgatctgctt gtcgctcttt   5700
cggccgacgt cctggccagt catcacgcgc caaagttccg tcacaggatg atctggcgcg   5760
agttgctgga tctcgccttc aatccgggtc tgtggcggga actccacgaa aatatccgaa   5820
cgcagcaaga tatcgcggtg catctcggtc ttgcctgggc agtcgccgcc gacgccgttg   5880
atgtggacgc cgaaaaggat ctaggtgaag atccttttg ataatctcat gaccaaaatc   5940
ccttaacgtg agttttcgtt ccactgagcg tcagaccccg tagaaaagat caaaggatct   6000
tcttgagatc ctttttttct gcgcgtaatc tgctgcttgc aaacaaaaaa accaccgcta   6060
ccagcggtgg tttgtttgcc ggatcaagag ctaccaactc ttttccgaa ggtaactggc   6120
ttcagcagag cgcagatacc aaatactgtt cttctagtgt agccgtagtt aggccaccac   6180
ttcaagaact ctgtagcacc gcctacatac ctcgctctgc taatcctgtt accagtggct   6240
gctgccagtg gcgataagtc gtgtcttacc gggttggact caagacgata gttaccggat   6300
aaggcgcagc ggtcgggctg aacggggggt tcgtgcacac agcccagctt ggagcgaacg   6360
acctacaccg aactgagata cctacagcgt gagctatgag aaagcgccac gcttcccgaa   6420
gggagaaagg cggacaggta tccggtaagc ggcagggtcg gaacaggaga gcgcacgagg   6480
gagcttccag ggggaaacgc ctggtatctt tatagtcctg tcgggtttcg ccacctctga   6540
cttgagcgtc gatttttgtg atgctcgtca gggggggcgga gcctatggaa aaacgccagc   6600
aacgcggcct ttttacggtt cctggccttt tgctggcctt tgctcacat gttctttcct   6660
gcgttatccc ctgattctgt ggataaccga ttaccgcctt tgagtgagct gataccgctc   6720
gccgcagccg aacgaccgag cgcagcgagt cagtgagcga ggaagcggaa gagcgcctga   6780
tgcggtattt tctccttacg catctgtgcg gtatttcaca ccgcatatgg tgcactctca   6840
gtacaatctg ctctgatgcc gcatagttaa gccagtatac actccgctat cgctacgtga   6900
ctgggtcatg gctgcgcccc gacacccgcc aacacccgct gacgcgccct gacgggcttg   6960
tctgctcccg gcatccgctt acagacaagc tgtgaccgtc tccgggagct gcatgtgtca   7020
gaggttttca ccgtcatcac cgaaacgcgc gaggcagggg tacgtcgagg tcgatccaac   7080
ccctccgctg ctatagtgca gtcggcttct gacgttcagt gcagccgtct tctgaaaacg   7140
acatgtcgca caagtcctaa gttacgcgac aggctgccgc cctgcccttt tcctggcgtt   7200
```

```
ttcttgtcgc gtgttttagt cgcataaagt agaatacttg cgactagaac cggagacatt   7260
acgccatgaa caagagcgcc gccgctggcc tgctgggcta tgcccgcgtc agcaccgacg   7320
accaggactt gaccaaccaa cgggccgaac tgcacgcggc cggctgcacc aagctgtttt   7380
ccgagaagat caccggcacc aggcgcgacc gcccggagct ggccaggatg cttgaccacc   7440
tacgccctgg cgacgttgtg acagtgacca ggctagaccg cctggcccgc agcacccgcg   7500
acctactgga cattgccgag cacatccagg aggccggcgc gggcctgcgt agcctggcag   7560
agccgtgggc cgacaccacc acgccggccg gccgcatggt gttgaccgtg ttcgccggca   7620
ttgccgagtt cgagcgttcc ctaatcatcg accgcacccg gagcgggcgc gaggccgcca   7680
aggcgcgagg cgtgaagttt ggcccccgcc ctaccctcac cccggcacag atcgcgcacg   7740
cccgcgagct gatcgaccag gaaggccgca ccgtgaaaga ggcggctgca ctgcttggcg   7800
tgcatcgctc gaccctgtac cgcgcacttg agcgcagcga ggaagtgacg cccaccgagg   7860
ccaggcggcg cggtgccttc cgtgaggacg cattgaccga ggccgacgcc ctggcggccg   7920
ccgagaatga acgccaagag gaacaagcat gaaaccgcac caggacggcc aggacgaacc   7980
gtttttcatt accgaagaga tcgaggcgga tgatcgcg gccgggtacg tgttcgagcc   8040
gcccgcgcac gtctcaaccg tgcggctgca tgaaatcctg gccggtttgt ctgatgccaa   8100
gctcgcggcc tggccggcga gcttggccgc tgaagaaacc gagcgccgcc gtctaaaaag   8160
gtgatgtgta tttgagtaaa acagcttgcg tcatgcggtc gctgcgtata tgatgcgatg   8220
agtaaataaa caaatacgca aggggaacgc atgaaggtta tcgctgtact taaccagaaa   8280
ggcgggtcag gcaagacgac catcgcaacc catctagccc gcgccctgca actcgccggg   8340
gccgatgttc tgttagtcga ttccgatccc cagggcagtg cccgcgattg ggcggccgtg   8400
cgggaagatc aaccgctaac cgttgtcggc atcgaccgcc cgacgattga ccgcgacgtg   8460
aaggccatcg gccggcgcga cttcgtagtg atcgacggag cgccccaggc ggcggacttg   8520
gctgtgtccg cgatcaaggc agccgacttc gtgctgattc cggtgcagcc aagcccttac   8580
gacatatggg ccaccgccga cctggtggag ctggttaagc agcgcattga ggtcacggat   8640
ggaaggctac aagcggcctt tgtcgtgtcg cgggcgatca aaggcacgcg catcggcggt   8700
gaggttgccg aggcgctggc cgggtacgag ctgcccattc ttgagtcccg tatcacgcag   8760
cgcgtgagct acccaggcac tgccgccgcc ggcacaaccg ttcttgaatc agaacccgag   8820
ggcgacgctg cccgcgaggt ccaggcgctg gccgctgaaa ttaaatcaaa actcatttga   8880
gttaatgagg taaagagaaa atgagcaaaa gcacaaacac gctaagtgcc ggccgtccga   8940
gcgcacgcag cagcaaggct gcaacgttgg ccagcctggc agacacgcca gccatgaagc   9000
gggtcaactt tcagttgccg gcggaggatc acaccaagct gaagatgtac gcggtacgcc   9060
aaggcaagac cattaccgag ctgctatctg aatacatcgc gcagctacca gagtaaatga   9120
gcaaatgaat aaatgagtag atgaatttta gcggctaaag gaggcggcat ggaaaatcaa   9180
gaacaaccag gcaccgacgc cgtggaatgc cccatgtgtg gaggaacggg cggttggcca   9240
ggcgtaagcg gctgggttgt ctgccggccc tgcaatggca ctggaacccc caagcccgag   9300
gaatcggcgt gagcggtcgc aaaccatccg gcccggtaca atcggcgcg cgctggtg   9360
atgacctggt ggagaagttg aaggcggcgc aggccgccca gcggcaacgc atcgaggcag   9420
aagcacgccc cggtgaatcg tggcaagcgg ccgctgatcg aatccgcaaa gaatcccggc   9480
aaccgccggc agccggtgcg ccgtcgatta ggaagccgcc caaggcgac gagcaaccag   9540
attttttcgt tccgatgctc tatgacgtgg gcacccgcga tagtcgcagc atcatggacg   9600
```

```
tggccgtttt ccgtctgtcg aagcgtgacc gacgagctgg cgaggtgatc cgctacgagc    9660
ttccagacgg gcacgtagag gtttccgcag ggccggccgg catggcgagt gtgtgggatt    9720
acgacctggt actgatggcg gtttcccatc taaccgaatc catgaaccga taccgggaag    9780
ggaagggaga caagcccggc cgcgtgttcc gtccacacgt tgcggacgta ctcaagttct    9840
gccggcgagc cgatggcgga aagcagaaag acgacctggt agaaacctgc attcggttaa    9900
acaccacgca cgttgccatg cagcgtacga agaaggccaa gaacgccgc ctggtgacgg     9960 tatccgaggg tgaagccttg attagccgct acaagatcgt aaagagcgaa accgggcggc   10020
cggagtacat cgagatcgag ctagctgatt ggatgtaccg cgagatcaca gaaggcaaga   10080
acccggacgt gctgacggtt caccccgatt acttttgat cgatcccggc atcggccgtt    10140
ttctctaccg cctggcacgc cgcgccgcag gcaaggcaga agccagatgg ttgttcaaga   10200
cgatctacga acgcagtggc agcgccggag agttcaagaa gttctgtttc accgtgcgca   10260
agctgatcgg gtcaaatgac ctgccggagt acgatttgaa ggaggaggcg gggcaggctg   10320
gcccgatcct agtcatgcgc taccgcaacc tgatcgaagg cgaagcatcc gccggttcct   10380
aatgtacgga gcagatgcta gggcaaattg ccctagcagg ggaaaaaggt cgaaaaggtc   10440
tctttcctgt ggatagcacg tacattggga acccaaagcc gtacattggg aaccggaacc   10500
cgtacattgg gaacccaaag ccgtacattg gaaccggtc acacatgtaa gtgactgata    10560 taaagagaa aaaggcgat ttttccgcct aaaactcttt aaaacttatt aaaactctta    10620
aaacccgcct ggcctgtgca taactgtctg gccagcgcac agccgaagag ctgcaaaaag   10680
cgcctaccct tcggtcgctg cgctccctac gccccgccgc ttcgcgtcgg cctatcgcgg   10740
ccgctggccg ctcaaaaatg gctggcctac ggccaggcaa tctaccaggg cgcggacaag   10800
ccgcgccgtc gccactcgac cgccggcgcc cacatcaagg caccggtggg tatgcctgac   10860
gatgcgtgga gaccgaaacc ttgcgctcgt tcgccagcca ggacagaaat gcctcgactt   10920
cgctgctgcc caaggttgcc gggtgacgca caccgtggaa acggatgaag gcacgaaccc   10980
agtggacata agcctgttcg gttcgtaagc tgtaatgcaa gtagcgtatg cgctcacgca   11040
actggtccag aaccttgacc gaacgcagcg gtggtaacgg cgcagtggcg gttttcatgg   11100
cttgttatga ctgtttttt ggggtacagt ctatgcctcg ggcatccaag cagcaagcgc    11160
gttacgccgt gggtcgatgt tgatgttat ggagcagcaa cgatgttacg cagcagggca    11220
gtcgccctaa aacaaagtta aacatcatga gggaagcggt gatcgccgaa gtatcgactc   11280
aactatcaga ggtagttggc gtcatcgagc gccatctcga accgacgttg ctggccgtac   11340
atttgtacgg ctccgcagtg gatggcggcc tgaagccaca cagtgatatt gatttgctgg   11400
ttacggtgac cgtaaggctt gatgaaacaa cgcggcgagc tttgatcaac gaccttttgg   11460
aaacttcggc ttcccctgga gagagcgaga ttctccgcgc tgtagaagtc accattgttg   11520
tgcacgacga catcattccg tggcgttatc cagctaagcg cgaactgcaa tttgagaat    11580 ggcagcgcaa tgacattctt gcaggtatct tcgagccagc cacgatcgac attgatctgg   11640
ctatcttgct gacaaaagca agagaacata gcgttgcctt ggtaggtcca gcggcggagg   11700
aactctttga tccggttcct gaacaggatc tatttgaggc gctaaatgaa accttaacgc   11760
tatggaactc gccgcccgac tgggctggcg atgagcgaaa tgtagtgctt acgttgtccc   11820
gcatttggta cagcgcagta accggcaaaa tcgcgccgaa ggatgtcgct gccgactggg   11880
caatggagcg cctgccggcc cagtatcagc ccgtcatact tgaagctaga caggcttatc   11940
```

```
ttggacaaga agaagatcgc ttggcctcgc gcgcagatca gttggaagaa tttgtccact   12000
acgtgaaagg cgagatcacc aaggtagtcg gcaaataatg tctaacaatt cgttcaagcc   12060
gacgccgctt cgcggcgcgg cttaactcaa gcgttagatg cactaagcac ataattgctc   12120
acagccaaac tatcaggtca agtctgcttt tattattttt aagcgtgcat aataagccct   12180
acacaaattg ggagatatat catgaaaggc tggcttttc ttgttatcgc aatagttggc    12240
gaagtaatcg caacatagct tgcttggtcg ttccgcgtga acgtcggctc gattgtacct   12300
gcgttcaaat actttgcgat cgtgttgcgc gcctgcccgg tgcgtcggct gatctcacgg   12360
atcgactgct tctctcgcaa cgccatccga cggatgatgt ttaaaagtcc catgtggatc   12420
actccgttgc cccgtcgctc accgtgttgg ggggaaggtg cacatggctc agttctcaat   12480
ggaaattatc tgcctaaccg gctcagttct gcgtagaaac caacatgcaa gctccaccgg   12540
gtgcaaagcg gcagcggcgg caggatatat tcaattgtaa atggcttcat gtccgggaaa   12600
tctacatgga tcagcaatga gtatgatggt caatatggag aaaagaaag agtaattacc     12660
aattttttt caattcaaaa atgtagatgt ccgcagcgtt attataaat gaaagtacat      12720
tttgataaaa cgacaaatta cgatccgtcg tatttatagg cgaaagcaat aaacaaatta   12780
ttctaattcg gaaatcttta tttcgacgtg tctacattca cgtccaaatg ggggcttaga   12840
tgagaaactt cacgatcggc tctagttcga gcgatctagt aacatagatg acaccgcgcg   12900
cgataattta tcctagtttg cgcgctatat tttgttttct atcgcgtatt aaatgtataa   12960
ttgcgggact ctaatcataa aaacccatct cataaataac gtcatgcatt acatgttaat   13020
tattacatgc ttaacgtaat tcaacagaaa ttatatgata atcatcgcaa gaccggcaac   13080
aggattcaat cttaagaaac tttattgcca aatgtttgaa cgatcgggga aattcgtttc   13140
tatgcttcaa ttctgctcta tagatgttct tctagtctta acttttagaa ggcacaacat   13200
ttgaaatgtt ggtaattttt ctgctgggta gtgaaccatt gtaatttgtg tttgcttata   13260
ttatccgttg ggtttctcta tgttatctgt ggggccatat cccagaactg gttgagtcgg   13320
tccaacacct gggtgccaat catgtcgatg gtggggtatg gt                      13362
```

<210> SEQ ID NO 15
<211> LENGTH: 12734
<212> TYPE: DNA
<213> ORGANISM: artificial sequence
<220> FEATURE:
<223> OTHER INFORMATION: IPR252-pS-01

<400> SEQUENCE: 15

```
ccggattgaa agaaatatag tttaaatatt tattgataaa ataacaagtc aggtattata     60
gtccaagcaa aaacataaat ttattgatgc aagtttaaat tcagaaatat ttcaataact   120
gattatatca gctggtacat tgccgtagat gaaagactga gtgcgatatt atgtgtaata   180
cataaattga tgatatagct agcttagctc atcgggtcag aagaactcgt caagaaggcg   240
atagaaggcg atgcgctgcg aatcgggagc ggcgataccg taaagcacga ggaagcggtc   300
agcccattcg ccgccaagct cttcagcaat atcacgggta gccaacgcta tgtcctgata   360
gcggtccgcc acacccagcc ggccacagtc gatgaatcca gaaaagcggc cattttccac   420
catgatattc ggcaagcagg catcgccatg agtcacgacg agatcctcgc cgtcgggcat   480
gcgcgccttg agcctggcga acagttcggc tggcgcgagc ccctgatgct cttcgtccag   540
atcatcctga tcgacaagac cggcttccat ccgagtacgt gctcgctcga tgcgatgttt   600
cgcttggtgg tcgaatgggc aggtagccgg atcaagcgta tgcagccgcc gcattgcatc   660
```

```
agccatgatg gatactttct cggcaggagc aaggtgagat gacaggagat cctgccccgg    720
cacttcgccc aatagcagcc agtcccttcc cgcttcagtg acaacgtcga gcacagctgc    780
gcaaggaacg cccgtcgtgg ccagccacga tagccgcgct gcctcgtcct gaagttcatt    840
cagggcaccg gacaggtcgg tcttgacaaa aagaaccggg cgcccctgcg ctgacagccg    900
gaacacggcg gcatcagagc agccgattgt ctgttgtgcc cagtcatagc cgaatagcct    960
ctccacccaa gcggccggag aacctgcgtg caatccatct tgttcaatcc aagctcccat   1020
tttctgtgat tttggatgtg ttttttgtatg gattgagagt gaatatgaga ctctaattgg   1080
ataccgaggg gaatttatgg aacgtcagtg gagcattttt gacaagaaat atttgctagc   1140
tgatagtgac cttaggcgac ttttgaacgc gcaataatgg tttctgacgt atgtgcttag   1200
ctcattaaac tccagaaacc cgcggctgag tggctccttc aacgttgcgg ttctgtcagt   1260
tccaaacgta aaacggcttg tcccgcgtca tcggcggggg tcattccgga ctgtggggcc   1320
atatcccaga actggttgag tcggtccaac acctgggtgc caatcatgtc gatggtgggg   1380
tatggccaat ttttttttcaa ttcaaaaatg tagatgtccg cagcgttatt ataaaatgaa   1440
agtacatttt gataaaacga caaattacga tccgtcgtat ttataggcga aagcaataaa   1500
caaattattc taattcggaa atctttattt cgacgtgtct acattcacgt ccaaatgggg   1560
gcttagatga gaacttcac gatcggctct agaggccatg gcggccggaa gacaaagata   1620
gcccggggcc tgcaggacca atgcattgga tctggagacc cgccggcggc agaagagatc   1680
caacaaaaca ttcacaatgg attatagaaa catttgttta ttcattataa tgagatctta   1740
cattcattta atattagaaa aagccacaaa ttcataacac aacaagccaa gaaaaaaaca   1800
caaacttaag cacacaagct ttttatttga cacaccaaat atttcatctt catcttcata   1860
tgagctcgtc gacggtaccc cctcaattag ttacatcacc actttgtaca agaaagctgg   1920
gtacaaatgt ttgaacgatc ggggaaattc gagctcggta ccggcccccc cctcgagttt   1980
tttttttttt tttttttag tctgaaaatt tatccaacta atggaaacta aaataagtc    2040 ttaagaaatt aaccaagaaa aagaaaaaga gaaagaaaaa aacataatca aagtatcaca   2100
ctgttcacca gcacacaaca acgcatataa ctaaagatct ttaactatt tttctaattg    2160 tcgttccaaa ctgtaaatgt tggagcaact tctccaccac cttccccatg gtaatacata   2220
ttagagccaa cattattcgt cattgccgcg ggaaaatctc cacctggcga ctgctgggtc   2280
tgctgctgct gagcaaagta ataatggttt cttgcgttat aatcaaactc actagcagcg   2340
taggcatcgc agttaaccgg ggctgcaaat ccttgataac caccataacc aacaacattt   2400
ccacaaacag taaccgaatc atccgaaaca gaactttgat gatcgatatt agtcatgagg   2460
ctctgcgtgt tgctcaagaa atggtgttga tcatcctctt gtttgaaaca agccctagca   2520
ctctccgaag acaagtttcc tccattgtaa taataaccat tgtacctctc ttgatgttgg   2580
tgcaataagc tcaaatctac tccctgatga tgctgaaccg cagcgttttg ccaaccgcta   2640
gcactattct cactctctga acgttatta ctgatcatca tcatacttgg aaccggacgg    2700
ttagcctcct tgagacgttt tgcggcgcta ccaataggaa gactagggct ttcgaggatt   2760
gctttaacgt tgtatctgtt catgtcgaag ttagtcactg cggttaatcc tctgaatttg   2820
atggccgcaa tgtcgtatgc ctctgcagct tcttcttgtg tgccaaaagt tcccaagtag   2880
aggtctttgt taccggcgac tcttcctatc ctagcttgcc atcttccatg ttggtgatgt   2940
cttgttactc cacgataaat cgatgcacca cgagagaaac cactacttt cctgcgcagt    3000
```

```
gaggcaacat actcttgcct tgtcatgtgc ttcatctctt ctacctcttt ttcatattcg    3060
ctcatgggga agttagtagt agtggtggtt ccccaatact tgagtgcggc taaatcataa    3120
gccctagctg cttttttcttc tttgtcataa cctcccaaat aaacttgtct tcctttgcgc   3180
gtttggcctt ctcttttaca actattatcc cataaatgtg cctcatatct tcctgtccac   3240
cgatgccttg taacaccgcg gtatatagac gtcctctgtc caaaactctc aatagttttc   3300
ttcggtgtag cttcaacgct atcatcaata gtcttcsctt gggcaacaac gttgttattg    3360
ctgtcgttgt tgttatcaca agaagtagat gagttcattg agagggacag gccttttgca   3420
gcattgccat tttcttgatt atcaacatta tccacgggtt gatttctcag ccatgtcttt    3480
atcatcgaaa gtcctagtga gccaccacca ccgtctcctc tcccataaca gccacttcca    3540
cttccatctc caacgttttc gttggtgttg taaatcgtgg tggtgcggcc aaggaaattc    3600
tcaagctttg gtccatcttg ctcatcgttg tggatgttat tgcatgcaca accattgatg   3660
tcccaatctc gggagtgact attgttgtct ctggtgaaag catcgacgac gacaccaaag   3720
ggagaaggaa acgatgtttg gatggctgaa gactcatcgg aggcagcggt cggatcgtaa   3780
cagtactctc cggcgacatc tacgacggtt gtggtggtgg aagagtagac gtccttacga   3840
tggtgatttt gttcataagg agagagagaa aagcctaacc agttattatc cattgagcct    3900 gctttttttgt acaaacttgt gatcgggatc tgtaattgta atgttgtttg ttgtttgttg    3960
ttgttggtaa ttgtggatcc tctagagtcc cccgtgtcct ctccaaatga aatgaacttc    4020
cttatataga ggaagggtct tgcgaaggat agtgggattg tgcgtcatcc cttacgtcag    4080
tggagatatc acatcaatcc acttgctttg aagacgtggt tggaacgtct tcttttttcca   4140 cgatgctcct cgtgggtggg ggtccatctt tgggaccact gtcggcagag gcatcttcaa    4200
cgatggcctt tccttttatcg caatgatggc atttgtagga gccaccttcc ttttccacta   4260
tcttcacaat aaagtgacag atagctgggc aatggaatcc gaggaggttt ccggatatta    4320 cccttttgttg aaaagtctca attgccctttt ggtcttctga gactgtatct ttgatattttt   4380 tggagtagac aagtgtgtcg tgctccacca tgttgacgaa gattttcttc ttgtcattga    4440
gtcgtaagag actctgtatg aactgttcgc cagtctttac ggcgagttct gttaggtcct    4500
ctatttgaat ctttgactcc atggcctttg attcagtggg aactacccttt ttagagactc    4560 caatctctat tacttgcctc gccggcgggt ctcgggatcc cctgcaggac tagtggattt    4620
gtcttcaagg ccttaagggc cagatcttgg gcccggtacc cgatcagatt gtcgtttccc    4680
gccttcggtt taaactatca gtgtttgaca ggatatattg gcgggtaaac ctaagagaaa    4740
agagcgttta ttagaataat cggatattta aaagggcgtg aaaaggttta tccgttcgtc    4800
catttgtatg tgcatgccaa ccacagggtt cccctcggga gtgcttggca ttccgtgcga    4860
taatgacttc tgttcaacca cccaaacgtc ggaaagcctg acgacggagc agcattccaa    4920
aaagatccct tggctcgtct gggtcggcta aaggtcgag tgggctgctg tggcttgatc    4980
cctcaacgcg gtcgcggacg tagcgcagcg ccgaaaaatc ctcgatcgca aatccgacgc    5040
tgtcgaaaag cgtgatctgc ttgtcgctct ttcggccgac gtcctggcca gtcatcacgc    5100
gccaaagttc cgtcacagga tgatctgcg cgagttgctg gatctcgcct tcaatccggg    5160
tctgtggcgg gaactccacg aaaatatccg aacgcagcaa gatatcgcgg tgcatctcgg   5220
tcttgcctgg gcagtcgccg ccgacgccgt tgatgtggac gccgaaaagg atctaggtga   5280
agatcctttt tgataatctc atgaccaaaa tcccttaacg tgagttttcg ttccactgag    5340
cgtcagaccc cgtagaaaag atcaaggat cttcttgaga tccttttttt ctgcgcgtaa    5400
```

```
tctgctgctt gcaaacaaaa aaaccaccgc taccagcggt ggtttgtttg ccggatcaag    5460
agctaccaac tcttttttccg aaggtaactg gcttcagcag agcgcagata ccaaatactg    5520
ttcttctagt gtagccgtag ttaggccacc acttcaagaa ctctgtagca ccgcctacat    5580
acctcgctct gctaatcctg ttaccagtgg ctgctgccag tggcgataag tcgtgtctta    5640 ccggggttgga ctcaagacga tagttaccgg ataaggcgca gcggtcgggc tgaacggggg    5700
gttcgtgcac acagcccagc ttggagcgaa cgacctacac cgaactgaga tacctacagc    5760
gtgagctatg agaaagcgcc acgcttcccg aagggagaaa ggcggacagg tatccggtaa    5820
gcggcagggt cggaacagga gagcgcacga gggagcttcc aggggaaac gcctggtatc     5880 tttatagtcc tgtcgggttt cgccacctct gacttgagcg tcgattttttg tgatgctcgt    5940 caggggggcg gagcctatgg aaaaacgcca gcaacgcggc cttttttacgg ttcctggcct    6000 tttgctggcc ttttgctcac atgttctttc ctgcgttatc ccctgattct gtggataacc    6060
gattaccgcc tttgagtgag ctgataccgc tcgccgcagc cgaacgaccg agcgcagcga    6120
gtcagtgagc gaggaagcgg aagagcgcct gatgcggtat tttctcctta cgcatctgtg    6180
cggtatttca caccgcatat ggtgcactct cagtacaatc tgctctgatg ccgcatagtt    6240
aagccagtat acactccgct atcgctacgt gactgggtca tggctgcgcc ccgacacccg    6300
ccaacacccg ctgacgcgcc ctgacgggct tgtctgctcc cggcatccgc ttacagacaa    6360
gctgtgaccg tctccgggag ctgcatgtgt cagaggtttt caccgtcatc accgaaacgc    6420
gcgaggcagg ggtacgtcga ggtcgatcca acccctccgc tgctatagtg cagtcggctt    6480
ctgacgttca gtgcagccgt cttctgaaaa cgacatgtcg cacaagtcct aagttacgcg    6540
acaggctgcc gccctgccct ttttcctggcg ttttcttgtc gcgtgtttta gtcgcataaa    6600
gtagaatact tgcgactaga accggagaca ttacgccatg aacaagagcg ccgccgctgg    6660
cctgctgggc tatgcccgcg tcagcaccga cgaccaggac ttgaccaacc aacgggccga    6720
actgcacgcg gccggctgca ccaagctgtt ttccgagaag atcaccggca ccaggcgcga    6780
ccgcccggag ctggccagga tgcttgacca cctacgccct ggcgacgttg tgacagtgac    6840
caggctagac cgcctggccc gcagcacccg cgacctactg gacattgccg agcacatcca    6900
ggaggccggc gcgggcctgc gtagcctggc agagccgtgg gccgacacca ccacgccggc    6960
cggccgcatg gtgttgaccg tgttcgccgg cattgccgag ttcgagcgtt ccctaatcat    7020
cgaccgcacc cggagcgggc gcgaggccgc caaggcgcga ggcgtgaagt ttggcccccg    7080
ccctaccctc accccggcac agatcgcgca cgcccgcgag ctgatcgacc aggaaggccg    7140
caccgtgaaa gaggcggctg cactgcttgg cgtgcatcgc tcgaccctgt accgcgcact    7200
tgagcgcagc gaggaagtga cgcccaccga ggccaggcgg cgcggtgcct tccgtgagga    7260
cgcattgacc gaggccgacg ccctggcggc cgccgagaat gaacgccaag aggaacaagc    7320
atgaaaccgc accaggacgg ccaggacgaa ccgttttttca ttaccgaaga gatcgaggcg    7380
gagatgatcg cggccgggta cgtgttcgag ccgcccgcgc acgtctcaac cgtgcggctg    7440
catgaaatcc tggccggttt gtctgatgcc aagctcgcgg cctggccggc gagcttggcc    7500
gctgaagaaa ccgagcgccg ccgtctaaaa aggtgatgtg tatttgagta aaacagcttg    7560
cgtcatgcgg tcgctgcgta tatgatgcga tgagtaaata aacaaatacg caaggggaac    7620
gcatgaaggt tatcgctgta cttaaccaga aaggcgggtc aggcaagacg accatcgcaa    7680
cccatctagc ccgcgccctg caactcgccg gggccgatgt tctgttagtc gattccgatc    7740
```

-continued

```
cccagggcag tgcccgcgat tgggcggccg tgcgggaaga tcaaccgcta accgttgtcg    7800
gcatcgaccg cccgacgatt gaccgcgacg tgaaggccat cggccggcgc gacttcgtag    7860
tgatcgacgg agcgccccag gcggcggact tggctgtgtc cgcgatcaag gcagccgact    7920
tcgtgctgat tccggtgcag ccaagcccct acgacatatg gccaccgcc gacctggtgg     7980
agctggttaa gcagcgcatt gaggtcacgg atggaaggct acaagcggcc tttgtcgtgt    8040
cgcgggcgat caaaggcacg cgcatcggcg gtgaggttgc cgaggcgctg gccgggtacg    8100
agctgcccat tcttgagtcc cgtatcacgc agcgcgtgag ctacccaggc actgccgccg    8160
ccggcacaac cgttcttgaa tcagaacccg agggcgacgc tgcccgcgag gtccaggcgc    8220
tggccgctga aattaaatca aaactcattt gagttaatga ggtaaagaga aaatgagcaa    8280
aagcacaaac acgctaagtg ccggccgtcc gagcgcacgc agcagcaagg ctgcaacgtt    8340
ggccagcctg gcagacacgc cagccatgaa gcgggtcaac tttcagttgc cggcggagga    8400
tcacaccaag ctgaagatgt acgcggtacg ccaaggcaag accattaccg agctgctatc    8460
tgaatacatc gcgcagctac cagagtaaat gagcaaatga ataaatgagt agatgaattt    8520
tagcggctaa aggaggcggc atggaaaatc aagaacaacc aggcaccgac gccgtggaat    8580
gccccatgtg tggaggaacg ggcggttggc caggcgtaag cggctgggtt gtctgccggc    8640
cctgcaatgg cactggaacc cccaagcccg aggaatcggc gtgagcggtc gcaaaccatc    8700
cggcccggta caaatcggcg cggcgctggg tgatgacctg gtggagaagt tgaaggcggc    8760
gcaggccgcc cagcggcaac gcatcgaggc agaagcacgc cccggtgaat cgtggcaagc    8820
ggccgctgat cgaatccgca aagaatcccg gcaaccgccg gcagcggtg cgccgtcgat     8880
taggaagccg cccaagggcg acgagcaacc agatttttc gttccgatgc tctatgacgt     8940
gggcacccgc gatagtcgca gcatcatgga cgtggccgtt ttccgtctgt cgaagcgtga    9000
ccgacgagct ggcgaggtga tccgctacga gcttccagac gggcacgtag aggtttccgc    9060
agggccggcc ggcatggcga gtgtgtggga ttacgacctg gtactgatgg cggtttccca    9120
tctaaccgaa tccatgaacc gataccggga agggaaggga acaagcccg ccgcgtgtt     9180
ccgtccacac gttgcggacg tactcaagtt ctgccggcga ccgatggcg gaaagcagaa    9240
agacgacctg gtagaaacct gcattcggtt aaacaccacg cacgttgcca tgcagcgtac   9300
gaagaaggcc aagaacggcc gcctggtgac ggtatccgag ggtgaagcct tgattagccg    9360
ctacaagatc gtaaagagcg aaaccgggcg gccggagtac atcgagatcg agctagctga    9420
ttggatgtac cgcgagatca cagaaggcaa gaacccggac gtgctgacgg ttcaccccga    9480
ttacttttg atcgatcccg gcatcggccg ttttctctac cgcctggcac gccgcgccgc     9540
aggcaaggca gaagccagat ggttgttcaa gacgatctac gaacgcagtg gcagcgccgg    9600
agagttcaag aagttctgtt tcaccgtgcg caagctgatc gggtcaaatg acctgccgga    9660
gtacgatttg aaggaggagg cggggcaggc tggcccgatc ctagtcatgc gctaccgcaa    9720
cctgatcgaa ggcgaagcat ccgccggttc ctaatgtacg gagcagatgc tagggcaaat    9780
tgccctagca ggggaaaaag gtcgaaaagg tctctttcct gtggatagca cgtacattgg    9840
gaacccaaag ccgtacattg gaaccggaa cccgtacatt gggaaccaa agccgtacat     9900
tgggaaccgg tcacacatgt aagtgactga tataaaagag aaaaaggcg attttccgc     9960
ctaaaactct ttaaaactta ttaaaactct aaaacccgc ctggcctgtg cataactgtc    10020
tggccagcgc acagccgaag agctgcaaaa agcgcctacc cttcggtcgc tgcgctccct   10080
acgccccgcc gcttcgcgtc ggcctatcgc ggccgctggc cgctcaaaaa tggctggcct   10140
```

```
acggccaggc aatctaccag ggcgcggaca agccgcgccg tcgccactcg accgccggcg   10200
cccacatcaa ggcaccggtg ggtatgcctg acgatgcgtg gagaccgaaa ccttgcgctc   10260
gttcgccagc caggacagaa atgcctcgac ttcgctgctg cccaaggttg ccgggtgacg   10320
cacaccgtgg aaacggatga aggcacgaac ccagtggaca taagcctgtt cggttcgtaa   10380
gctgtaatgc aagtagcgta tgcgctcacg caactggtcc agaaccttga ccgaacgcag   10440
cggtggtaac ggcgcagtgg cggttttcat ggcttgttat gactgttttt ttggggtaca   10500
gtctatgcct cggcatcca agcagcaagc gcgttacgcc gtgggtcgat gtttgatgtt    10560
atggagcagc aacgatgtta cgcagcaggg cagtcgccct aaaacaaagt taaacatcat   10620
gagggaagcg gtgatcgccg aagtatcgac tcaactatca gaggtagttg gcgtcatcga   10680
gcgccatctc gaaccgacgt tgctggccgt acatttgtac ggctccgcag tggatggcgg   10740
cctgaagcca cacagtgata ttgatttgct ggttacggtg accgtaaggc ttgatgaaac   10800
aacgcggcga gctttgatca cgacctttt ggaaacttcg gcttccctg gagagagcga     10860 gattctccgc gctgtagaag tcaccattgt tgtgcacgac gacatcattc cgtggcgtta   10920
tccagctaag cgcgaactgc aatttggaga atggcagcgc aatgacattc ttgcaggtat   10980
cttcgagcca gccacgatcg acattgatct ggctatcttg ctgacaaaag caagagaaca   11040
tagcgttgcc ttggtaggtc cagcggcgga ggaactcttt gatccggttc ctgaacagga   11100
tctatttgag gcgctaaatg aaaccttaac gctatggaac tcgccgcccg actgggctgg   11160
cgatgagcga aatgtagtgc ttacgttgtc ccgcatttgg tacagcgcag taaccggcaa   11220
aatcgcgccg aaggatgtcg ctgccgactg gcaatggag cgcctgccgg cccagtatca    11280
gcccgtcata cttgaagcta gacaggctta tcttggacaa gaagaagatc gcttggcctc   11340
gcgcgcagat cagttggaag aatttgtcca ctacgtgaaa ggcgagatca ccaaggtagt   11400
cggcaaataa tgtctaacaa ttcgttcaag ccgacgccgc ttcgcggcgc ggcttaactc   11460
aagcgttaga tgcactaagc acataattgc tcacagccaa actatcaggt caagtctgct   11520
tttattattt ttaagcgtgc ataataagcc ctacacaaat tgggagatat atcatgaaag   11580
gctggctttt tcttgttatc gcaatagttg gcgaagtaat cgcaacatag cttgcttggt   11640
cgttccgcgt gaacgtcggc tcgattgtac ctgcgttcaa atactttgcg atcgtgttgc   11700
gcgcctgccc ggtgcgtcgg ctgatctcac ggatcgactg cttctctcgc aacgccatcc   11760
gacggatgat gtttaaaagt cccatgtgga tcactccgtt gccccgtcgc tcaccgtgtt   11820 gggggggaagg tgcacatggc tcagttctca atggaaatta tctgcctaac cggctcagtt   11880
ctgcgtagaa accaacatgc aagctccacc gggtgcaaag cggcagcggc ggcaggatat   11940
attcaattgt aaatggcttc atgtccggga aatctacatg gatcagcaat gagtatgatg   12000
gtcaatatgg agaaaagaa agagtaatta ccaatttttt ttcaattcaa aaatgtagat    12060
gtccgcagcg ttattataaa atgaaagtac attttgataa aacgacaaat tacgatccgt   12120
cgtatttata ggcgaaagca ataaacaaat tattctaatt cggaaatctt tatttcgacg   12180
tgtctacatt cacgtccaaa tggggcttaa tgatgagaaac ttcacgatcg gctctagttc   12240
gagcgatcta gtaacataga tgacaccgcg cgcgataatt tatcctagtt tgcgcgctat   12300
attttgtttt ctatcgcgta ttaaatgtat aattgcggga ctctaatcat aaaaacccat   12360
ctcataaata acgtcatgca ttacatgtta attattcat gcttaacgta attcaacaga    12420
aattatatga taatcatcgc aagaccggca acaggattca atcttaagaa actttattgc   12480
```

-continued

| | |
|---|---|
| caaatgtttg aacgatcggg gaaattcgtt tctatgcttc aattctgctc tatagatgtt | 12540 |
| cttctagtct taacttttag aaggcacaac atttgaaatg ttggtaattt ttctgctggg | 12600 |
| tagtgaacca ttgtaatttg tgtttgctta tattatccgt tgggtttctc tatgttatct | 12660 |
| gtggggccat atcccagaac tggttgagtc ggtccaacac ctgggtgcca atcatgtcga | 12720 |
| tggtgggta tggt | 12734 |

<210> SEQ ID NO 16
<211> LENGTH: 5472
<212> TYPE: DNA
<213> ORGANISM: artificial sequence
<220> FEATURE:
<223> OTHER INFORMATION: IPR 252-pK-02

<400> SEQUENCE: 16

| | |
|---|---|
| cggacgaccc tgcgcgctca gacgaaacac cgccgcatca gagcagccaa tggtctgctg | 60 |
| cgcccaatca tagccaaaca gacgttccac ccacgctgcc gggctacccg catgcaggcc | 120 |
| atcctgttca atcatactct tccttttca atattattga agcatttatc agggttattg | 180 |
| tctcatgagc ggatacatat ttgaatgtat ttagaaaaat aaacaaatag gggttccgcg | 240 |
| cacatttccc cgaaaagtgc cacctaaatt gtaagcgtta atattttgtt aaaattcgcg | 300 |
| ttaaattttt gttaaatcag ctcatttttt aaccaatagg ccgaaatcgg caaaatccct | 360 |
| tataaatcaa aagaatagac cgagatagg ttgagtggcc gctacagggc gctcccattc | 420 |
| gccattcagg ctgcgcaact gttgggaagg gcgtttcggt gcgggcctct tcgctattac | 480 |
| gccagctggc acgacaggtt tcccgactgg aaagcgggca gtgagcgcaa cgcaattaat | 540 |
| gtgagttagc tcactcatta ggcaccccag gctttacact ttatgcttcc ggctcgtatg | 600 |
| ttgtgtggaa ttgtgagcgg ataacaattt cacacaggaa acagctatga ccatgattac | 660 |
| gccaagctcg aaattaaccc tcactaaagg gaacaaaagc tggactagag gcccttaagg | 720 |
| ccttgaagac aaatccacta gtcctgcagg ggatcccgag acccgccggc gaggcaagta | 780 |
| atagagattg gagtctctaa aaaggtagtt cccactgaat caaaggccat ggagtcaaag | 840 |
| attcaaatag aggacctaac agaactcgcc gtaaagactg gcgaacagtt catacagagt | 900 |
| ctcttacgac tcaatgacaa gaagaaaatc ttcgtcaaca tggtggagca cgacacactt | 960 |
| gtctactcca aaaatatcaa agatacagtc tcagaagacc aaagggcaat tgagactttt | 1020 |
| caacaagggg taatatccgg aaacctcctc ggattccatt gcccagctat ctgtcacttt | 1080 |
| attgtgaaga tagtggaaaa ggaaggtggc tcctacaaat gccatcattg cgataaagga | 1140 |
| aaggccatcg ttgaagatgc ctctgccgac agtggtccca agatggaccc cccacccacg | 1200 |
| aggagcatcg tggaaaaaga agacgttcca accacgtctt caaagcaagt ggattgatgt | 1260 |
| gatatctcca ctgacgtaag ggatgacgca caatcccact atccttcgca agaccctcc | 1320 |
| tctatataag gaagttcatt tcatttggag aggacacggg ggactctaga ggatccacaa | 1380 |
| ttaccaacaa caacaaacaa caacaacat acaattaca gatcccgatc acaagtttgt | 1440 |
| acaaaaaagc aggctcaatg gataataact ggttaggctt ttctctctct ccttatgaac | 1500 |
| aaaatcacca tcgtaaggac gtctactctt ccaccaccac aaccgtcgta gatgtcgccg | 1560 |
| gagagtactg ttacgatccg accgctgcct ccgatgagtc ttcagccatc caaacatcgt | 1620 |
| ttccttctcc ctttggtgtc gtcgtcgatg ctttcaccag agacaacaat agtcactccc | 1680 |
| gagattggga catcaatggt tgtgcatgca ataacatcca caacgatgag caagatggac | 1740 |
| caaagcttga gaatttcctt ggccgcacca ccacgattta caacaccaac gaaaacgttg | 1800 |

```
gagatggaag tggaagtggc tgttatggag gaggagacgg tggtggtggc tcactaggac   1860
tttcgatgat aaagacatgg ctgagaaatc aacccgtgga taatgttgat aatcaagaaa   1920
atggcaatgc tgcaaaaggc ctgtccctct caatgaactc atctacttct tgtgataaca   1980
acaacgacag caataacaac gttgttgccc aagggaagac tattgatgat agcgttgaag   2040
ctacaccgaa gaaaactatt gagagttttg gacagaggac gtctatatac cgcggtgtta   2100
caaggcatcg gtggacagga agatatgagg cacatttatg ggataatagt tgtaaaagag   2160
aaggccaaac gcgcaaagga agacaagttt atttgggagg ttatgacaaa gaagaaaaag   2220
cagctagggc ttatgattta gccgcactca agtattgggg aaccaccact actactaact   2280
tccccatgag cgaatatgaa aaagaggtag aagagatgaa gcacatgaca aggcaagagt   2340
atgttgcctc actgcgcagg aaaagtagtg gtttctctcg tggtgcatcg atttatcgtg   2400
gagtaacaag acatcaccaa catggaagat ggcaagctag gataggaaga gtcgccggta   2460
acaaagacct ctacttggga acttttggca cacaagaaga agctgcagag catacgaca   2520 tgcggccat caaattcaga ggattaaccg cagtgactaa cttcgacatg aacagataca   2580
acgttaaagc aatcctcgaa agccctagtc ttcctattgg tagcgccgca aaacgtctca   2640
aggaggctaa ccgtccggtt ccaagtatga tgatgatcag taataacgtt tcagagagtg   2700
agaatagtgc tagcggttgg caaaacgctg cggttcagca tcatcaggga gtagatttga   2760
gcttattgca ccaacatcaa gagaggtaca atggttatta ttacaatgga ggaaacttgt   2820
cttcggagag tgctagggct tgtttcaaac aagaggatga tcaacaccat ttcttgagca   2880
acacgcagag cctcatgact aatatcgatc atcaaagttc tgtttcggat gattcggtta   2940
ctgtttgtgg aaatgttgtt ggttatggtg gttatcaagg atttgcagcc ccggttaact   3000
gcgatgccta cgctgctagt gagtttgatt ataacgcaag aaaccattat tactttgctc   3060
agcagcagca gacccagcag tcgccaggtg gagattttcc cgcggcaatg acgaataatg   3120
ttggctctaa tatgtattac catggggaag gtggtggaga agttgctcca acatttacag   3180
tttggaacga caattagaaa aaatagttaa agatctttag ttatatgcgt tgttgtgtgc   3240
tggtgaacag tgtgatactt tgattatgtt tttttctttc tcttttcttt ttccttggtt   3300
aatttcttaa gacttatttt tagttttccat tagttggata aattttcaga ctaaaaaaaa   3360
aaaaaaaaaa aaactcgagg gggggcccgg taccgagctc gaatttcccc gatcgttcaa   3420
acatttgtac ccagctttct tgtacaaagt ggtgatgtaa ctaattgagg gggtaccgtc   3480
gacgagctca tatgaagatg aagatgaaat atttggtgtg tcaaataaaa agcttgtgtg   3540
cttaagtttg tgttttttc ttggcttgtt gtgttatgaa tttgtggctt tttctaatat   3600
taaatgaatg taagatctca ttataatgaa taaacaaatg tttctataat ccattgtgaa   3660
tgttttgttg gatctcttct gccgccggcg ggtctccaga tccaatgcat tggtcctgca   3720
ggccccgggc tatctttgtc ttccggccgc catggccaga tcgtacccaa ttcgccctat   3780
agtgagtcgt attacaattc actggccgtc gttttacaac gtcgtgactg ggaaaaccct   3840
ggcgttaccc aacttaatcg ccttgcagca catccccctt tcgccagctg cattaacatg   3900
gtcatagctg tttccttgcg tattgggcgc tctccgcttc ctcgctcact gactcgctgc   3960
gctcggtcgt tcgggtaaag cctggggtgc ctaatgagca aaaggccagc aaaaggccag   4020
gaaccgtaaa aaggccgcgt tgctggcgtt tttccatagg ctccgccccc ctgacgagca   4080
tcacaaaaat cgacgctcaa gtcagaggtg gcgaaacccg acaggactat aaagatacca   4140
```

```
ggcgtttccc cctggaagct ccctcgtgcg ctctcctgtt ccgaccctgc cgcttaccgg    4200
atacctgtcc gcctttctcc cttcgggaag cgtggcgctt tctcatagct cacgctgtag    4260
gtatctcagt tcggtgtagg tcgttcgctc caagctgggc tgtgtgcacg aaccccccgt    4320
tcagcccgac cgctgcgcct tatccggtaa ctatcgtctt gagtccaacc cggtaagaca    4380
cgacttatcg ccactggcag cagccactgg taacaggatt agcagagcga ggtatgtagg    4440
cggtgctaca gagttcttga agtggtggcc taactacggc tacactagaa gaacagtatt    4500
tggtatctgc gctctgctga agccagttac cttcggaaaa agagttggta gctcttgatc    4560
cggcaaacaa accaccgctg gtagcggtgg ttttttttgtt tgcaagcagc agattacgcg    4620
cagaaaaaaa ggatctcaag aagatccttt gatcttttct acggggtctg acgctcagtg    4680
gaacgaaaac tcacgttaag ggattttggt catgagatta tcaaaaagga tcttcaccta    4740 gatccttttta aattaaaaat gaagttttaa atcaatctaa agtatatatg agtaaacttg    4800
gtctgacagt tattagaaaa attcatccag cagacgataa aacgcaatac gctggctatc    4860
cggtgccgca atgccataca gcaccagaaa acgatccgcc cattcgccgc ccagttcttc    4920
cgcaatatca cgggtggcca gcgcaatatc ctgataacga tccgccacgc ccagacggcc    4980
gcaatcaata aagccgctaa acggccatt ttccaccata atgttcggca ggcacgcatc    5040
accatgggtc accaccagat cttcgccatc cggcatgctc gctttcagac gcgcaaacag    5100
ctctgccggt gccaggccct gatgttcttc atccagatca tcctgatcca ccaggcccgc    5160
ttccatacgg gtacgcgcac gttcaatacg atgtttcgcc tgatgatcaa acggacaggt    5220
cgccgggtcc agggtatgca gacgacgcat ggcatccgcc ataatgctca cttttctgc    5280 cggcgccaga tggctagaca gcagatcctg accggcact tcgcccagca gcagccaatc    5340
acggcccgct tcggtcacca catccagcac cgccgcacac ggaacaccgg tggtggccag    5400
ccagctcaga cgcgccgctt catcctgcag ctcgttcagc gcaccgctca gatcggtttt    5460
cacaaacagc ac                                                        5472

<210> SEQ ID NO 17
<211> LENGTH: 1260
<212> TYPE: DNA
<213> ORGANISM: artificial sequence
<220> FEATURE:
<223> OTHER INFORMATION: cDNA BnBBM Version with shortend N terminus

<400> SEQUENCE: 17
atgctgtccc tctcaatgaa ctcatctact tcttgtgata caacaacga cagcaataac     60 aacgttgttg cccaagggaa gactattgat gatagcgttg aagctacacc gaagaaaact    120
attgagagtt ttggacagag gacgtctata taccgcggtg ttacaaggca tcggtggaca    180
ggaagatatg aggcacattt atgggataat agttgtaaaa gagaaggcca aacgcgcaaa    240
ggaagacaag tttatttggg aggttatgac aaagaagaaa aagcagctag gcttatgat    300 ttagccgcac tcaagtattg gggaaccacc actactacta acttccccat gagcgaatat    360
gaaaaagagg tagaagagat gaagcacatg acaaggcaag agtatgttgc ctcactgcgc    420
aggaaaagta gtggtttctc tcgtggtgca tcgatttatc gtggagtaac aagacatcac    480
caacatggaa gatggcaagc taggatagga agagtcgccg gtaacaaaga cctctacttg    540
ggaacttttg gcacacaaga gaagctgcag gaggcatacg acattgcggc catcaaattc    600
agaggattaa ccgcagtgac taacttcgac atgaacagat acaacgttaa agcaatcctc    660
gaaagcccta gtcttcctat tggtagcgcc gcaaaacgtc tcaaggaggc taaccgtccg    720
```

```
gttccaagta tgatgatgat cagtaataac gtttcagaga gtgagaatag tgctagcggt    780
tggcaaaacg ctgcggttca gcatcatcag ggagtagatt tgagcttatt gcaccaacat    840
caagagaggt acaatggtta ttattacaat ggaggaaact tgtcttcgga gagtgctagg    900
gcttgtttca aacaagagga tgatcaacac catttcttga gcaacacgca gagcctcatg    960
actaatatcg atcatcaaag ttctgtttcg gatgattcgg ttactgtttg tggaaatgtt   1020
gttggttatg gtggttatca aggatttgca gccccggtta actgcgatgc ctacgctgct   1080
agtgagtttg attataacgc aagaaaccat tattactttg ctcagcagca gcagacccag   1140
cagtcgccag gtggagattt ccccgcggca atgacgaata tgttggctc taatatgtat    1200 taccatgggg aagtggtgg agaagttgct ccaacattta cagtttggaa cgacaattag    1260
```

<210> SEQ ID NO 18
<211> LENGTH: 1170
<212> TYPE: DNA
<213> ORGANISM: artificial sequence
<220> FEATURE:
<223> OTHER INFORMATION: cDNA BnBBM Version with shortend C terminus

<400> SEQUENCE: 18

```
atggataata actggttagg cttttctctc tctccttatg aacaaaatca ccatcgtaag     60
gacgtctact cttccaccac cacaaccgtc gtagatgtcg ccggagagta ctgttacgat    120
ccgaccgctg cctccgatga gtcttcagcc atccaaacat cgtttccttc tccctttggt    180
gtcgtcgtcg atgctttcac cagagacaac aatagtcact cccgagattg ggacatcaat    240
ggttgtgcat gcaataacat ccacaacgat gagcaagatg gaccaaagct tgagaatttc    300
cttggccgca ccaccacgat ttacaacacc aacgaaaacg ttggagatgg aagtggaagt    360
ggctgttatg gaggaggaga cggtggtggt ggctcactag gactttcgat gataaagaca    420
tggctgagaa atcaacccgt ggataatgtt gataatcaag aaaatggcaa tgctgcaaaa    480
ggcctgtccc tctcaatgaa ctcatctact tcttgtgata caacaacgga cagcaataac    540
aacgttgttg cccaagggaa gactattgat gatagcgttg aagctacacc gaagaaaact    600
attgagagtt ttggacagag gacgtctata taccgcggtg ttacaaggca tcggtggaca    660
ggaagatatg aggcacattt atgggataat agttgtaaaa gagaaggcca aacgcgcaaa    720
ggaagacaag tttatttggg aggttatgac aaagaagaaa agcagctag gcttatgat     780 ttagccgcac tcaagtattg gggaaccacc actactacta acttccccat gagcgaatat    840 gaaaagagg tagaagagat gaagcacatg acaaggcaag agtatgttgc ctcactgcgc    900
aggaaaagta gtggtttctc tcgtggtgca tcgatttatc gtggagtaac aagacatcac    960
caacatggaa gatggcaagc taggatagga agagtcgccg gtaacaaaga cctctacttg   1020
ggaacttttg gcacacaaga agaagctgca gaggcatacg acattgcggc catcaaattc   1080
agaggattaa ccgcagtgac taacttcgac atgaacagat acaacgttaa agcaatcctc   1140
gaaagcccta gtcttcctat tggtagctag                                     1170
```

<210> SEQ ID NO 19
<211> LENGTH: 418
<212> TYPE: PRT
<213> ORGANISM: artificial sequence
<220> FEATURE:
<223> OTHER INFORMATION: PRT BnBBM Version with shortend N terminus

<400> SEQUENCE: 19

```
Leu Ser Leu Ser Met Asn Ser Ser Thr Ser Cys Asp Asn Asn Asp
1               5                   10                  15

Ser Asn Asn Val Val Ala Gln Gly Lys Thr Ile Asp Ser Val
        20              25                  30

Glu Ala Thr Pro Lys Lys Thr Ile Glu Ser Phe Gly Gln Arg Thr Ser
            35                  40                  45

Ile Tyr Arg Gly Val Thr Arg His Arg Trp Thr Gly Arg Tyr Glu Ala
50                      55                  60

His Leu Trp Asp Asn Ser Cys Lys Arg Glu Gly Gln Thr Arg Lys Gly
65                  70                  75                  80

Arg Gln Val Tyr Leu Gly Gly Tyr Asp Lys Glu Glu Lys Ala Ala Arg
                85                  90                  95

Ala Tyr Asp Leu Ala Ala Leu Lys Tyr Trp Gly Thr Thr Thr Thr Thr
            100                 105                 110

Asn Phe Pro Met Ser Glu Tyr Glu Lys Glu Val Glu Glu Met Lys His
            115                 120                 125

Met Thr Arg Gln Glu Tyr Val Ala Ser Leu Arg Arg Lys Ser Ser Gly
            130                 135                 140

Phe Ser Arg Gly Ala Ser Ile Tyr Arg Gly Val Thr Arg His His Gln
145                 150                 155                 160

His Gly Arg Trp Gln Ala Arg Ile Gly Arg Val Ala Gly Asn Lys Asp
                165                 170                 175

Leu Tyr Leu Gly Thr Phe Gly Thr Gln Glu Ala Ala Glu Ala Tyr
                180                 185                 190

Asp Ile Ala Ala Ile Lys Phe Arg Gly Leu Thr Ala Val Thr Asn Phe
            195                 200                 205

Asp Met Asn Arg Tyr Asn Val Lys Ala Ile Leu Glu Ser Pro Ser Leu
            210                 215                 220

Pro Ile Gly Ser Ala Ala Lys Arg Leu Lys Glu Ala Asn Arg Pro Val
225                 230                 235                 240

Pro Ser Met Met Met Ile Ser Asn Asn Val Ser Glu Ser Glu Asn Ser
                245                 250                 255

Ala Ser Gly Trp Gln Asn Ala Ala Val Gln His His Gln Gly Val Asp
                260                 265                 270

Leu Ser Leu Leu His Gln His Gln Glu Arg Tyr Asn Gly Tyr Tyr Tyr
        275                 280                 285

Asn Gly Gly Asn Leu Ser Ser Glu Ser Ala Arg Ala Cys Phe Lys Gln
        290                 295                 300

Glu Asp Asp Gln His His Phe Leu Ser Asn Thr Gln Ser Leu Met Thr
305                 310                 315                 320

Asn Ile Asp His Gln Ser Ser Val Ser Asp Asp Ser Val Thr Val Cys
                325                 330                 335

Gly Asn Val Val Gly Tyr Gly Gly Tyr Gln Gly Phe Ala Ala Pro Val
                340                 345                 350

Asn Cys Asp Ala Tyr Ala Ala Ser Glu Phe Asp Tyr Asn Ala Arg Asn
        355                 360                 365

His Tyr Tyr Phe Ala Gln Gln Gln Gln Thr Gln Gln Ser Pro Gly Gly
        370                 375                 380

Asp Phe Pro Ala Ala Met Thr Asn Asn Val Gly Ser Asn Met Tyr Tyr
385                 390                 395                 400

His Gly Glu Gly Gly Gly Glu Val Ala Pro Thr Phe Thr Val Trp Asn
                405                 410                 415

Asp Asn
```

<210> SEQ ID NO 20
<211> LENGTH: 389
<212> TYPE: PRT
<213> ORGANISM: artificial sequence
<220> FEATURE:
<223> OTHER INFORMATION: PRT BnBBM Version with shortend C terminus

<400> SEQUENCE: 20

```
Met Asp Asn Asn Trp Leu Gly Phe Ser Leu Ser Pro Tyr Glu Gln Asn
1               5                   10                  15

His His Arg Lys Asp Val Tyr Ser Ser Thr Thr Thr Val Val Asp
            20                  25                  30

Val Ala Gly Glu Tyr Cys Tyr Asp Pro Thr Ala Ala Ser Asp Glu Ser
        35                  40                  45

Ser Ala Ile Gln Thr Ser Phe Pro Ser Pro Phe Gly Val Val Val Asp
    50                  55                  60

Ala Phe Thr Arg Asp Asn Asn Ser His Ser Arg Asp Trp Asp Ile Asn
65                  70                  75                  80

Gly Cys Ala Cys Asn Asn Ile His Asn Asp Glu Gln Asp Gly Pro Lys
                85                  90                  95

Leu Glu Asn Phe Leu Gly Arg Thr Thr Thr Ile Tyr Asn Thr Asn Glu
            100                 105                 110

Asn Val Gly Asp Gly Ser Gly Ser Gly Cys Tyr Gly Gly Asp Gly
        115                 120                 125

Gly Gly Gly Ser Leu Gly Leu Ser Met Ile Lys Thr Trp Leu Arg Asn
    130                 135                 140

Gln Pro Val Asp Asn Val Asp Asn Gln Glu Asn Gly Asn Ala Ala Lys
145                 150                 155                 160

Gly Leu Ser Leu Ser Met Asn Ser Ser Thr Ser Cys Asn Asn
                165                 170                 175

Asp Ser Asn Asn Asn Val Val Ala Gln Gly Lys Thr Ile Asp Asp Ser
            180                 185                 190

Val Glu Ala Thr Pro Lys Lys Thr Ile Glu Ser Phe Gly Gln Arg Thr
        195                 200                 205

Ser Ile Tyr Arg Gly Val Thr Arg His Arg Trp Thr Gly Arg Tyr Glu
    210                 215                 220

Ala His Leu Trp Asp Asn Ser Cys Lys Arg Glu Gly Gln Thr Arg Lys
225                 230                 235                 240

Gly Arg Gln Val Tyr Leu Gly Gly Tyr Asp Lys Glu Lys Ala Ala
                245                 250                 255

Arg Ala Tyr Asp Leu Ala Ala Leu Lys Tyr Trp Gly Thr Thr Thr Thr
            260                 265                 270

Thr Asn Phe Pro Met Ser Glu Tyr Glu Lys Glu Val Glu Glu Met Lys
        275                 280                 285

His Met Thr Arg Gln Glu Tyr Val Ala Ser Leu Arg Arg Lys Ser Ser
    290                 295                 300

Gly Phe Ser Arg Gly Ala Ser Ile Tyr Arg Gly Val Thr Arg His His
305                 310                 315                 320

Gln His Gly Arg Trp Gln Ala Arg Ile Gly Arg Val Ala Gly Asn Lys
                325                 330                 335

Asp Leu Tyr Leu Gly Thr Phe Gly Thr Gln Glu Glu Ala Ala Glu Ala
            340                 345                 350

Tyr Asp Ile Ala Ala Ile Lys Phe Arg Gly Leu Thr Ala Val Thr Asn
        355                 360                 365
```

```
Phe Asp Met Asn Arg Tyr Asn Val Lys Ala Ile Leu Glu Ser Pro Ser
    370                 375                 380

Leu Pro Ile Gly Ser
385
```